(12) United States Patent
Pederson et al.

(10) Patent No.: US 7,899,608 B1
(45) Date of Patent: Mar. 1, 2011

(54) METHOD AND APPARATUS FOR DETECTING MISFIRES AND IDENFIFYING CAUSES

(76) Inventors: Neal R. Pederson, Los Alamos, NM (US); Bernie C. Thompson, Tijeras, NM (US)

( * ) Notice: Subject to any disclaimer, the term of this patent is extended or adjusted under 35 U.S.C. 154(b) by 709 days.

(21) Appl. No.: 11/982,183

(22) Filed: Oct. 31, 2007

Related U.S. Application Data

(63) Continuation-in-part of application No. 11/899,271, filed on Sep. 4, 2007, and a continuation-in-part of application No. 11/811,634, filed on Jun. 8, 2007.

(60) Provisional application No. 60/842,310, filed on Sep. 5, 2006, provisional application No. 60/812,525, filed on Jun. 8, 2006.

(51) Int. Cl.
*G01M 15/00* (2006.01)
*F02P 5/14* (2006.01)
(52) U.S. Cl. ........................................ 701/111; 73/114.33
(58) Field of Classification Search .................. 701/111, 701/114, 102, 101; 123/406.22, 406.41, 123/435; 73/114.63, 114.02, 114.76, 114.33
See application file for complete search history.

(56) References Cited

U.S. PATENT DOCUMENTS

| | | | | |
|---|---|---|---|---|
| 4,441,360 A | * | 4/1984 | Dooley et al. | 73/114.65 |
| 4,622,939 A | * | 11/1986 | Matekunas | 123/406.41 |
| 5,355,713 A | * | 10/1994 | Scourtes et al. | 73/114.76 |
| 6,560,526 B1 | * | 5/2003 | Matekunas et al. | 701/104 |

* cited by examiner

*Primary Examiner* — Hieu T Vo
(74) *Attorney, Agent, or Firm* — DeWitt M. Morgan

(57) ABSTRACT

A method of identifying misfires in an engine including: running the engine; measuring the pressure pulses from the exhaust; generating a waveform from the measured pulses; dividing the waveform into segments; associating each waveform segment with the cylinder which generated the pulse; and examining each segment for features which indicate a misfire. Also disclosed is methodology for checking the performance of an engine including cam timing and identifying the probable cause(s) of misfires. This includes generating a cylinder pressure waveform from the measured pressure changes in a cylinder and analyzing the magnitude and timing of at least one of the pressure changes in such cylinder. Further disclosed is methodology for analyzing the pressure changes in the engine's intake manifold and in the crankcase. Finally, additional diagnostic procedures are disclosed for: checking the ignition timing of an engine; and using the apparatus and methods with additional instrumentation including gas analyzers.

35 Claims, 62 Drawing Sheets
(58 of 62 Drawing Sheet(s) Filed in Color)

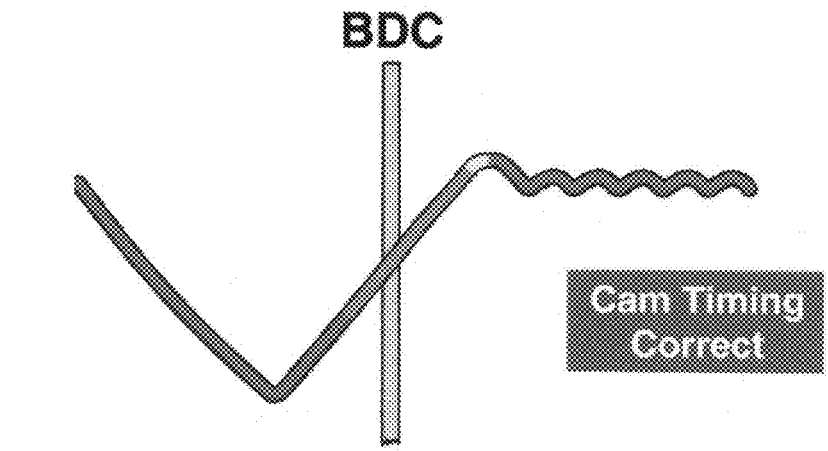
FIG. 25-A
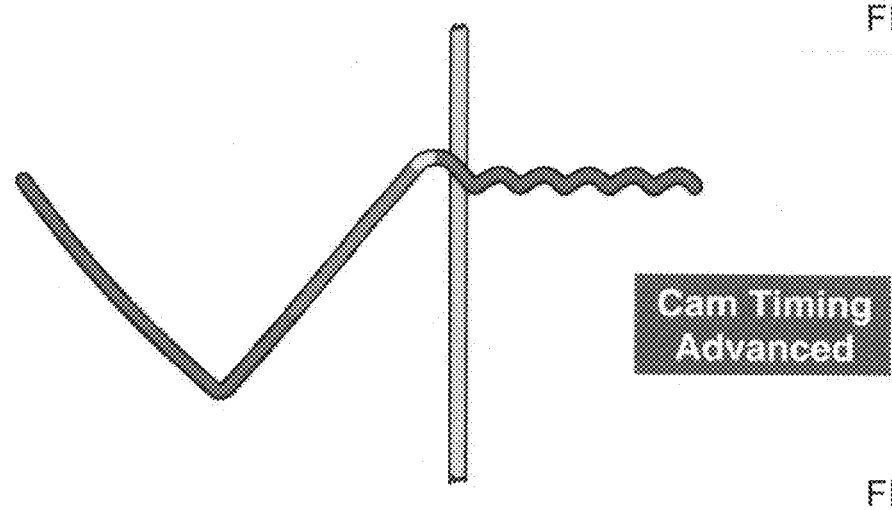
FIG. 25-B
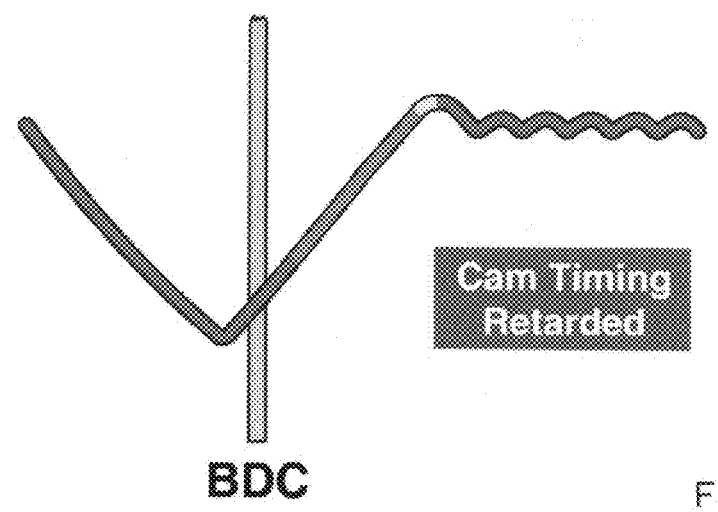
FIG. 25-C

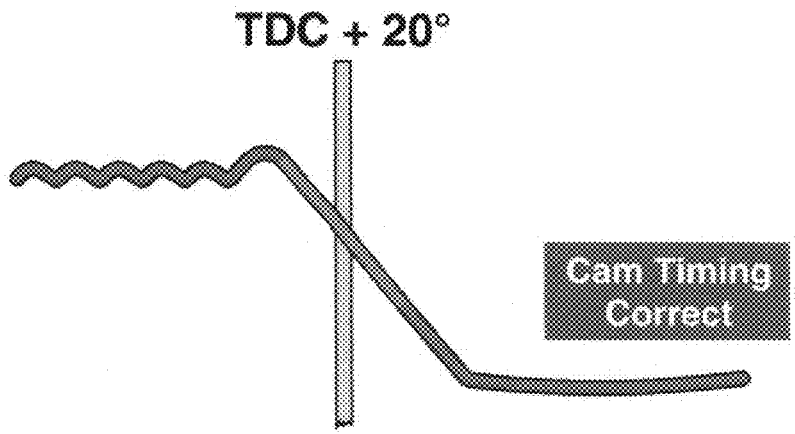
FIG. 26-A
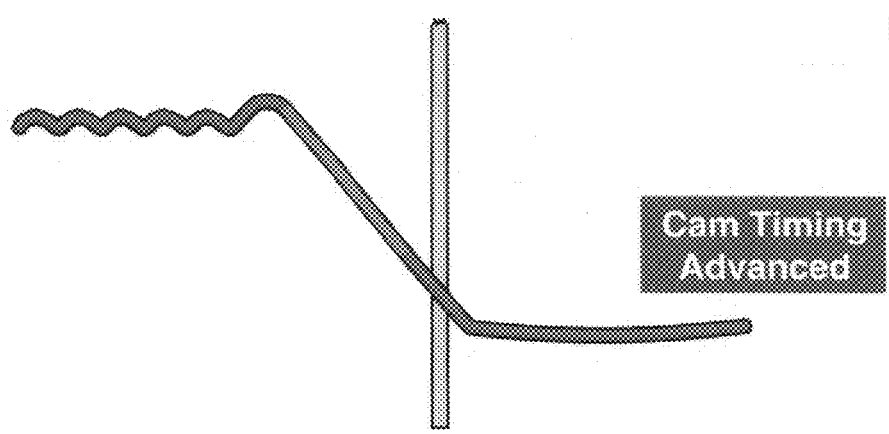
FIG. 26-B
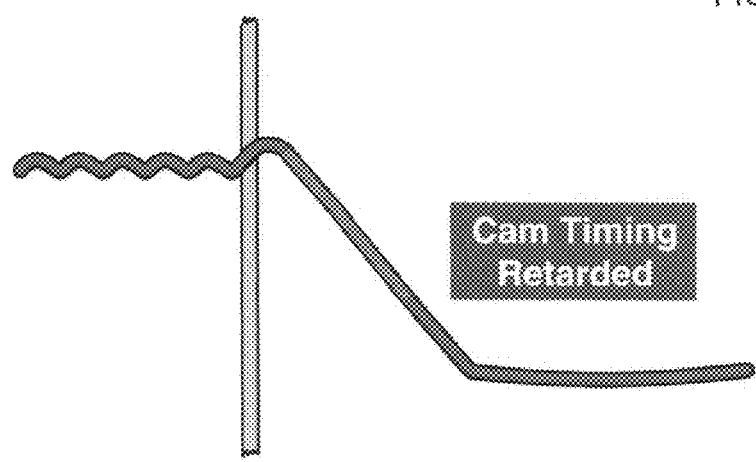
FIG. 26-C

METHOD AND APPARATUS FOR DETECTING MISFIRES AND IDENFIFYING CAUSES

CLAIM OF PRIORITY

This application is a continuation-in-part of and claims the priority of application Ser. No. 11/899,271, filed Sep. 4, 2007 which, in turn, is a continuation-in-part and claims the priority of provisional application Ser. No. 60/842,310, filed Sep. 5, 2006. This application is also a continuation-in-part and claims the priority of application Ser. No. 11/811,634 filed Jun. 8, 2007 which, in turn, is a continuation-in-part and claims the priority of provisional application Ser. No. 60/812,525 filed Jun. 8, 2006.

FIELD OF THE INVENTIONS

These inventions relate to automotive test equipment. More particularly, the present inventions relate to apparatus and methods of detecting cylinder misfires, including both intermittent and multiple misfires and then identifying the probable cause(s) of such intermittent or multiple misfires.

BACKGROUND OF THE INVENTIONS

The 4 cycle internal combustion engine has four cycles or four strokes that occur in 720° of crankshaft rotation. Each cycle occurs within approximately 180° of crankshaft rotation. The first cycle is the induction cycle or intake stroke in which the intake valve opens as the piston moves over top dead center and starts to move downward or away from the cylinder head. The intake port is connected to the intake manifold which has one end that is exposed to atmospheric pressure. As the piston moves downward it creates a pressure differential or vacuum that allows the atmosphere to fill the cylinder with air. The cylinder fills with air until the intake valve closes. At this point the crankshaft is moving the piston in an upward direction or towards the cylinder head. Both valves, intake and exhaust, are closed as the piston moves upward. As the piston continues its upward movement it compresses and heats the air that has been trapped inside the cylinder. If fuel is added during the induction stroke the fuel will also be heated. As the piston reaches the top of its stroke the heat from the compression will be at its peak. In the spark ignition (SI) internal combustion engine a spark will be generated that will ionize across the spark plug electrodes. This spark will start a chemical reaction between the oxygen and hydrocarbon (gasoline), which will release heat energy that will expand, building pressure in the cylinder. As this pressure builds it will push the piston downward, away from the cylinder head. In the compression ignition (CI) engine fuel will be injected under high pressure into the heated compressed air that is within the cylinder. The heat generated during the compression stroke will start a chemical reaction between the oxygen and hydrocarbons (diesel), which will release heat energy that will build pressure in the cylinder. As this pressure builds it will push the piston downward away from the cylinder head. In either the SI or the CI engines, the chemical reaction propagates across the cylinder head building pressure that will accelerate the piston in a downward movement. Once the reaction between the oxygen and hydrocarbons is completed the exhaust valve will open releasing the remaining pressure into the exhaust manifold. The piston will now move in an upward direction toward the cylinder head forcing the burned gases out of the cylinder into the exhaust manifold. The piston will reach the top of its stroke and the intake valve will once again open and the cycle will start over again. The foregoing is illustrated in FIGS. 1-4 of provisional application Ser. No. 60/842,310, which are incorporated by reference.

Since the conception of the internal combustion engine, combustion efficiency has been a problem. Early on it was a source of power loss. As vehicles have moved into the modern era air quality has become of prime concern. Federal and state government mandates require automobile manufacturers to install equipment to monitor tailpipe emissions. On vehicles newer than 1996, the manufacturer must also install monitors to detect a misfire and turn on the vehicle's malfunction indicator lamp when the emissions levels from the tailpipe exceed 1.5% of the Federal Test Procedure (FTP). A drawback with the FTP requirement is that an intermittent misfire will not produce emission levels exceeding 1.5% of the FTP tailpipe emissions. Therefore a diagnostic trouble code will not be stored in the powertrain control module (the vehicle's onboard microprocessor which monitors and controls the running parameters of the engine) for such a misfiring cylinder or cylinders. Such misfire(s) will, however, cause a drivability problem with the vehicle. It is also known that some vehicles have powertrain control module programming errors that detect and report the incorrect cylinder for the misfire condition. "Misfire" as used herein refers to a range of combustion inefficiencies in a cylinder. Such inefficiencies range from a complete misfire (e.g., where the fuel-air mixture does not ignite at all) to conditions where the efficiency is less than achieved in a normally running engine. Examples of the latter include: lean air/fuel ratio; rich air/fuel ratio; ignition spark weak or out of time; low compression within the cylinder; or other mechanical problems.

What is needed is a method and apparatus, other than the vehicle's onboard diagnostics, to alert a technician which cylinder (or cylinders) is (are) misfiring. It would also be desirable to find misfiring conditions on older model vehicles and heavy duty vehicles that are compression ignition based. Beyond identifying the cylinder(s) that is (are) misfiring, what is also needed is methodology and apparatus to also identify the probable cause(s) of the misfire(s).

U.S. Pat. No. 7,031,828 to Thompson et al. discloses detecting combustion inefficiencies by monitoring the oxygen level in the vehicle's exhaust path. This patent states that, if the oxygen level peaks, it may be inferred that there was an incomplete explosion in one of the cylinders. The peak in the oxygen level is linked to a particular cylinder in one of two ways. In a first embodiment, a plurality of oxygen sensors is placed in an exhaust manifold. Preferably, each cylinder of the engine has an associated sensor. When a given cylinder vents exhaust that has a high oxygen level, the high oxygen level is detected by the associated sensor and the cylinder is identified as potentially having combustion inefficiency. The sensors may communicate with an onboard computer so that this condition may be monitored and an alarm generated. There is no known engine in current production in which each cylinder has an associated sensor. Further such a system, even if available, could not determine the probable cause or causes of the detected misfires.

The second disclosed embodiment in the Thompson et al. patent addresses testing engines that do not have the sensor system of the first embodiment. As such, this embodiment includes software that, according to Thompson et al., a service technician can use to identify which cylinder in the vehicle is misfiring. This embodiment connects an external probe to a lambda (also known as an 02) sensor already present in the exhaust path of the vehicle. Concurrently, a timing reference is generated that references when the first cylinder of the engine is in the combustion stroke. If there is a peak in the level of oxygen in the exhaust path, a misfire or other combustion inefficiency may be inferred. However, to link the peak in the oxygen level to a particular cylinder, additional information is required in the form of a database of "fingerprints" or "signatures" for the various engine types in service. The length of time between the timing reference point and the peak in the oxygen level is established and compared to the fingerprint or signature for the engine type. From this comparison, it is claimed that the software can determine which cylinder is misfiring.

As is evident from col. 8, l. 38-col. 9, l. 5 and FIG. 8 of the Thompson et al. patent, the method of acquiring a set of fingerprints from a single engine is labor intensive. Given that there are hundreds of automobile engines currently in service in the United States, the impractically of acquiring fingerprints is evident. And, like the first embodiment, there is no way to determine the cause or causes of the detected misfires.

In an article entitled Drivability Corner, Motor, June 2006, M. Warren, the use of an exhaust probe and an automotive oscilloscope' to locate misfires is disclosed. The exhaust probe is identified as a "First-Look exhaust probe." The article concludes by stating: "Using an exhaust probe with a scope takes practice, common sense, experience and logical follow-up testing." The First-Look exhaust "probe" is sensor (specifically a Piezo differential sensor), not a probe (i.e., an electrical probe) as that term is used in the Thompson et al. patent.

Pico Technology is offering for sale the "ACE Misfire Detective" from Thompson Auto Labs. Pico's website (http://www.ispicotech.com/auto/enginemisfire-detection.html) indicates that the ACE system includes a computer, "ACE Misfire software," a Pico automotive oscilloscope, and an inductive pick-up. Optionally, if one wants to test through the exhaust, a "FirstLook Sensor," and a sync probe are required. The website states that: "ACE uses a Pico automotive oscilloscope to identify the high pressure pulse of the exhaust stroke of a misfiring cylinder driven by the unconsumed oxygen of a misfire." The website also states: "ACE displays a diagram of the engine being worked on and flashes cylinders in firing order sequence." Healthy cylinders flash green. Cylinders flash red when a misfire is detected. The ACE misfire software is not described. It apparently requires the user to "select the manufacture and type of engine." There is some sort of data base. "You can add your own vehicles to the data base and updates can also be downloaded from the internet." The ACE Misfire Detective is also available from Thompson Automotive Labs, LLC and from SenX Technology LLC. The website of SenX, the manufacture of the FirstLook sensor, includes the statement: "ACE software analyzes the exhaust pulse train to identify the lower than normal pulses coming from the exhaust stroke of a misfiring cylinder." (This appears to be inconsistent with the statement on the Pico website.) U.S. Pat. No. 7,031,828 is also listed. See http://www.senxtech.com/snx main ace-misfire-management.html. Both websites indicate that the ACE Misfire Detective is limited to gasoline engines.

The FirstLook sensor is associated by the manufacture with U.S. Pat. No. 6,484,589 to Brock ("Brock I") and U.S. Patient No. 6,609,416 to Brock ("Brock II"). As is apparent from the foregoing, the ACE Misfire Detective has the following shortcomings: (1) it is limited to gas engines; (2) there is no live misfire counter (rather the misfires are located in blocks of misfire data); (3) data cannot be streamed continuously; (4) it has problems detecting multiple misfires; and (5) it cannot identify the cause(s) or probable cause(s) of the detected misfires.

As is apparent from the foregoing, the ACE Misfire Detective has the following shortcomings: (1) it is limited to gas engines; (2) there is no live misfire counter (rather the misfires are located in blocks of misfire data); (3) data cannot be streamed continuously; (4) it has problems detecting multiple misfires; and (5) it cannot identify the cause(s) or probable cause(s) of the detected misfires.

OBJECTS OF THE INVENTIONS

It is an object of the present inventions to provide a misfire detector which is easy to use, reasonably priced, is not limited to gasoline engines. The diesel engine is also susceptible to a misfiring cylinder or cylinders.

Additional objects include: providing apparatus and processes for identifying multiple misfires on a single engine including multiple misfires during a single fire cycle; generating and using continuously streaming data (so a misfire will not be missed due to a loss of acquiring the misfire data); and counting and displaying detected misfires (i.e., a misfire counter). A misfire counter is important to alert the technician to the extent of the problem (e.g., continuous misfire, frequent but intermittent misfire, infrequent misfire). "Fire cycle" refers to one complete firing cycle of an engine (e.g., cylinders 1-3-4-2 as illustrated in FIG. 5; cylinders 1-6-5-4-3-2 as illustrated in FIG. 10 for a 2000 GM 4.3 liter V-6 engine).

It is also an object of the present inventions to identify the probable cause(s) of the detected misfires and to perform other diagnostic tests (e.g., determine cam timing) in the absence of misfiring.

SUMMARY OF THE INVENTIONS

A method of identifying one or more misfires occurring in an internal combustion engine including the steps of: running the engine; measuring the pressure pulses from the exhaust of the engine; generating a waveform from the measured pressure pulses; dividing the waveform into segments, one for each cylinder of the engine, wherein each segment represents a pressure pulse; associating each waveform segment with the cylinder which generated the pressure pulse; and examining each waveform segment for features which indicate a misfire. The method further includes the step of generating a trigger signal and associating the trigger signal with the ignition in one of the cylinders of the engine. The method also includes steps of: measuring the time between the trigger signal and the next successive trigger signal; and dividing the time between the two trigger signals into a number of cylinder boxes, one for each cylinder of the engine. Each one of the waveform segments is associated with each one of the cylinder boxes; one waveform segment for each cylinder box. Also included is the step of shifting each of the cylinder boxes relative to the associated waveform segment such that the peak of the segment and at least a portion of one of the rising edge of the waveform segment and the falling edge of the waveform segment fall within the cylinder box. Preferably, the peak of each waveform segment is located in the center portion of its associated cylinder box. Threshold values for the peak value and at least one of the rising edge and falling edge of each waveform segment are also determined, first determining the medians for each of the peak values, rising edges and falling edges and then selecting the median from each group. Once determined; the peak in each cylinder box is compared with the threshold value for the peaks. Further, for each cylinder box, the rising edge of the waveform segment is compared with the threshold value for the rising edges and the falling edge of the waveform segment is compared with the threshold value for the falling edges. For each cylinder box, each threshold that is exceeded is flagged. Each cylinder box in which at least two of the thresholds are exceeded is identified as a misfire. The method further includes the step of synchronizing each of the cylinder boxes and its associated waveform segment with the cylinder in which the pulse was generated.

The inventions also includes methodology for checking the performance of an internal combustion engine including cam timing, determining whether or not the variable valve timing is functional (on those engines which have VVT camshafts) and identifying the probable cause (or causes) why a cylinder (or cylinders) misfires. This includes the steps of: replacing one of the spark plug, fuel injector or glow plug form the cylinder with a pressure transducer; rotating the crankshaft fast enough (either by cranking or running the engine) to build pressure within the cylinder; measuring the pressure changes in the cylinder while the crankshaft is being rotated; generating a cylinder pressure waveform from the measured pressure changes in the cylinder; and, from the cylinder pressure waveform, analyzing the magnitude and timing of at least one of the pressure changes in the cylinder. For the purposes of exhaust cam timing, the analysis of the cylinder pressure waveform includes the steps of: characterizing a portion of the waveform where the cylinder pressure is raising after the exhaust valve opens as the exhaust ramp; designating a portion of this exhaust ramp as representing a range of exhaust cam timing values which are correct if such portion intersects the BDC 180° portion of the waveform; and determining the relationship between the exhaust ramp and BDC 180°. The method further includes the step characterizing the exhaust cam timing as correct, advanced or retarded, depending on whether the designated portion of the waveform intersects the BDC 180° position (correct), is before the BDC 180° position (advanced), or after the BDC 180° portion (retarded). The intake cam timing includes characterizing a portion of the waveform as the intake ramp, designating a portion of such ramp a representing a range of correct timing values, and determining the relationship between this range and TDC 360°+20°.

The cylinder pressure analysis is useful in identifying the probable cause of why the cylinder is misfiring. In addition to cam timing analysis, which may identify the cause of the misfire, other portions of the waveform are identified, labeled and analyzed to identify the cause of the misfire (if its not related to cam timing). These portions include the exhaust plateau, exhaust valve opening position, exhaust valve closing position, intake valve opening position, intake valve closing position and the compression tower.

For all the cylinder pressure waveform analysis, whether for cam timing, determining the functionality of VVT camshafts or identifying the probable cause(s) of a cylinder misfire, algorithms are provided for automatically analyzing the waveform. In the case of misfire detection the algorithms would identifying features that are indicative of the cause (or causes) of the misfire. The results of the analysis are displayed on a screen which includes lights to alert the user to the probable cause (or causes) of the misfire.

This cylinder pressure waveform analysis also includes the steps of marking the cylinder pressure waveform at the end of a compression stroke where the piston is at top dead center (hereinafter TDC 0°) and again at the end of the next successive compression stroke where the piston is again at top dead center (hereinafter TDC 720°), and dividing the waveform into segments (wherein one segment represents the travel of the piston from TDC 0° to BDC 180° and another segment represents the travel from TDC 360° to BDC 540°.

For those diesel engines which do not have intake manifold vacuum at idle, the cylinder compression waveform methodology includes the step of placing at least a partial restriction over the induction inlet of the intake manifold of such engine to create a vacuum at idle.

The inventions also include a method of checking the performance of an internal combustion engine by analyzing the pressure changes in the engine's intake manifold, including the steps of: (a) connecting a pressure transducer to the intake manifold; (b) rotating the crankshaft of the engine fast enough to create a pressure differential in the intake manifold; (c) measuring the pressure changes in the manifold while the crankshaft is being rotated fast enough to create a pressure differential in the intake manifold; (d) generating an intake pressure waveform from the measured pressure changes in the intake manifold; and (e) analyzing at least a portion of the intake pressure waveform for one or more features indicative of a problem with the engine. This method also includes providing a trigger, synchronizing the signal from the trigger to a cylinder, providing cylinder boxes (one for each cylinder of the engine), dividing the intake pressure waveform into a number of segments equal to the number of cylinder boxes, and locating the individual segments of the intake pressure waveform in the cylinder box for the cylinder which created the segment. The method also includes comparing at least one individual segment that is located within a cylinder box to another segment within another cylinder box, and identifying the cylinder(s) that have an intake pressure waveform segment that is indicative of a problem.

The pressure changes in the crankcase of an engine can also be utilized for diagnostic purposes. This method includes, in addition to generating a cylinder pressure waveform from the measured pressure changes in a cylinder, measuring the pressure changes in the crankcase while the crankshaft is being rotated, generating a crankcase pressure waveform form the measured pressure changes in the crankcase, and comparing the crankcase pressure waveform with the cylinder pressure waveform. This diagnostic method may also include: (a) marking the crankcase pressure waveform using a trigger signal to create cylinder boxes, one cylinder box for each cylinder of the engine; (b) dividing the crankcase pressure waveform into segments, one for each cylinder; and (c) locating the individual segments of the crankcase pressure waveform in the cylinder box for the cylinder that created the segment.

Finally, additional diagnostic procedures are disclosed for: (a) checking the ignition timing of an engine which is useful with modern engines which do not have timing marks; and using the apparatus and methods disclosed herein with additional instrumentation including gas analyzers, ignition analyzers and the vehicle diagnostic tool disclosed in co-pending application Ser. No. 11/811,634, the disclosure of which is incorporated by reference.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 25A-C illustrate the position of the exhaust ramp portion of a cylinder pressure waveform relative to BDC (180° where the cam timing is, respectively, correct, advanced and retarded;

FIGS. 26A-C illustrate the position of the intake ramp portion of a cylinder pressure waveform relative to TDC (360°)+20° where the cam timing is, respectively, correct, advanced and retarded;

DESCRIPTION OF THE PREFERRED EMBODIMENTS

Figure 1:
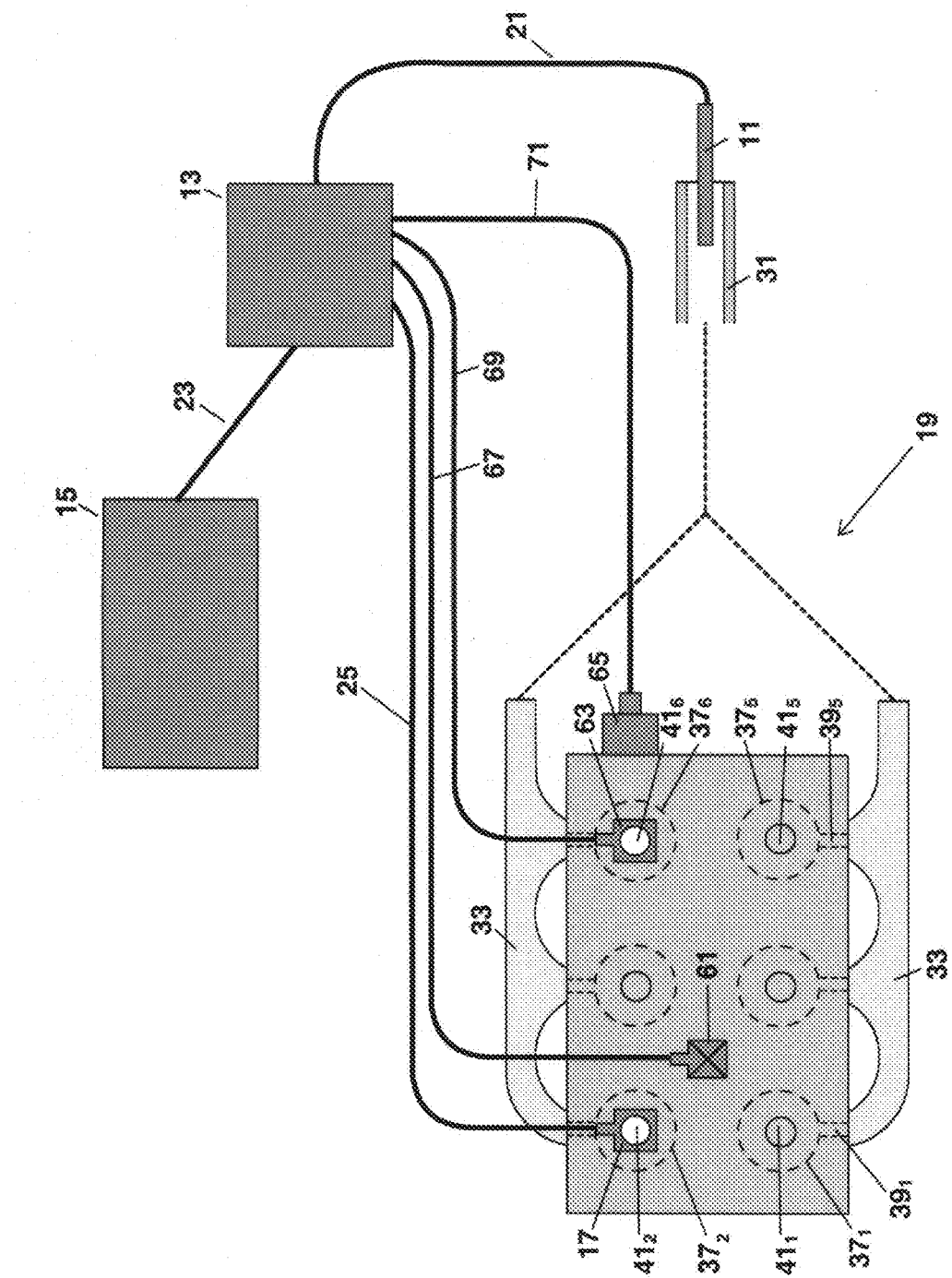
FIG. 1 is a schematic of the misfire detection system of the present invention.

With reference to FIG. 1, the misfire detector system of the present invention includes exhaust pressure sensing device 11, A/D converter 13, computer 15 and apparatus 17 for capturing a trigger signal from engine 19. Exhaust pressure sensor 11 is connected to a conventional A/D converter 13 by cable 21 which, in turn, is connected to computer 15 by cable 23. Trigger apparatus 17 is connected to A/D converter 13 by cable 25.

Exhaust pressure sensor 11 may be a FirstLook sensor manufactured by SenX Technology, LLC ("SenX") or a MLH Series pressure sensor from Honeywell, or an All Sensor's H20 Hall Effect sensor, or equivalent. These devices will be referred to as a "basic pressure transducer". As explained later, improved performance is obtained with the use of the venturi amplified sensor disclosed and claimed in co-pending U.S. patent application Ser. No. 11/879,565, the disclosure of which is incorporated by reference. With the venturi sensor multiple misfires, including multiple misfires in the same fire cycle, can easily be detected. Further, with the use of the venturi sensor (together with an intake pressure sensing device, and/or compression sensing device, and/or crank case pressure sensing device), probable causes of engine misfires can also be identified.

Computer 15 may be a conventional laptop having the following minimum performance requirements: Windows XP, 30G hard drive, 256 Ram, and XGA graphics.

Trigger apparatus 17 is any suitable conventional device for sensing the electrical field of a spark plug when it fires and relaying an electrical signal. The electrical signal is picked up by an inductive clamp or capacitive clamp that is placed around the spark plug wire. The trigger can also use the primary ignition waveform from the ignition coil control. Alternately, for compression ignition engines, the trigger signal can be acquired from the voltage control signal that operates the fuel injector or trigger apparatus 17 is an electromechanical device which senses when a fuel injector injects fuel into a cylinder and then transmits an electrical signal. For example, a Piezo sensing device may be mounted to a high pressure fuel injection line that is isolated to one cylinder. In either case, an analog voltage signal is generated and relayed to A/D converter 13 where it is converted to binary code that is then transmitted to computer 15. As is explained below, such trigger signal is used to synchronize the exhaust pressure pulses (or exhaust pulses) sensed by pressure sensor 11 with the cylinder in which the pulses originate. The trigger signal originates from the ignition (or injection) in the particular cylinder to which trigger apparatus 17 is connected (e.g., cylinder 372 in FIG. 1, infra). The pressure transducer can be in the form of a basic pressure transducer or the venturi design disclosed in co-pending application Ser. No. 11/879,565.

Figure 2:
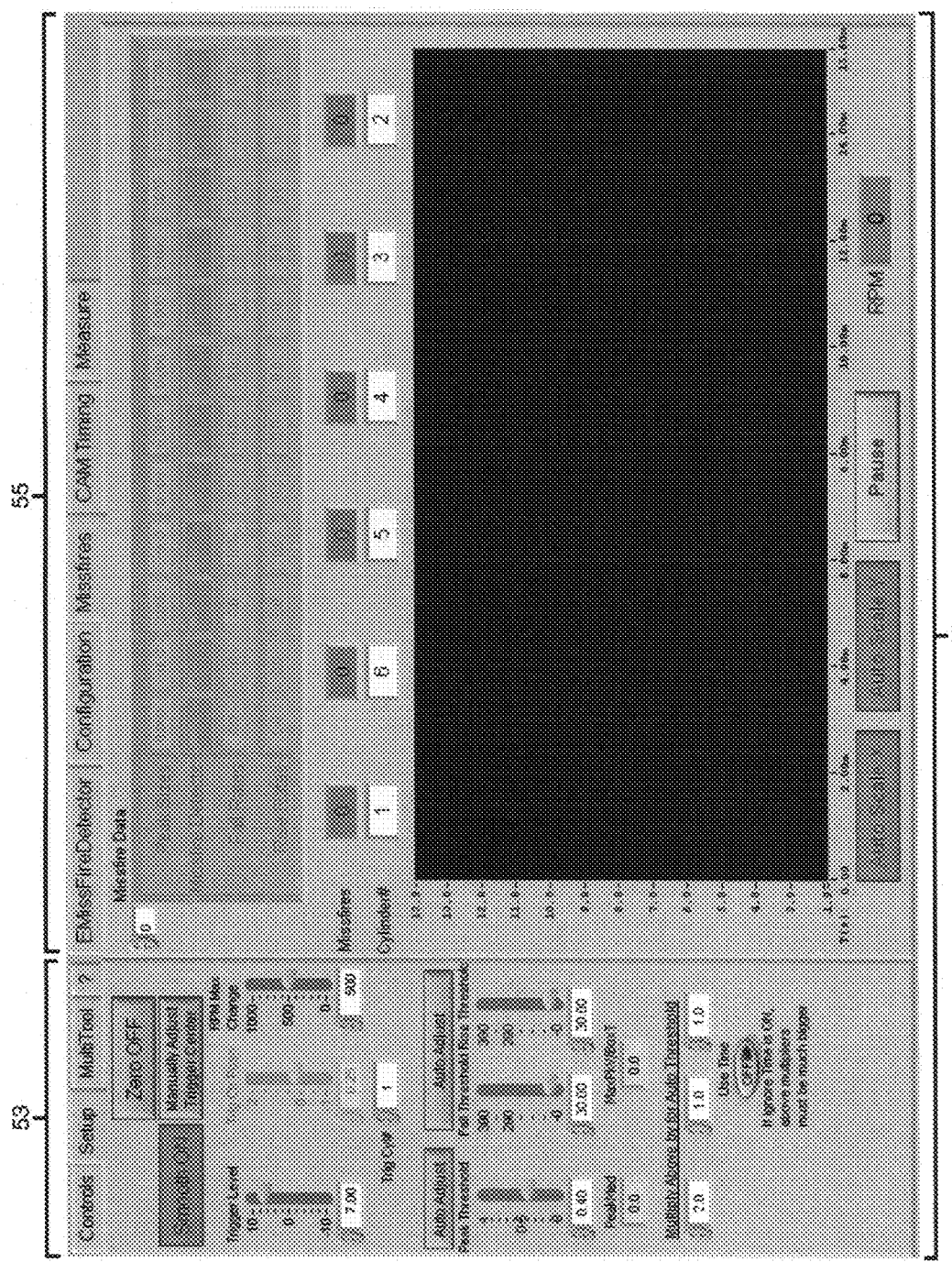
FIG. 2 is a screen display of the present invention illustrating the Setup and Missfires tabs open before a misfire test has started.
Figure 3:
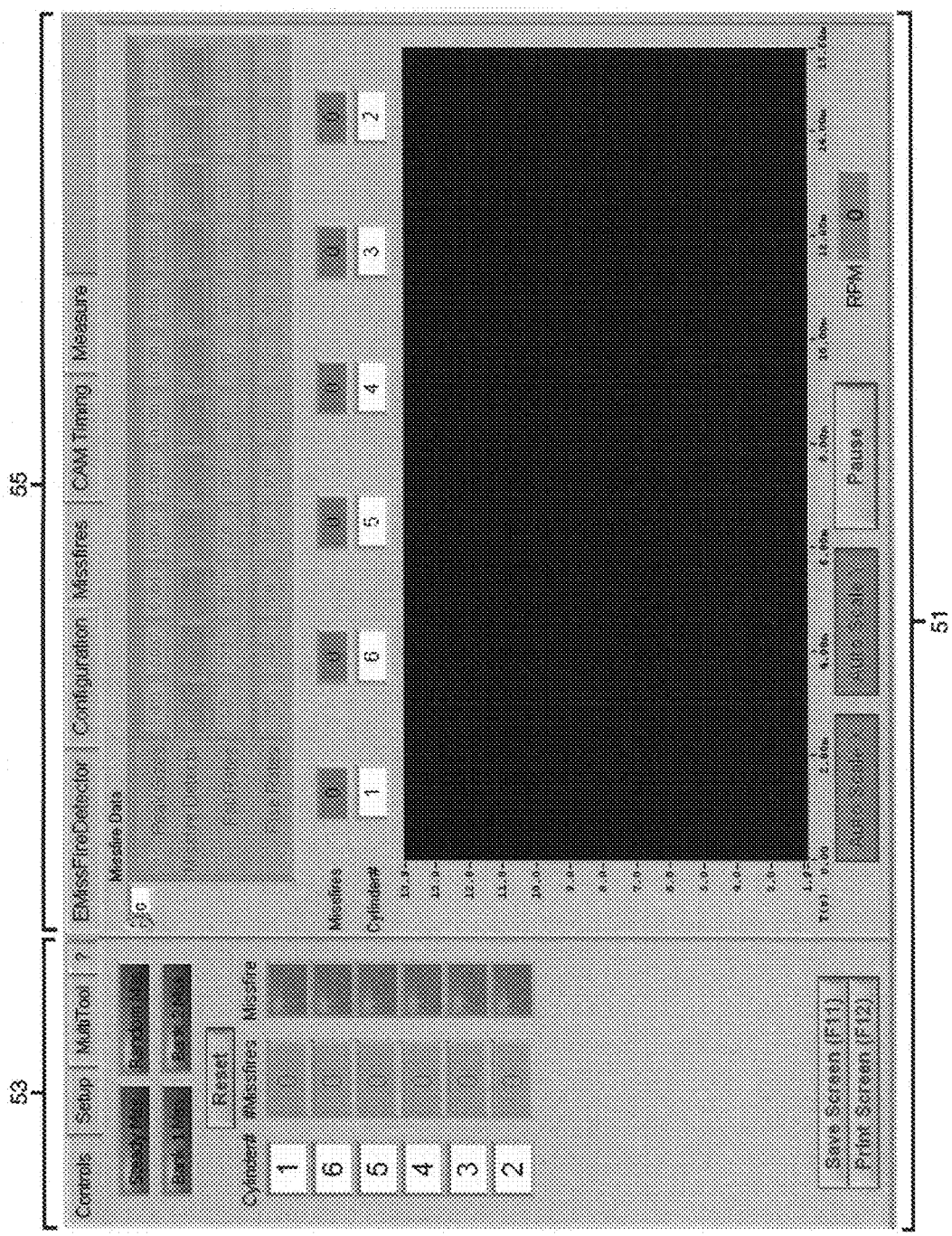
FIG. 3 is a screen display of the present invention illustrating the Controls and Missfires tabs open before a misfire test has started.

The present invention also includes providing, on the screen of computer 15, a number of screen displays (or windows), generally identified as 51. With reference to FIGS. 2 and 3 screen display 51 is divided into two sections, 53 and 55, with section 53 having four screen choices identified by tabs "Controls," "Setup," "MultiTool," and "?". Section 55 has five screen choices identified by tabs "EMissFire Detector," "Configuration," "Missfires," "CAM Timing," and "Measure". (On these tabs misfire is deliberately misspelled (e.g., "Missfire").) As illustrated in FIG. 2, the Setup and Missfires screens (or windows) are opened. In the Setup window the user inputs: the "Trigger Level", which sets the level at which the screen sweep will be activated; trigger center position ("Trig Ctr Posn"), which establishes the position of the cylinder box (as explained below) on the graph in relation to the trigger event and can only be manually adjusted if the "Manually Adjust Trigger Center" button located above is "on" (in which case it will turn from grey to green); "RPM Max Change", which functions as a control to limit the maximum change of RPM allowed before an RPM error is indicated by turning the normally green background of the "RPM" counter, as indicated in the lower right hand corner of window 55 with the Missfires tab open, to red; "Trig Cyl#", which identifies the cylinder to which trigger apparatus 17 is connected; "Peak Threshold" (if "Auto Adjust" is turned off; it is green when activated), which sets the misfire detection threshold; "Fall Threshold" (again if the Auto Adjust is turned off), which sets the rate of the pressure change on the falling edge of the pressure waveform to indicate a misfire; "Rise Threshold" (again if the associated Auto Adjust is turned off), which sets the rate of the pressure change on the rising edge of the pressure waveform to indicate a misfire; and multipliers that are used for the course adjustment of Peak Threshold, Fall Threshold and Rise Threshold (under the heading "Multiply Above by for Auto Threshold") for the manual settings of the three threshold values. In the automatic mode, where the Auto Adjust buttons are "on" (and green), the foregoing thresholds and multipliers are set automatically. See FIGS. 15 and 16. The "Zero" button will change the message located on the button depending on whether the function is on or off. As illustrated in FIG. 2, the button is in the "OFF" position as indicated by the presence of the word OFF and the fact that the button is grey. If the Zero button is selected "on" it will turn green and the words "Zero ON" (not shown) will be visible. When "on" it will take the present pressure reading from sensor 11 and subtract it from all future readings to zero sensor 11. It is also used to zero the pressure transducers. The "Smooth" button will change the message located on the button depending on if the function is on or off. If "on" the button will turn green (as illustrated), the words "Smooth ON" will be visible, and a box car style filter that will smooth the pressure waveforms will be enabled.

In FIG. 3 display 51 is still divided into sections 53 and 55. However, in this case the screen for the Controls tab is visible, illustrating the alert lights "Steady Miss," "Random Miss," "Bank 1 Miss" and "Bank 2 Miss". Also illustrated are columns: "Cylinder#", "# Missfires", and "Missfire" alert lights. (Again, on the screens misfire is deliberately misspelled.) In the case of a 6 cylinder engine, as illustrated in FIGS. 2 and 3, only 6 windows are illustrated. Depending on the number of cylinders in the engine being tested, this number will vary from 3 to 4 to 5 to 6 to 8 to 10 and 12. See, for instance, FIGS. 6 and 21. In FIG. 3, section 53 also includes the "Reset", "Save Screen (F11)," and the "Print Screen (F12)" controls.

As is illustrated in FIGS. 2 and 3, screen section 55 includes a series of windows (up to 12; one for each cylinder of the engine being tested) for "Peak Sizes", "Missfire Detects", "Fall Rates" and "Rise Rates". Also included in screen section 55 are horizontal rows for "Missfires" and "Cylinder#". These two rows provide the same information as the Cylinder# and #Missfires columns in screen section 53. Further, the Missfire lights on screen section 53 and the Missfire Detects lights on screen section 55 are both illuminated only when the associated cylinder is misfiring during the fire cycle that is concurrently being displayed on the chart (or graph) portion of screen 55. If a particular cylinder only has an intermittent miss, the light pairs associated with such cylinder will not be continuously illuminated. The two horizontal rows for Missfires and Cylinder# also expand or contract from the 6 cylinders indicated, depending on the number of cylinders in the engine being tested. See, for instance, FIG. 6. Below the screen are: "Auto Scale X", which allows the X axis to be auto scaled; "Auto Scale Y"; which allows the Y axis to be auto scaled; "Pause", which allows the data on the graph to be paused; and an "RPM" counter which shows the current RPM the engine being tested is running at. The green color for Auto Scale X and Auto Scale Y indicate that both features are activated. In both figures the screen is still blank as no engine is running and no data is being displayed. For the same reason the Peak Sizes, Missfire Detects, Fall Rates and Rise Rates rows are "grayed out", as is the Pause button, and the RPM counter is at "0" in FIGS. 2 and 3.

The Multi Tool screen (not illustrated), is used when interfacing the present invention with other equipment (also not illustrated), such as an emission analyzer and/or ignition analyzer. The ? tab allows the user to access a help screen (not illustrated)

In operation pressure sensor 11 is inserted in the tailpipe 31 of a vehicle which also includes engine 19 having, inter alia, exhaust manifold 33, engine block 35, cylinders 371-6, exhaust ports 391-6 and spark plugs 411-6. Alternately, for CI type engines, there would be fuel injectors (not shown) instead of spark plugs. Finally, illustratively, for purpose of acquiring a triggering signal, apparatus 17 is connected to spark plug 412. Trigger apparatus 17 does not have to be connected to the spark plug (or, in the case of a diesel, to a fuel injector) of the number 1 cylinder of engine 19, just any conveniently accessible one. However, in the manual mode connecting trigger apparatus 17 to the last cylinder (as identified by the engine manufacturer) which fires before 360° of crankshaft rotation after the engine's number 1 cylinder fires is recommended to insure synchronization. In the manual mode attaching trigger apparatus 17 to another cylinder will work, but synchronization errors are more likely. In contrast, in the automated mode trigger apparatus 17 can be associated with any cylinder as the methodology of the present invention will automatically configure the correct placement of the exhaust pressure pulse (or exhaust pulse) based on the engine configuration (i.e., the number of cylinders and firing order) and cylinder to which trigger apparatus 17 is connected (via, for instance, the spark plug wire). In the automated mode the Trig Cyl# (as illustrated in, for instance, the Setup window illustrated in FIG. 2) allows the technician to choose a different cylinder than cylinder # 1 to attach trigger apparatus 17. This will adjust the Trig Ctr Posn as follows: Trig Ctr Posn=Trig Ctr Posn+number of cylinders the chosen cylinder is away from cylinder # 1. For example, in an engine with a firing order of 1-2-3-4-5-6, if Trig Ctr Posn=0.25 and the Trig Cyl# is set to 3 then Trig Ctr Posn=0.25+2=2.25.

The misfire detection system of the present invention, whether operating in the manual or automatic mode, works off of the pressure that is created during the reaction of the fuel burning in each of cylinders 37. If the fuel burns correctly in a cylinder there will be additional pressure in such cylinder from this chemical reaction. Just prior to the exhaust valve (not shown) closing, a high pressure wave will move out of the cylinder to the lower pressure in the vehicle's exhaust system with force. This high pressure wave is read by the pressure sensor 11. Conversely, lack of combustion in a cylinder 37 creates a low pressure wave on the exhaust stroke that is also read by pressure sensor 11. These pulses (whether high or low) are transmitted to A/D converter 13 in the form of analog voltage signals where they are converted to digital binary code that is then input to computer 15. (As explained below, in both the manual and automatic modes these exhaust pulses are put in time (i.e., synchronized) with the associated cylinders.)

When ignition discharge occurs both valves, intake and exhaust, of the associated cylinder are in the closed position. The piston then travels down on the power stroke to the bottom dead center point (BDC) (a rotation of 180° of the crankshaft of engine 19). The exhaust valve opens and the piston starts its exhaust stroke and travels back to top dead center (TDC), another 180° rotation of the crankshaft. Thus, from the point the ignition occurred in the cylinder to the end of the exhaust stroke is, approximately, equal to 360°. Approximately is used here because the opening of the exhaust valve does not occur at exactly BDC and exhaust valve closing does not occur at exactly TDC. See FIG. 22. In its most basic form, synchronization of the exhaust pulse with the cylinder ignition that initiated the pulse requires that trigger apparatus 17 be connected to the last cylinder that, in terms of crankshaft rotation, has ignition before such 360° of rotation. An example would be a 4 cylinder engine with a firing order or 1-3-4-2. Putting cylinder 1 and cylinder 3 together equals 360° of crankshaft rotation from the number 1 ignition discharge to the number 3 ignition discharge. Thus, in this case the trigger would be placed on the number 3 ignition wire. This in turn would set the exhaust pulse event for the number 1 cylinder with the trigger signal from the number 3 cylinder.

Figure 4:
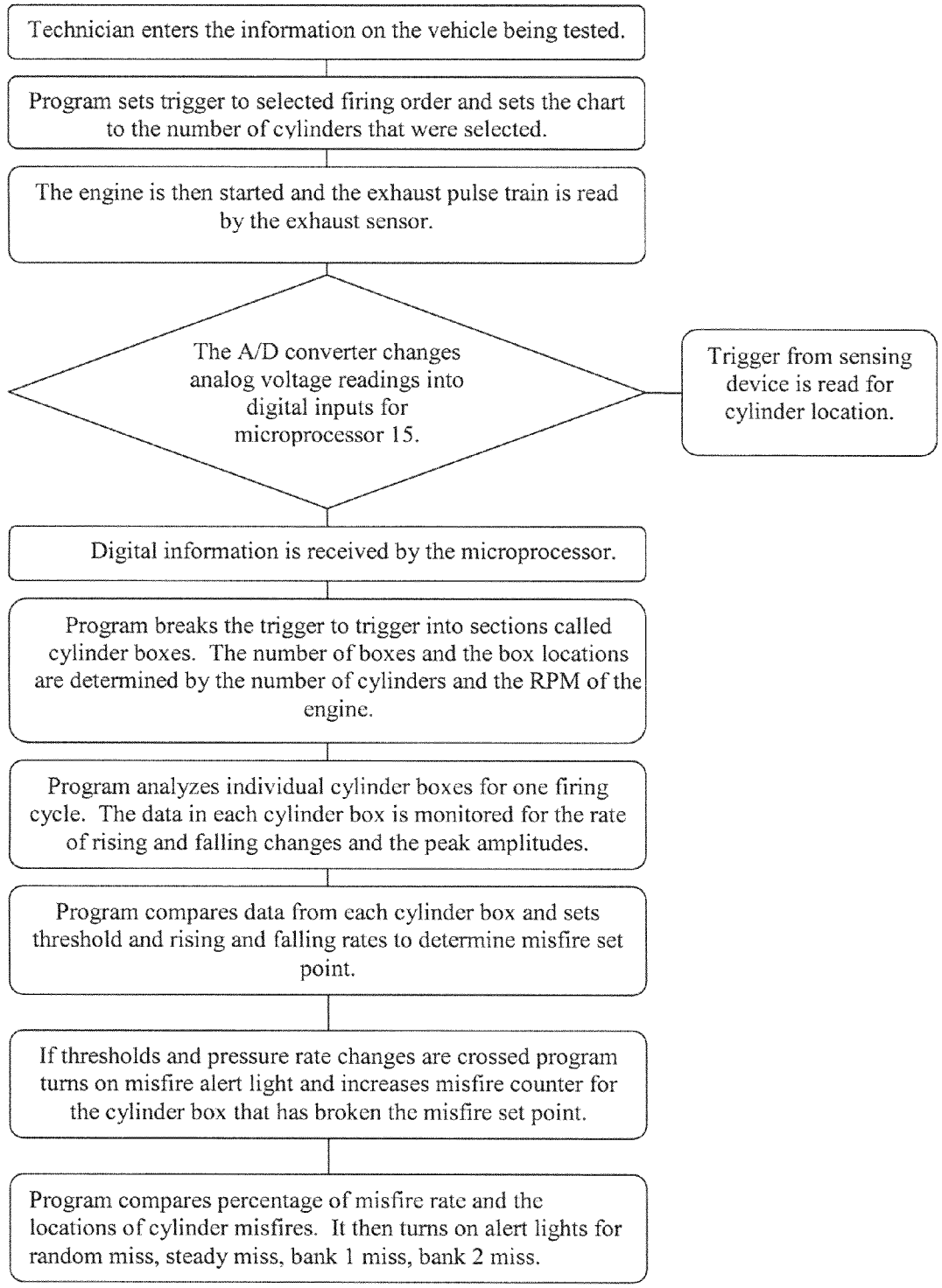
FIG. 4 is a flow chart illustrating the overall operational sequence of the present invention.

The basic operational steps of the misfire detection system of the present invention are illustrated in FIG. 4. Once pressure sensor 11 is inserted in tailpipe 31 and trigger apparatus 17 connected to a particular cylinder, the user (e.g., automotive technician) enters the required information on the engine being tested (number of cylinders and firing order), as more fully explained below in reference to FIG. 5. This sets the screen display (window 55 with the Configuration tab open) to the number of cylinders and firing order that was selected. Engine 19 is then started and the exhaust pulses (or exhaust pulse train) are read by pressure sensor 11. The trigger signal from apparatus 17 is also read for cylinder location. Both signals are sent to A/D converter 13 where the analog voltage readings are converted to digital inputs and transmitted to computer 15. Once the trigger signal is read for cylinder location, the time from one trigger signal to the next is divided by the number of cylinders to obtain chart (or graph) sections called "cylinder boxes". (These cylinder boxes are also sometimes referred to as "cells" or "divisions".) With the 4 cylinder engine identified in FIG. 5, there will be 4 cylinder boxes, as indicated by the graph in FIG. 6. While the number of cylinder boxes is determined by the number of cylinders in the engine being tested, the positioning of such boxes relative to the cylinder number (again, as identified by the engine manufacturer) is determined by the location of trigger apparatus 17 (i.e., the cylinder to which it is connected), the RPM of the engine and the number of cylinders (both as discussed below). Once the number of cylinder boxes is determined and each box is synchronized to the correct cylinder, the data in each cylinder box is monitored for the rate of rising and falling pressure changes and the peak amplitudes. The rising rate of pressure change for each cylinder box is indicated in the Rise Rate row of boxes if the associated cylinder is misfiring, such as illustrated for cylinder # 4 in FIG. 6. Similarly, the rate at which the pressure falls in a misfiring cylinder is indicated by the associated Fall Rate box, again such as illustrated in FIG. 6. Peak amplitude for each cylinder is indicated in the associated Peak Sizes box. After the waveform in each cylinder box is analyzed for the rate of rising and falling pressure changes and peak amplitudes, the data from all the cylinder boxes is compared and thresholds (or set points) are determined for the rising and falling rates and the peak amplitude. The data for each cylinder box is then compared to the thresholds. If, for any cylinder, at least two of the three thresholds are exceeded, the misfire alert lights for such cylinder are turned on. The misfire analysis for each cylinder is:

Find Valley (negative peak);
Find FWHM of Valley (half height, full width of valley);
Peak Size=Height of Valley (units are "H20);
Fall Rate=Rate in "H20/sec that valley falls from FWHM to bottom of valley; and
Rise Rate=Rate in "H20/sec that valley rises from bottom of valley to FWHM. A misfire is detected if at least two of the following are true:
Peak Size>Peak Threshold
Fall Rate>Fall Rate Threshold
Rise Rate>Rise Rate Threshold The misfire, as identified above, is also registered on the associated misfire counter on the Controls and Missfire screens. As continuously streaming data is being analyzed, misfires in each subsequent fire cycle (whether the same cylinder or another cylinder or both) are counted as they occur. The percentage of misfire rate and the location(s) of the cylinder misfires are then analyzed. Alert lights (as identified on the Controls screen) are then illuminated depending on number of cylinders missing and the type of miss (i.e., Random Miss, Steady Miss, Bank 1 Miss, Bank 2 Miss).

When using the ignition to set the timing there is a delay between the ignition of the fuel and the pressure wave or pulse emitted at the exhaust pipe where pressure sensor 11 is located. The spark occurs, igniting the air/fuel mixture. As discussed above, the piston is close to the top of its stroke and must move downward, close to the bottom of the stroke, before the exhaust valve opens to start releasing the cylinder pressure into the exhaust. This pressure wave travels through the exhaust piping, catalytic converter, and muffler before exiting to the atmosphere. As there is very little backpressure in the exhaust system the exhaust pressure wave has a small transport delay between the time the exhaust valve opens and the pressure wave exits to the atmosphere. For a 4 cylinder engine at idle the time between exhaust valve opening and exit from the tail pipe takes about 23 ms. (It is believed that this time delay varies due to such factors as the exhaust system configuration and condition.) As the RPM of the engine increases the exhaust pulse delay from the ignition signal decreases. The result is that the exhaust pulse drifts away from the associated trigger signal. At 2500 RPM this drift can be as much as the cycles for 2 cylinders, equivalent to 2 cylinder boxes. Thus, to accurately determine which cylinder is misfiring, the cylinder boxes will have to be delayed to synchronize the exhaust pulse created by the cylinder. This is accomplished by moving the cylinder box locations depending on the RPM the engine is running at and, also, the number of cylinders.

For the correct analysis of the waveform pulse in each cylinder box, each cylinder ignition must be synchronized to the associated pressure pulse as it exits the exhaust system. Because the present invention examines the rate of pressure rise, the rate of pressure fall and the peak size, correct analysis also requires that that the peak and at least one of the rising portion of the waveform and the falling portion fall within the cylinder box (or cell) associated with the ignition that generated the pulse. Associating the wrong cylinder with a particular waveform pulse will obviously result in misdiagnosis. Further, misalignment between a misfiring cylinder and its associated cell may also result in misdiagnosis. For this reason it is desirable to center the peak in its correct cell. Centering also accommodates for a range of exhaust pulse delays around the expected time delay. This is more fully explained below (e.g., paragraph [00106]) in conjunction with the venturi design disclosed in co-pending application Ser. No. 11/879,565.

Figure 5:
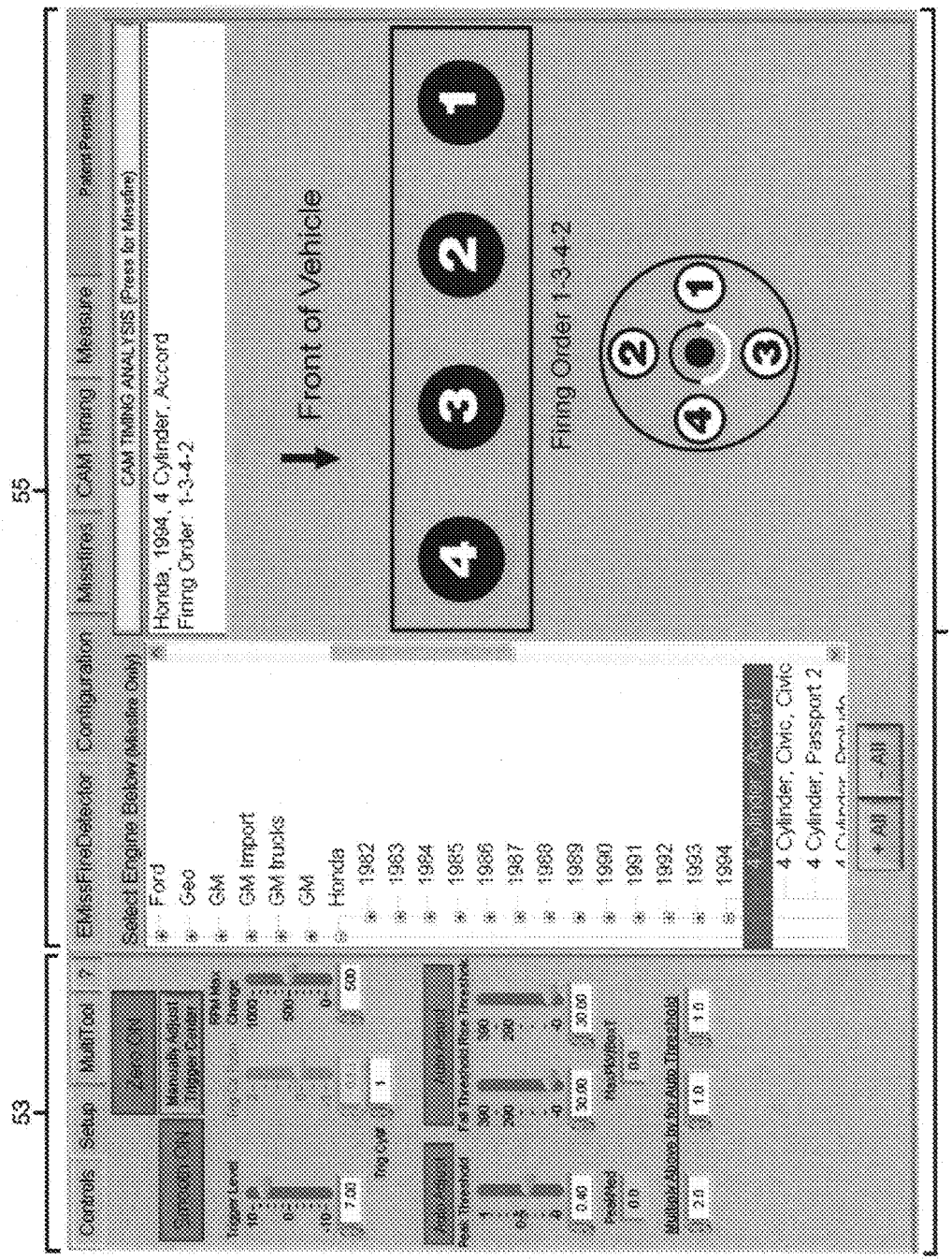
FIG. 5 is a screen display of the present invention illustrating the Configuration and Setup tabs opened.
Figure 6:
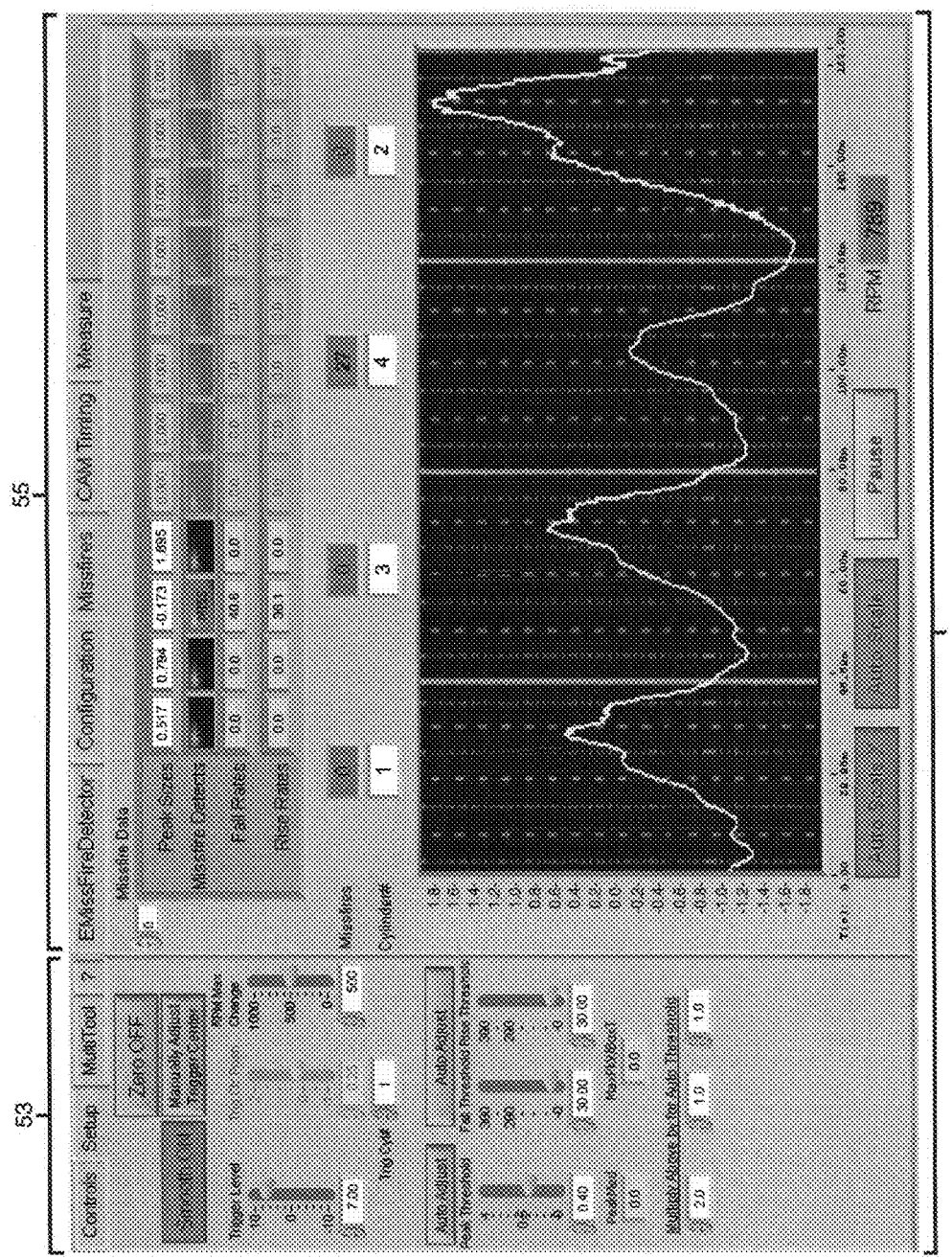
FIG. 6 is a screen display showing the Setup and Missfires tabs opened and with test data being collected with a basic pressure transducer (as hereinafter defined) on a running 4 cylinder engine with one misfire.

In FIG. 5 the Configuration tab of screen section 55 is open to illustrate the configuration of the engine being tested and the cylinder firing sequence. The firing order can be manually entered or, as illustrated, picked from a drop down list of specific vehicle engines and firing orders. If the user picks the engine from the list there is less chance of an error occurring while entering information. Once the engine is selected (in this case a Honda, 1994, 4 cylinder, Accord) the information is displayed together with the associated firing order. The orientation of the engine relative to the front of the vehicle and the number location of the cylinders is also displayed, as is the distributor. Clicking on the button displaying "CAM TIMING ANALYSIS (Press for Missfire)" allows the user to change between four screens: misfire analysis; cam timing which is a subset of cylinder pressure analysis (as explained below); intake vacuum analysis (as explained below); and crank case pressure analysis (as also explained below). Once the analysis method is selected the correct pressure transducer scale is automatically loaded and zeroed for the correct pressure transducer. If the CAM TIMING ANALYSIS is selected for a gasoline engine a 300 psi transducer will automatically load. The 0.5 volt reading from this transducer will automatically be zeroed. Next the correct conversion factor to convert the voltage reading to a pressure reading is selected. The factors are set forth below in Table I.

TABLE I

| Transducer | Typical Voltage Offset | Conversion Multiplier |
|---|---|---|
| 20" H$_2$O (Tail Pipe Sensor) | 2.25 V | pos values (H$_2$O × 0.1) + 2.25 = voltage<br>neg values 2.25 − (H$_2$O × 0.1) = voltage |
| −30" HG | 0.50 V | voltage × 7.5 = "HG |
| 300 PSI | 0.50 V | voltage × 75 = PSI |
| 500 PSI | 0.50 V | voltage × 125 = PSI |
| 5000 PSI | 0.50 V | voltage × 1250 = PSI |

In FIG. 6, the data for the four-cylinder engine Honda engine identified in FIG. 5, with a single misfire associated with cylinder 4 is illustrated. A basic pressure transducer was used. The setup information is set to automatically adjust the settings for the engine being tested. As indicated above, in the automated mode, the technician can choose any convenient cylinder, so long as it correctly identified on the Setup screen, as illustrated in FIG. 5. (For some engines, the cylinder which the manufacturer identifies as 1 for the purposes of firing order is not readily accessible.) If the trigger signal from the chosen cylinder is erratic the RPM window will change from green to red and the data that is being processed will not be sampled while the signal is erratic. This insures that only accurate data is displayed on the misfire chart and graph and used to identify misfires. If the RPM display stays red the user will be instructed to move trigger apparatus to another cylinder.

With reference to the graph on the Missfires screen illustrated in FIG. 6, four cylinder boxes (one for the graph of each cylinder) are clearly illustrated. Above the graph, section 55 has a display to indicate which cylinder (or cylinders) are misfiring (in this case just the cylinder 4) and how frequently. Section 55 also displays the Peak Sizes for each individual cylinder and the Fall Rates and Rise Rates for the misfiring cylinder. By analyzing the Peak Sizes, Fall Rates and Rise Rates data in the manner set forth above, the random misfire in cylinder 4 is correctly identified.

Figure 7:
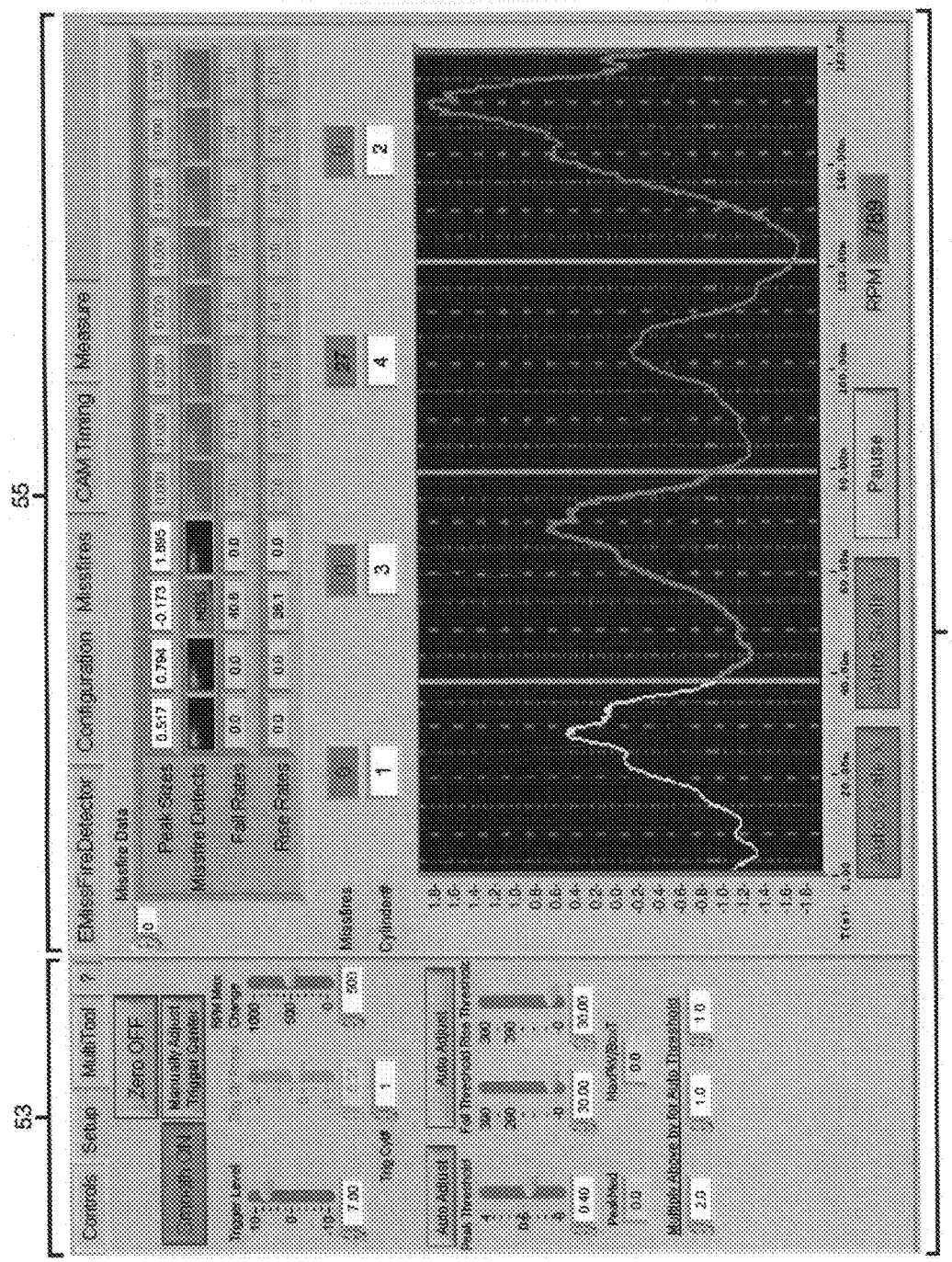
FIG. 7 is a screen display like that of FIG. 6, but with the graphs for each cylinder illustrated in a different color for purposes of explanation.

The information illustrated in FIG. 7 is the same as that illustrated in FIG. 6. The data illustrated in section 55 is identical, as are the graphs. However, for the purpose of further explaining this embodiment of the invention, the graph for each cylinder box is in a different color. These graphs are superimposed on each other in FIG. 8. To further demonstrate how this embodiment identifies a misfire FIG. 9 illustrates the high and low points of each graph (the blue dots indicate this information for the 4th, misfiring cylinder). As is evident from this figure, the high point of the graph for the number 4 cylinder is different time wise from the high points for the other cylinders. The percentage difference and the rate of change of the exhaust pressure in this cylinder is an indication of a misfire. Further, as is even more evident from this FIG. 9, the low point for the number 4 cylinder is way out of position (i.e., time) vis-á-vis the others. Here the percentage difference is clearly evident to the naked eye.

Figure 10:
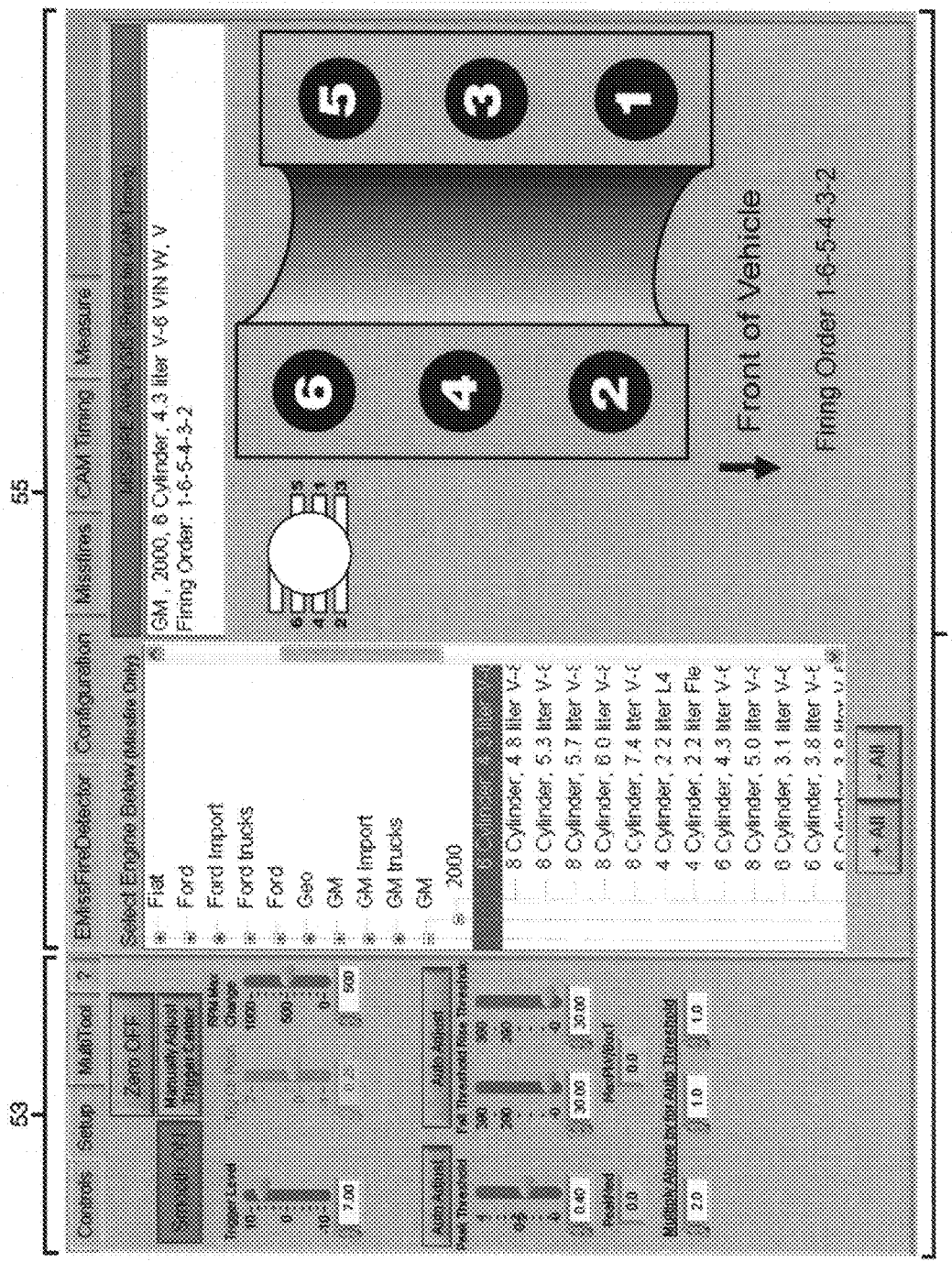
FIG. 10 is an example of the Setup and Configuration tabs open, with the Configuration screen showing the configuration and firing order of a GM V-6 engine.
Figure 11:
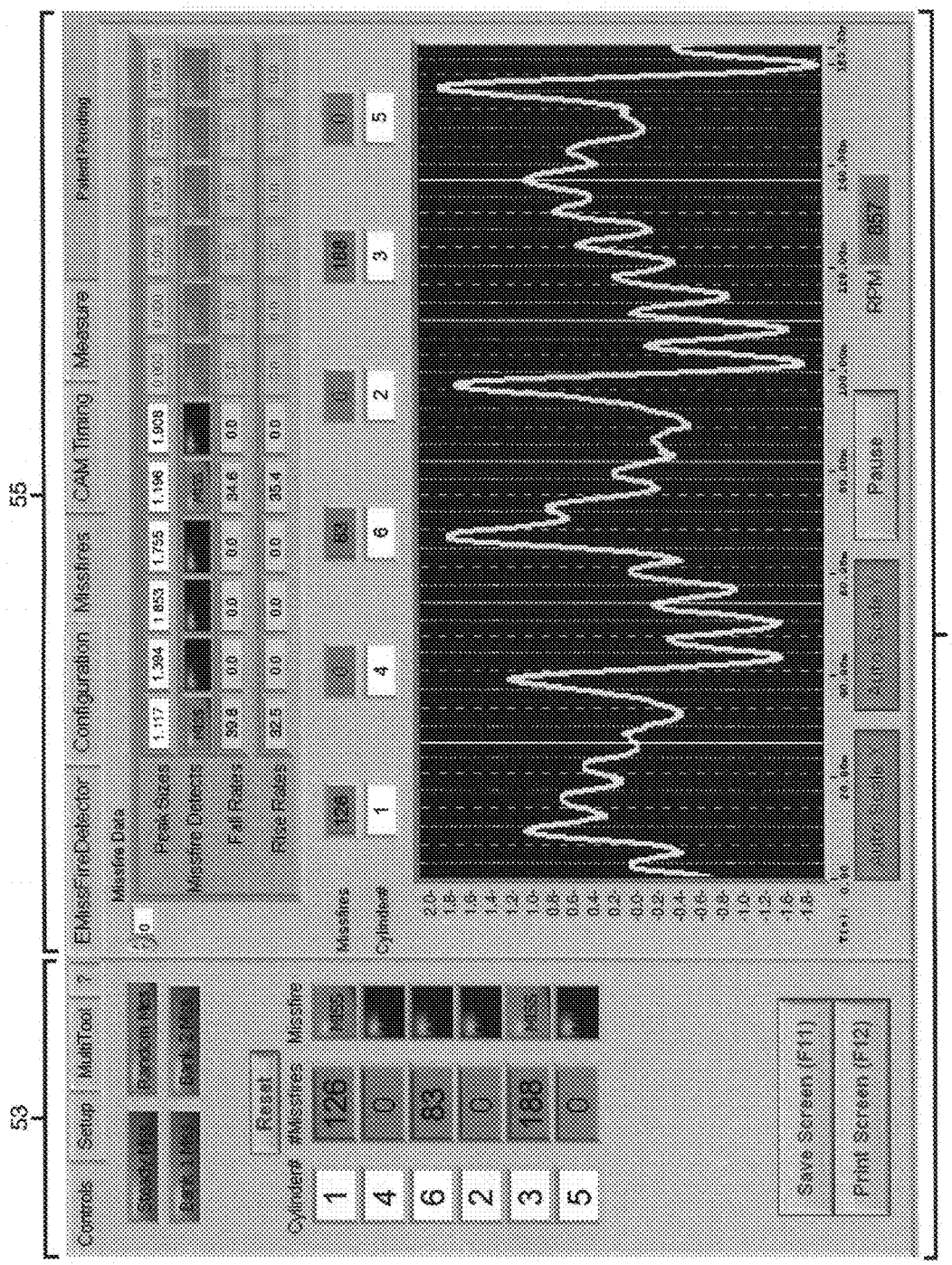
FIG. 11 shows the screen display with test data being collected with a basic pressure transducer from the running V-6 engine of FIG. 10, with multiple misfires occurring during the same fire cycle.

FIG. 10 shows screens 53 and 55 opened to the Setup and Configuration tabs in preparation for testing a GM, 2000, 6 cylinder, 4.3 liter V-6 engine for misfires. As with regard to the discussion of FIG. 6, once the correct engine is selected from the drop down window the engine configuration, cylinder location and firing order is correctly displayed. The distributor is also displayed (between the drop down window and the representation of the engine configuration). With reference to the graph in FIG. 11, the cylinder boxes of each cylinder showing the associated pressure waves are illustrated. With further reference to the Missfires screen: the Peak Sizes for each cylinder are identified; the Missfire Detects windows are illuminated for the 1st, 6th and 3rd cylinders; and the Fall Rates and Rise Rates for each cylinder are displayed. In the Missfires row (between the Rise Rates row and the Cylinder # row) the misfiring cylinders are again identified, together with the number of misfires detected. When a particular cylinder misfires (i.e., 1, 3 and 6) the associated misfire counter increases by one count for each detected misfire. If, as illustrated in FIG. 11, section 53, Controls, there are several misfires occurring and the events are not isolated to one bank or the other, the "RANDOM MISS" light is illuminated. If there are several misfire events on the same bank then a lamp for that misfiring engine bank is illuminated.

Figure 8:
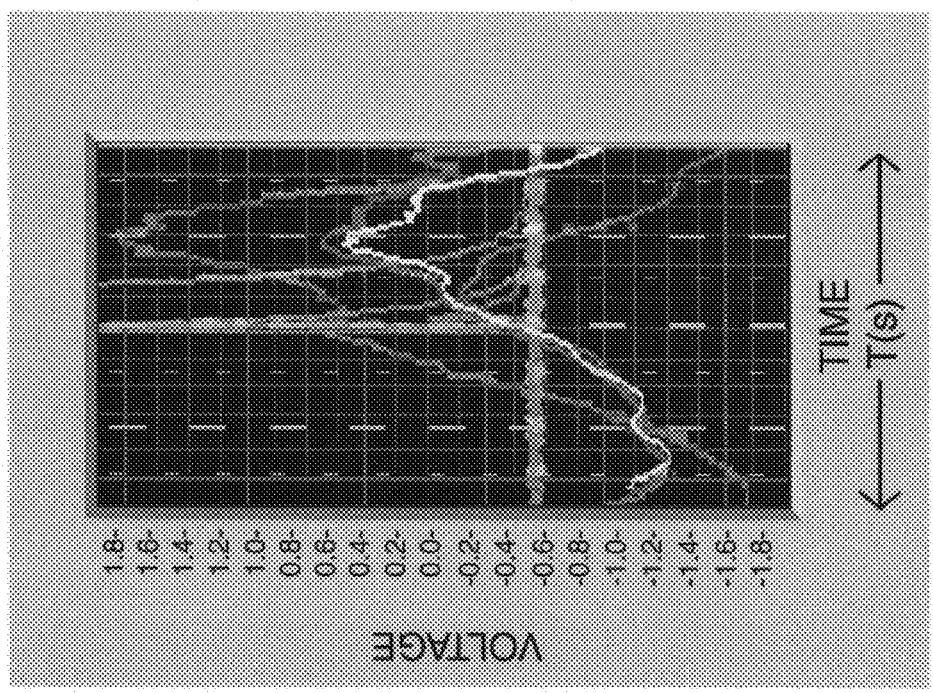
FIG. 8 shows, in color, the graphs of FIG. 7 superimposed on each other.
Figure 9:
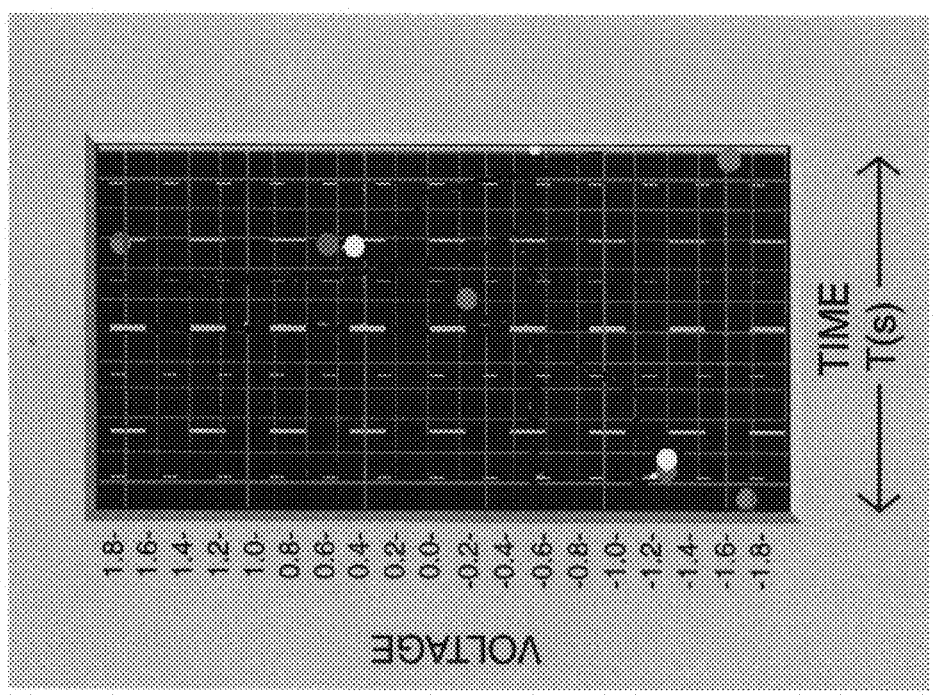
FIG. 9 shows, in color, the high and low points for each of the graphs illustrated in FIGS. 7 and 8, and the associated time spacing.
Figure 12:
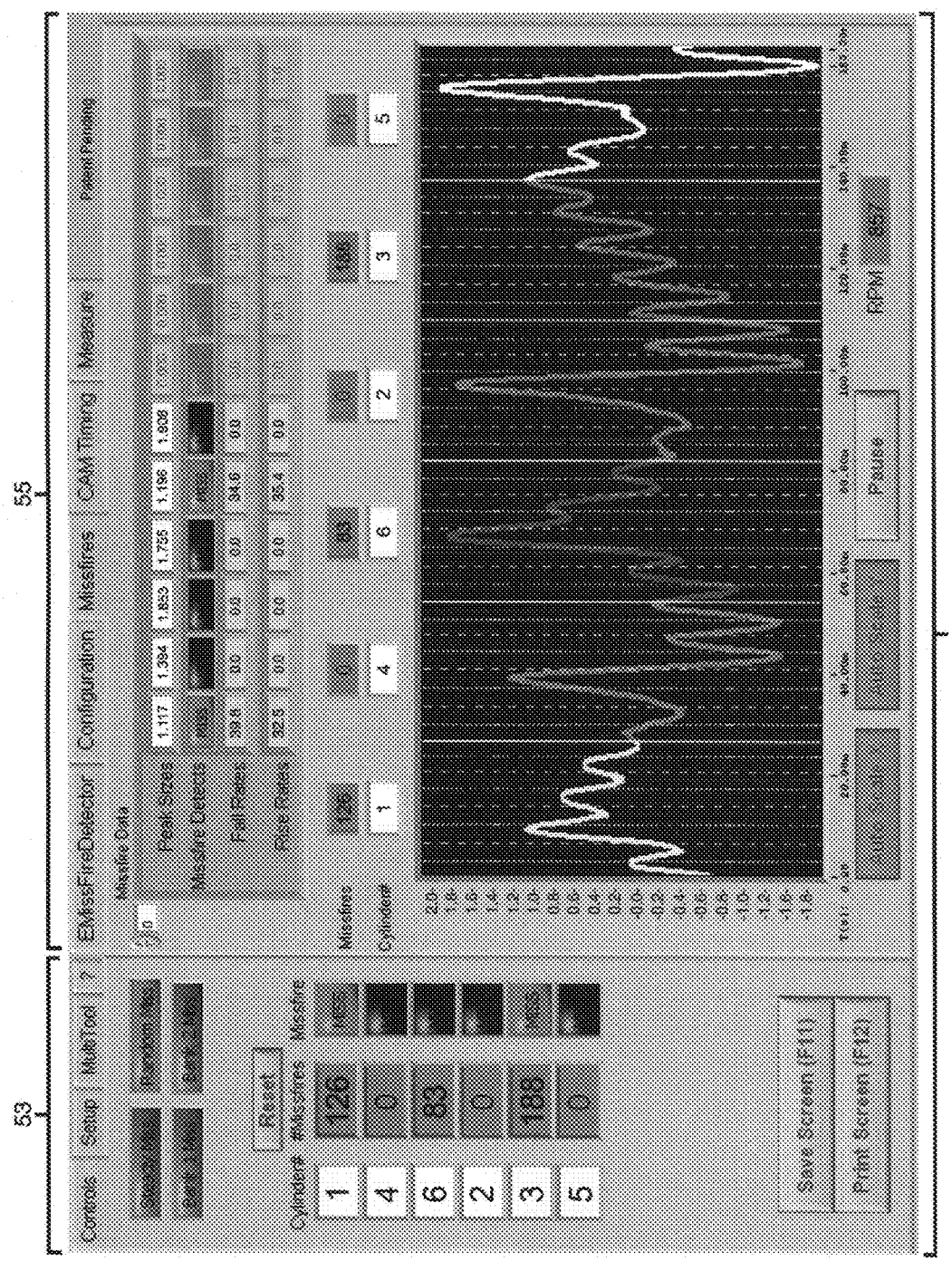
FIGS. 12-14 show, for the V-6 engine of FIG. 10, the same type of information as illustrated in FIGS. 7-9.
Figure 13:
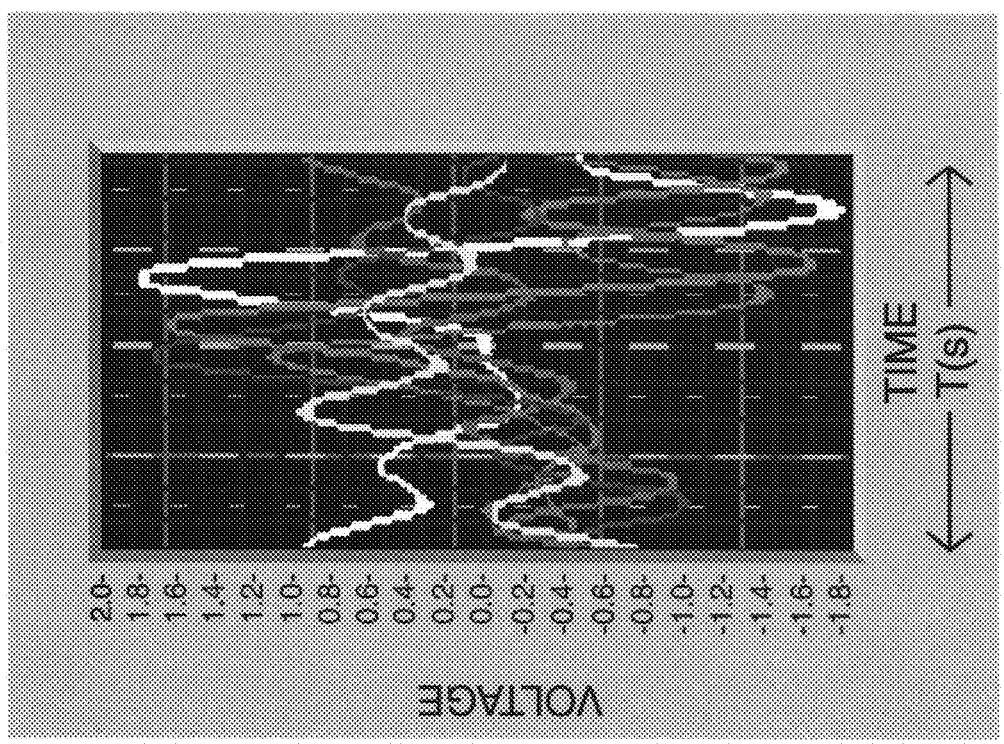
Figure 14:
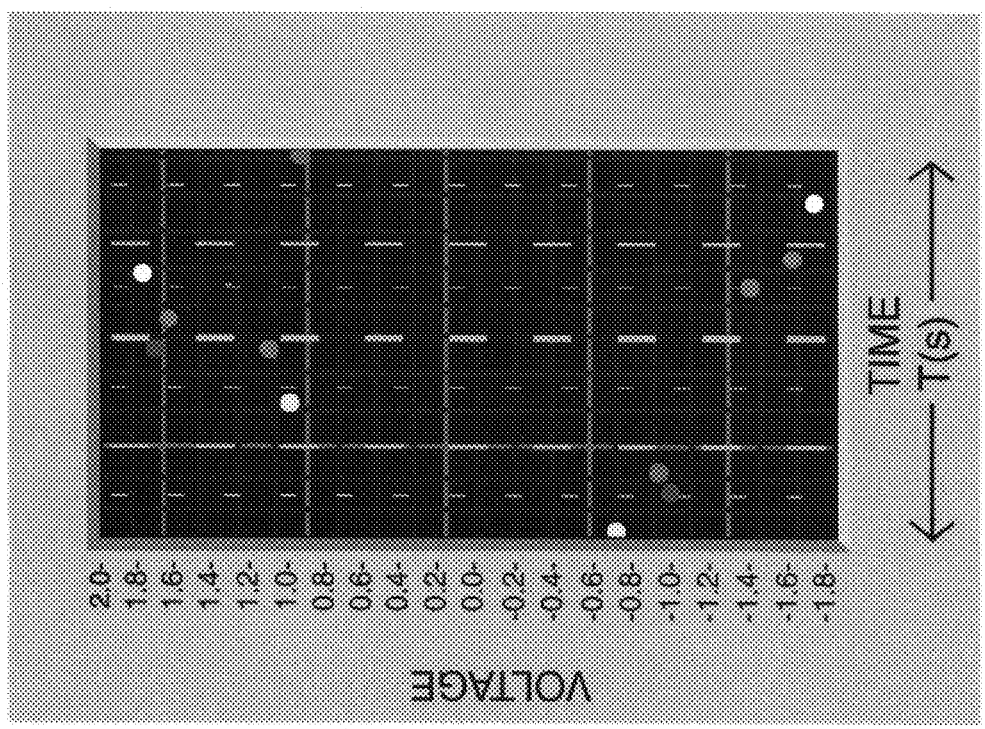

FIGS. 12-14 illustrate the same type of information for the six cylinder engine of FIG. 10 as FIGS. 7-9 illustrate for the previously described 4 cylinder engine. The graphs for each cylinder are indicated in different colors in FIG. 12. These same graphs are superimposed in FIG. 13. Finally, FIG. 14 illustrates the high and low points of each cylinder. Though not as obvious because there are multiple misfires, the same analysis set forth above with regard to FIG. 9 applies.

Figure 15:
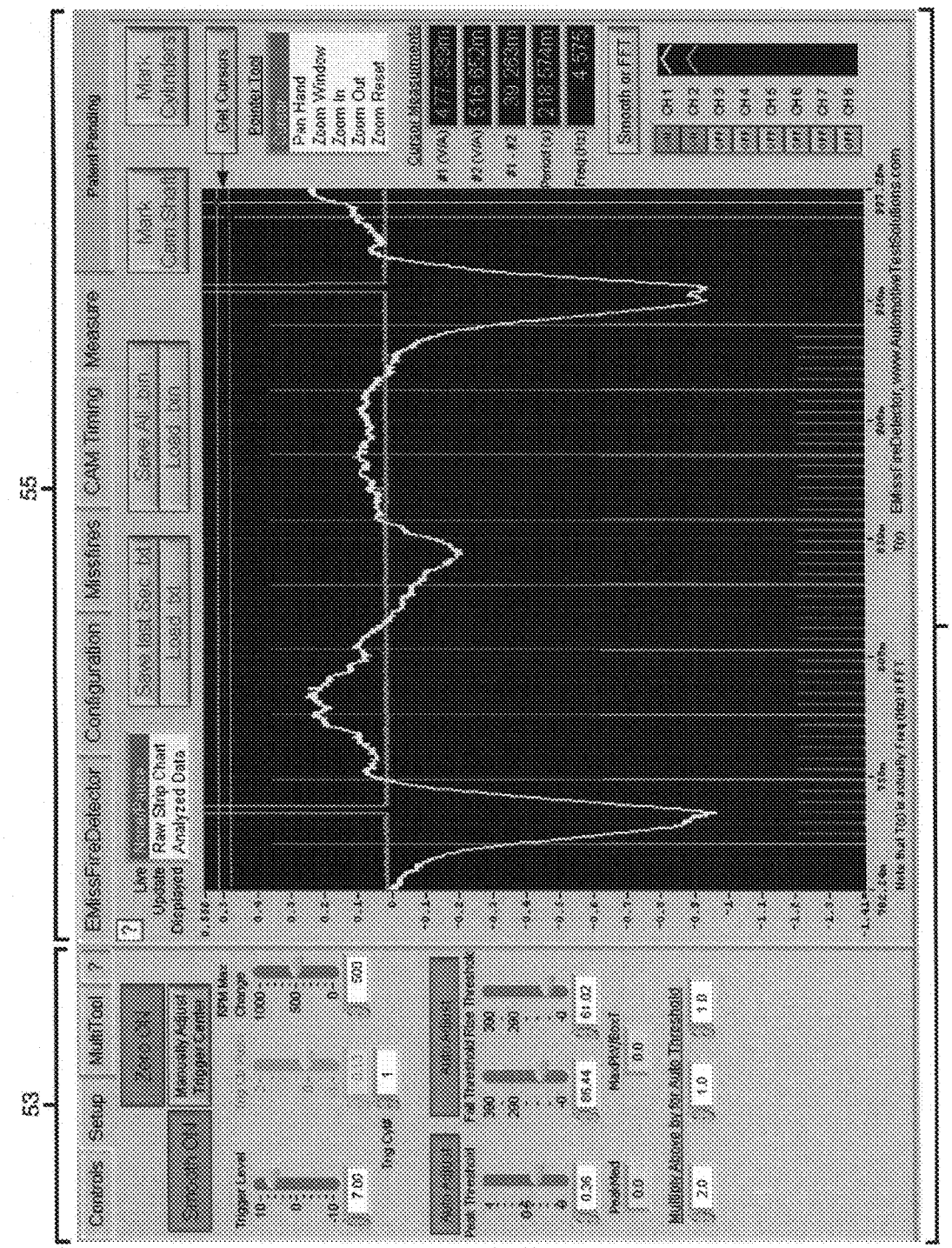
FIG. 15 illustrates the ATS Venturi Amplifier on a 1999 GMC 5.3 liter engine with a misfire on cylinder #1.
Figure 16:
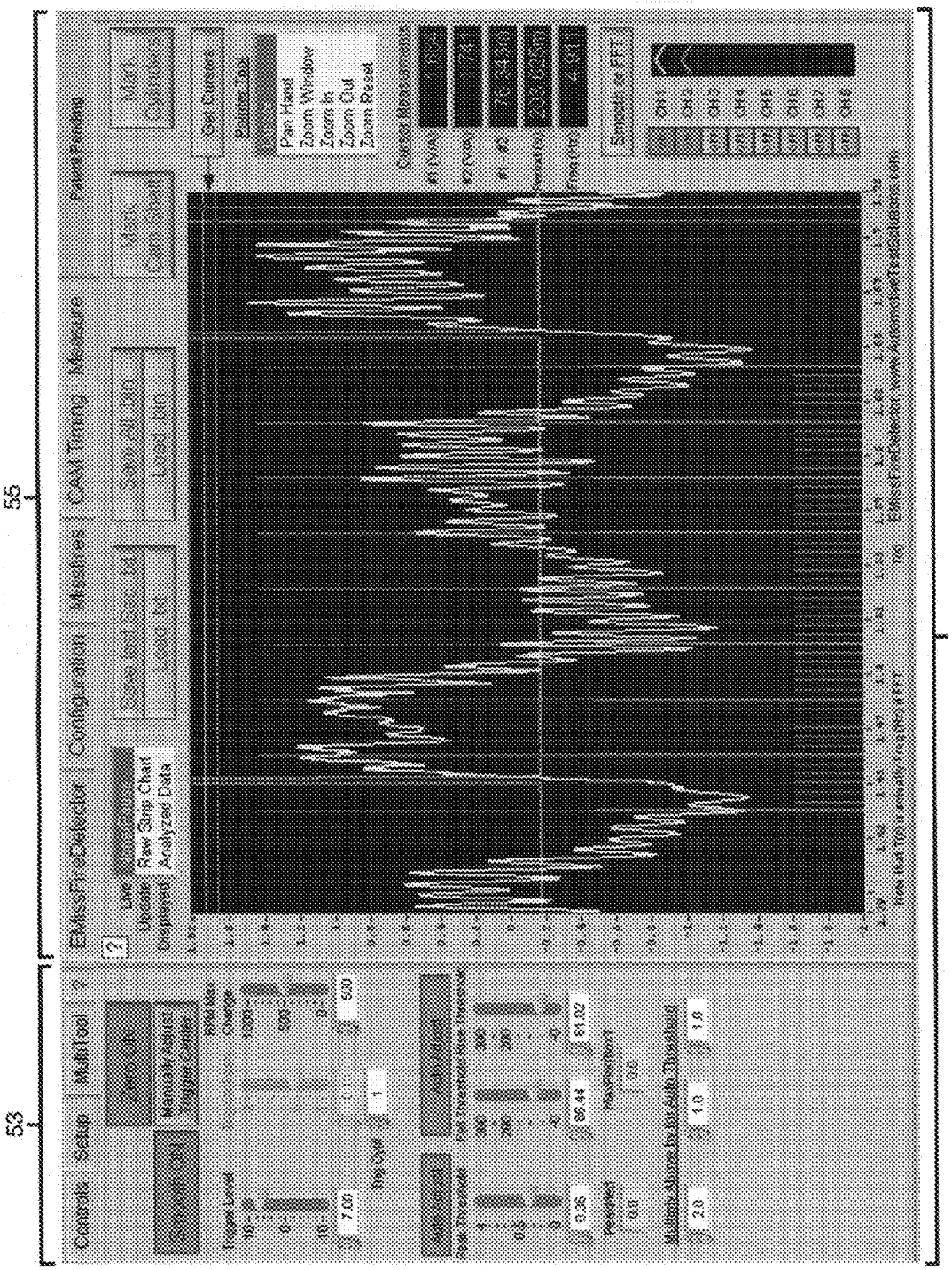
FIG. 16 illustrates the SenX sensor on the same 1999 GMC 5.3 liter engine with the same misfire on cylinder #1.
Figure 17:
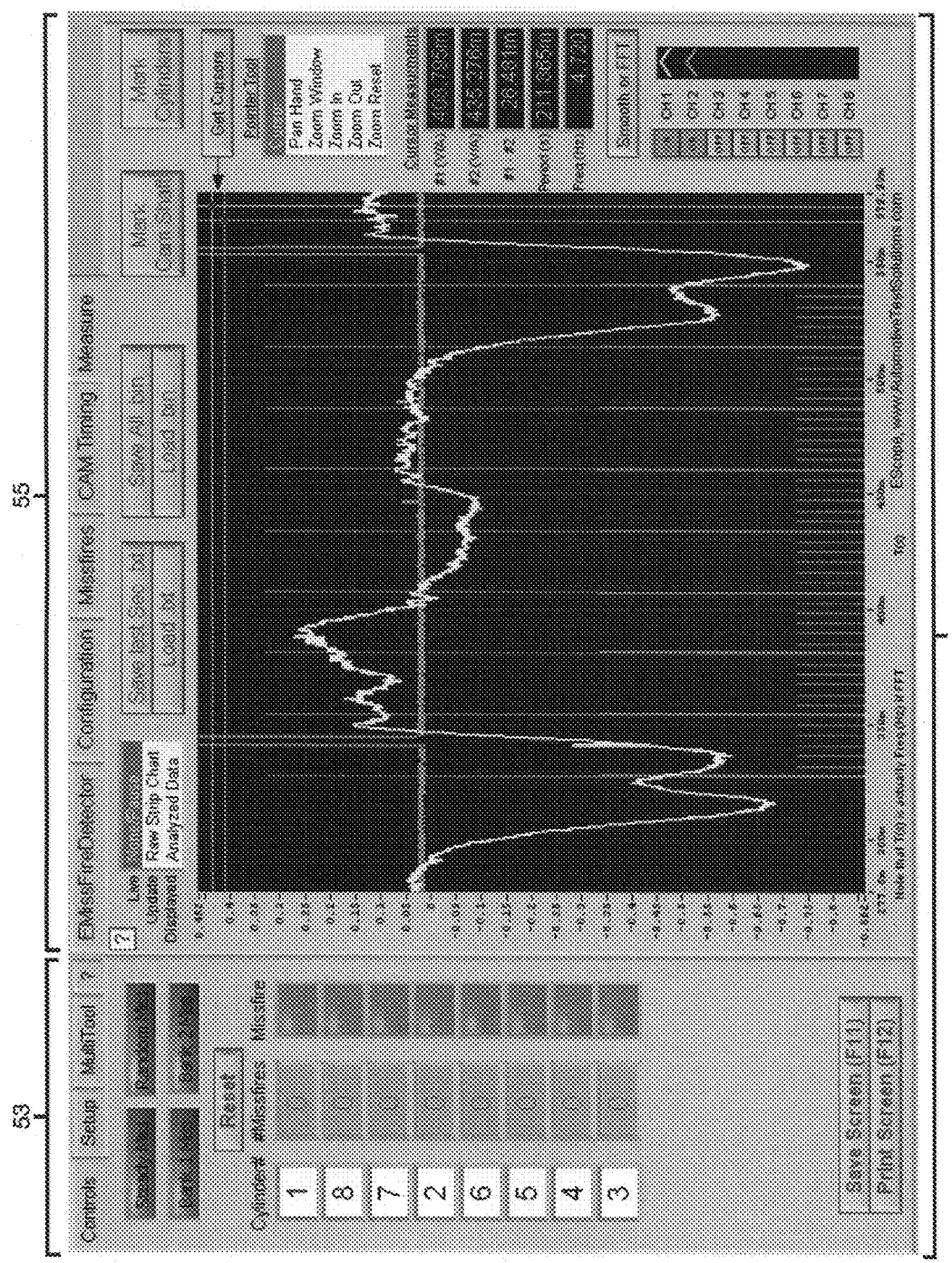
FIG. 17 illustrates the ATS Venturi Amplifier on the same 1999 GMC 5.3 liter engine with misfires on cylinders #1 and #3.
Figure 18:
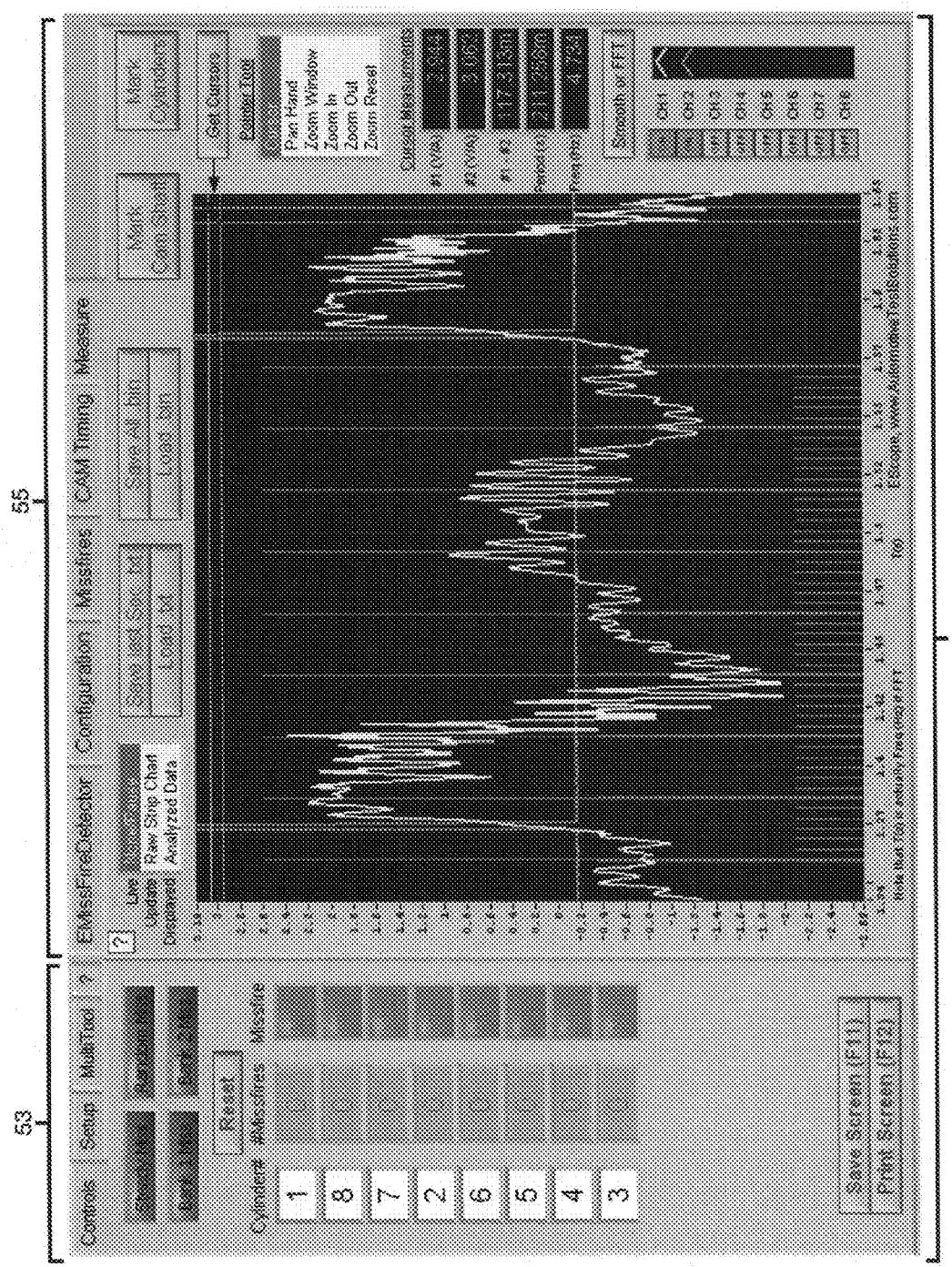
FIG. 18 illustrates the SenX sensor on the same 1999 GMC 5.3 liter engine with the same misfires on cylinders #1 and #3.

In the preferred embodiment of the invention the venturi amplified sensor disclosed and claimed in co-pending U.S. patent application Ser. No. 11/879,565 (the "ATS Venturi") is used to produce a more usable waveform. With the ATS Venturi sensor a pressure transducer is still used but it is connected into the venturi instead of directly into the tailpipe. The foregoing is demonstrated by FIGS. 15-18 which illustrates data taken from a 2000 GM 5.3 liter engine running at idle. With the "Measure" tab on screen 55 open, FIG. 15 shows the ATS Venturi waveform with cylinder 1 missing. FIG. 16 shows the SenX waveform with same cylinder 1 missing. FIG. 17 shows the ATS Venturi waveform with cylinders 1 and 3 missing. (cylinder 1 and cylinder 3 are cylinders that fire in sequence as can be seen by the firing order 1-8-7-2-6-5-4-3.) FIG. 18 shows the SenX waveform with same cylinders 1 and 3 missing. Because of the waveform from the SenX pressure sensor the misfire in cylinder 3 cannot be detected. This occurs at the 8th division (or cylinder box). In this case neither the amplitude nor the rise time of the SenX signal is adequate to permit detection of this misfire.

The data from FIGS. 15-18 is displayed on screen 55 with the "Measure" tab open. The screen allows the technician to view pressure waveform data and mark data for analysis. On the upper left side of the screen the type of "Live Update Displayed" is selected. "None/Pause" will stop the acquisition of data allowing the technician to zoom in or zoom out on the acquired data and mark this data. "Raw Strip Chart" will show the data that is currently being acquired and will be displayed on the screen. "Analyzed Data" will show live trigger to trigger events while being marked by either the cylinder box locations (as illustrated) or the cylinder stroke locations (as indicated in, for instance, FIG. 29). "Save last Sec.txt" button will save the last second of acquired data in a text file format. "Load.txt" button will allow the user to load the text files from the saved file folder. "Save All.bin" button will save the last 20 seconds of acquired data in a binary file format. "Load.bin" button will allow the user to load the binary files from the saved file folder. "Mark Cam Shaft" button will allow the user to overlay a stroke grid (again as indicated in, for instance FIG. 29) on the pressure waveform. In operation the user will place vertical cursers from trigger to trigger and the grid will be marked between these vertical cursors. (The trigger signals are clearly marked on the screens illustrated in FIGS. 15-18 as the vertical spikes of the red graph (channel 2).) "Mark Cylinders" button will allow the user to overlay a cylinder box grid on the waveform, as is also illustrated in FIGS. 15-18. The cylinder boxes will be automatically configured for the number of cylinders that have been selected in the Configuration screen. "Get Cursors" button will allow the user to bring the cursors up onto the chart so the waveform can be marked. "Pointer Tool" selection: "Cursor" will allow the user to move the cursors. "Pan Hand" will allow the user to move the graph along the X or Y axis. "Zoom Window" will allow a picture frame to be selected and will zoom in on what is located inside the picture frame. "Zoom In" will allow the user to zoom in on the waveform. "Zoom Out" will allow the user to zoom out on the waveform. "Zoom Reset" will allow the data to be reset to its original format. "Cursor Measurements": "#1 (V/A)" will display the reading from the number 1 cursor. "#2 (V/A)" will display the reading from the number 2 cursor. "#1-#2" will subtract the number 1 cursor from the number 2 cursor and display the difference. "Period(s)" will display the time between the vertical cursors. "Freq (Hz)" will display the hertz from the vertical cursors. "Smooth or FFT" button will allow the user to smooth the waveform or process the waveform with Fast Fourier Transform. "CH1 through CH8" buttons allow the traces to be turned on or off on the chart:

The procedure to adjust increasing RPM to trigger signal so as to center the peak of the waveform pulse in the correct cylinder box is as follows. First, the distance between triggers is divided up into n cells where n is the number of cylinders. The amount that the misfire pressure waveform is moved to the right (as viewed in the graphs of the figures) of the position of the trigger signal is determined by the following tables, where the amount moved is linearly interpolated between the given RPMs in Table II, below.

TABLE II

| RPMs | 400 | 700 | 1000 | 1300 | 1600 | 1900 | 2200 | 2500 | 2800 |
|---|---|---|---|---|---|---|---|---|---|
| 3 Cyl | 0.095 | 0.090 | −0.305 | −0.593 | −0.791 | −1.046 | −1.100 | −1.324 | −1.240 |
| 4 Cyl | 0.095 | 0.090 | −0.305 | −0.593 | −0.791 | −1.046 | −1.100 | −1.324 | −1.240 |
| 5 Cyl | 0.650 | 0.150 | −0.033 | −0.734 | −1.310 | −1.265 | −1.320 | −1.460 | −1.460 |
| 6 Cyl | 0.650 | 0.150 | −0.033 | −0.734 | −1.310 | −1.265 | −1.320 | −1.460 | −1.460 |
| 8 Cyl | 0.400 | 0.800 | −0.137 | −0.747 | −0.958 | −1.835 | −1.636 | −2.290 | −2.790 |
| 10 Cyl | 0.400 | 0.800 | −0.137 | −0.747 | −0.958 | −1.835 | −1.636 | −2.290 | −2.790 |
| 12 Cyl | 0.400 | 0.580 | 0.470 | −0.590 | −1.270 | −1.520 | −1.636 | −2.290 | −2.790 |

Numbers for each RPM & n Cylinder engine are amount of cell that is moved to right The foregoing tables, based on engine testing, also show that even at idle there is some drift (0.090 for a 4 cylinder engine at 700 RPM) and that this drift increases with increasing engine speed. Positive numbers indicate a drift to the left; negative, a drift to the right.

Figure 19:
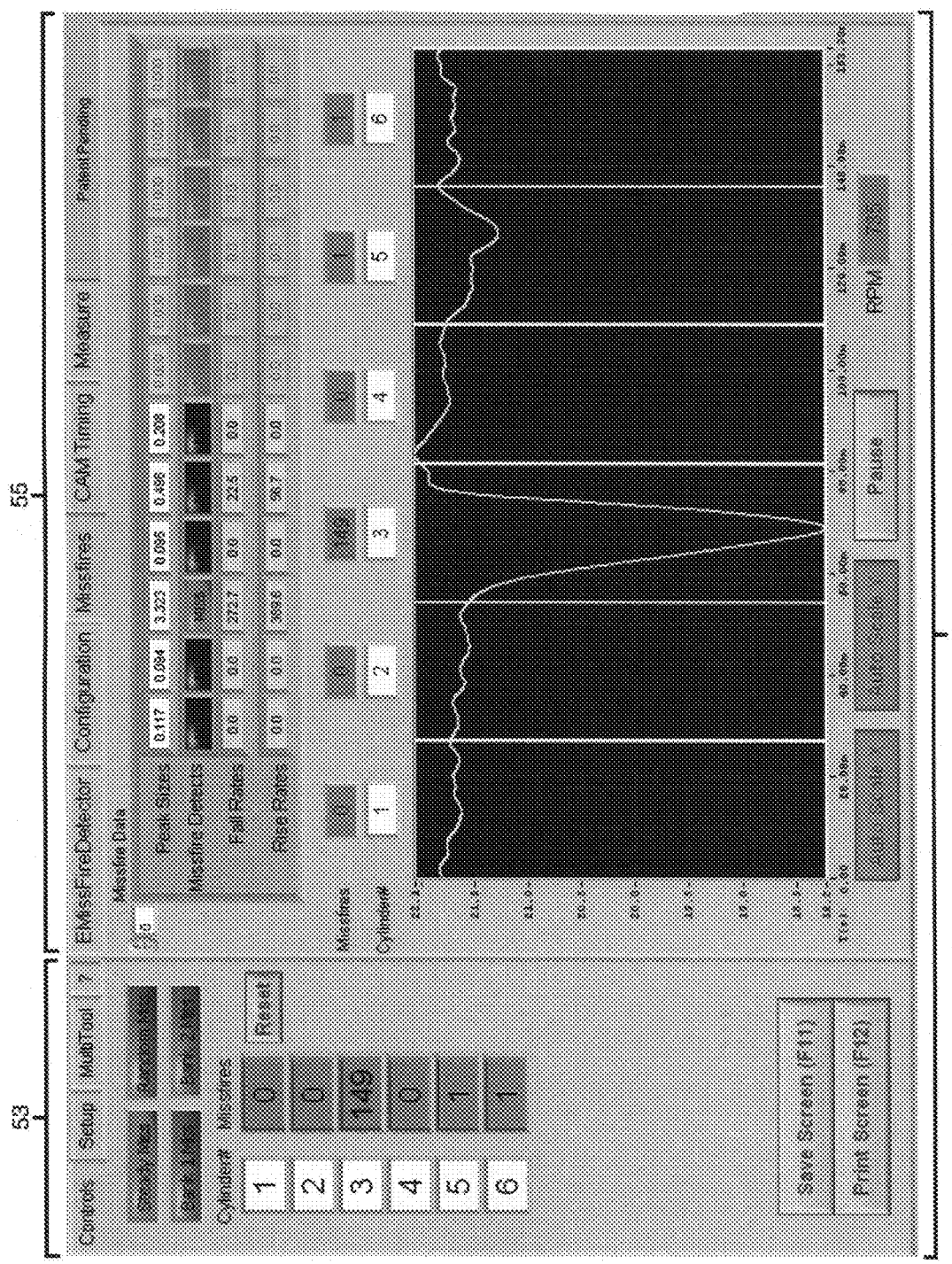
FIG. 19 illustrates the ATS Venturi Amplifier on a V6 engine showing a steady miss on cylinder #3.
Figure 20:
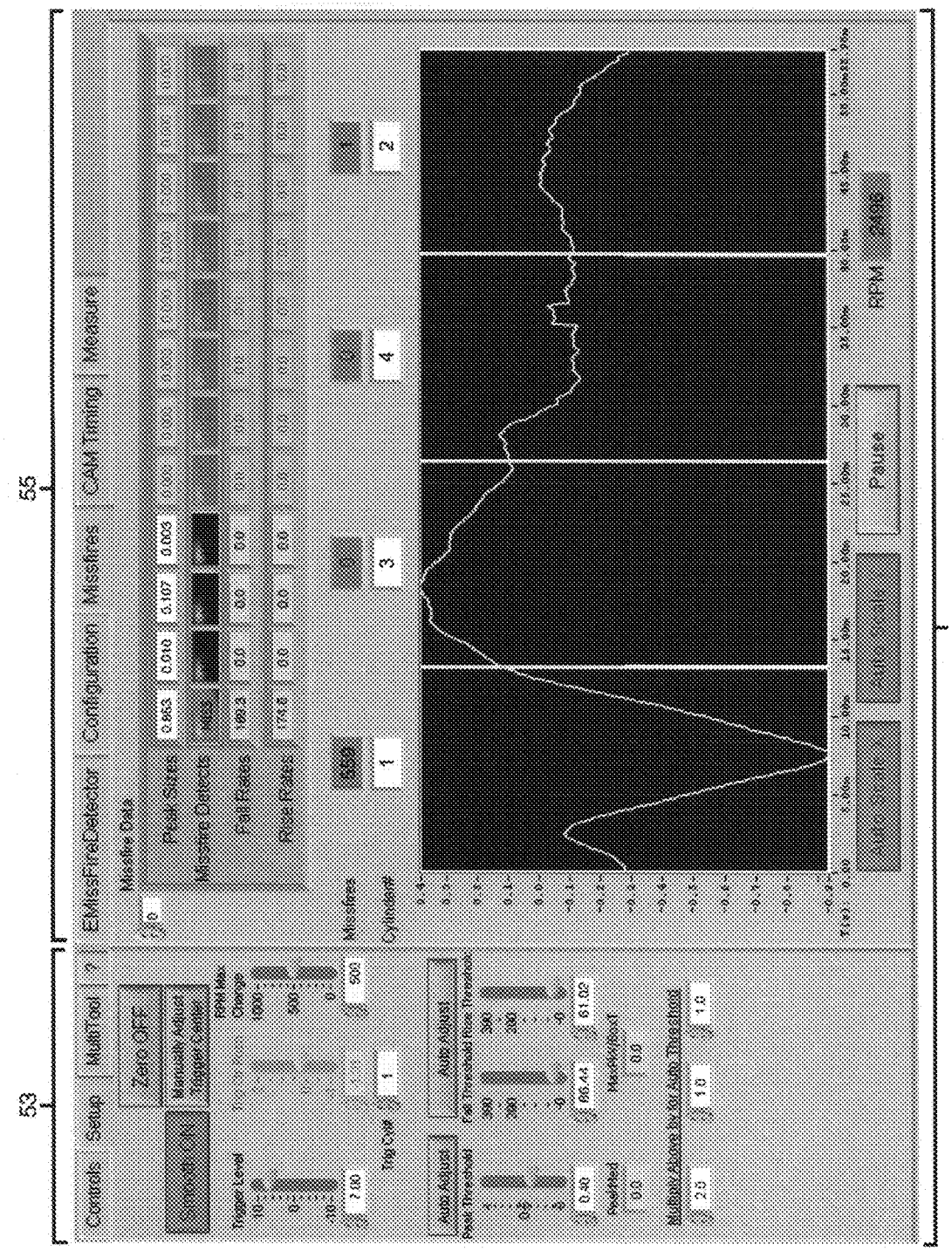
FIG. 20 illustrates a 4 cylinder engine with a misfire on cylinder #1.
Figure 21:
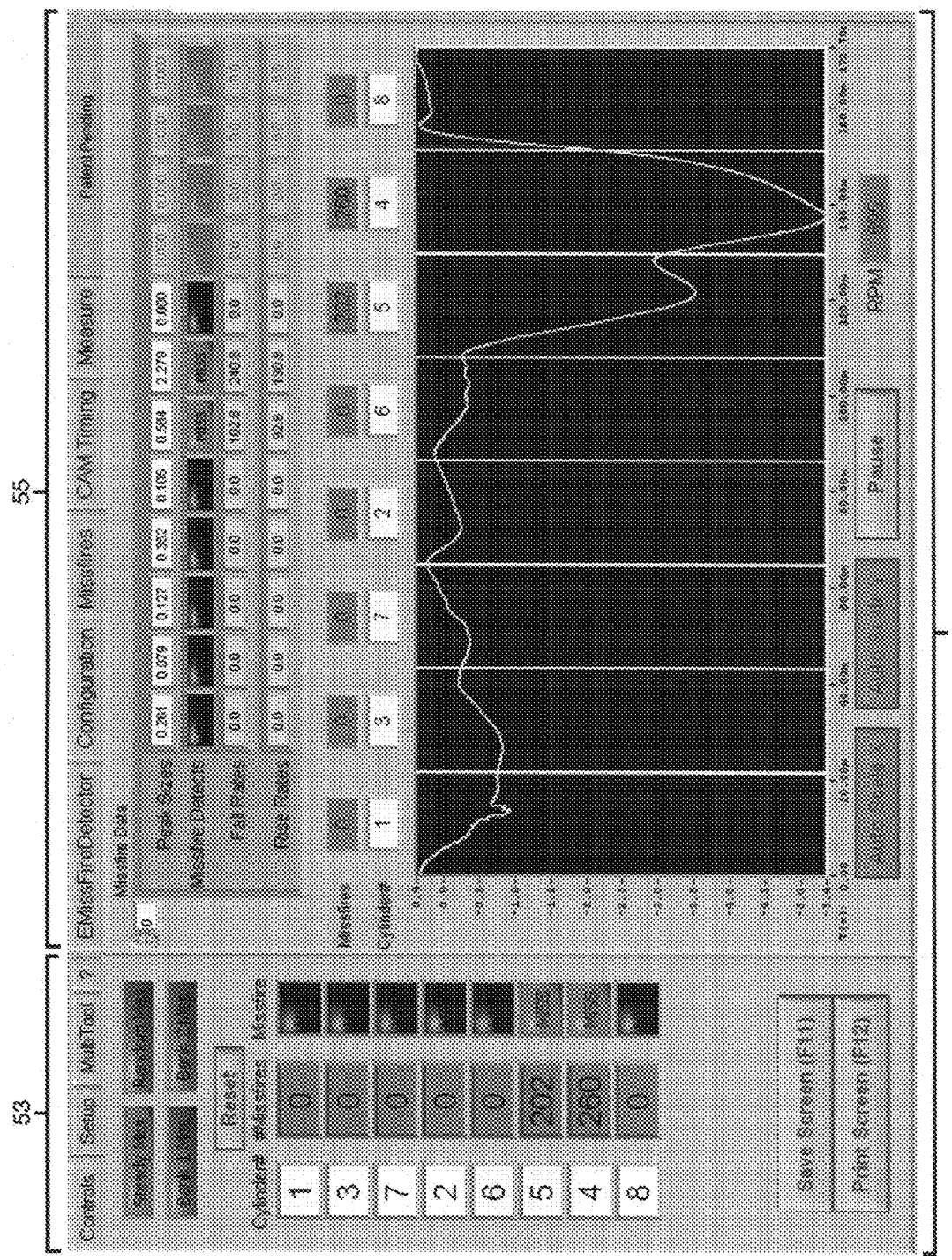
FIG. 21 illustrates the ATS Venturi Amplifier on a V8 engine with a steady miss on two back to back cylinders, #5 and #4.

Further examples with the use of the venturi sensor are set forth in FIGS. 19-21. FIG. 19, this is a 6 cylinder engine at idle with a steady miss indicated on the #3 cylinder. The waveform produced is from the ATS Venturi. The misfire is indicated by the steep drop in the 3rd cell. The other cells in this example have very little pressure change. This is due to the dampening effect that the ATS Venturi provides. With the ATS Venturi the misfire pressure waveform is very distinct with its steep drop and rise, thus it is easier to locate misfires in the internal combustion engine.

FIG. 20 is a 4 cylinder engine under load at 2496 RPM. Again, the waveform produced is from the ATS Venturi. The #1 cylinder is indicated as a misfire. The waveform in the first cell has a steep drop which has broken the threshold set points. The #2, #3, and #4 cells have very small pressure changes. With this amount of pressure change the threshold set points have not been crossed thus no indication of misfire on cylinders #2, #3, and #4.

FIG. 21 is an 8 cylinder engine at idle with a steady miss indicated on cylinder #5 and cylinder #4. Here, again the waveform produced is from the ATS Venturi. These misfires indicated on cylinder #5 and cylinder #4 occur in succession. The steep drop on #5 and the steep rise on #4 cross the threshold set points for a misfire, thus the misfire alert lights are turned on and the misfire counters are incremented forward.

Also illustrated in FIG. 1 are intake pressure sensing device 61, cylinder pressure sensing device 63 and crank case pressure sensing device 65. Sensor 61 is connected to A/D converter by cable 67; sensor 63, by cable 69; and sensor 65, by cable 71. The use of these sensors, in combination with the correct identification of an engine's misfiring cylinder or cylinders, enables the technician to identify the probable cause(s) of the misfire(s).

Once the misfiring cylinder (or cylinders) has (or have) been identified, the cause(s) for such misfire(s) will need be determined. For this it will be necessary to test the mechanical condition of the engine. In order to accomplish this, the spark plug will be removed from the missing cylinder and pressure sensing device 63 will be installed in its place. See FIG. 1. This will allow the pressure changes within the missing cylinder to be measured which, in turn, will provide information on the mechanical condition of the engine. The magnitude and timing of the pressure changes will indicate problems such as; low cranking pressure, low running pressure, low snap throttle pressure, bad intake valve, bad exhaust valve, bad intake valve spring, bad exhaust valve spring, worn valve guides, bad rings camshaft to crankshaft timing problems, camshaft chain or belt tension problems, piston sealing problems, worn cam problems, lifter problems, exhaust restriction problems and ignition timing problems.

Figure 22:
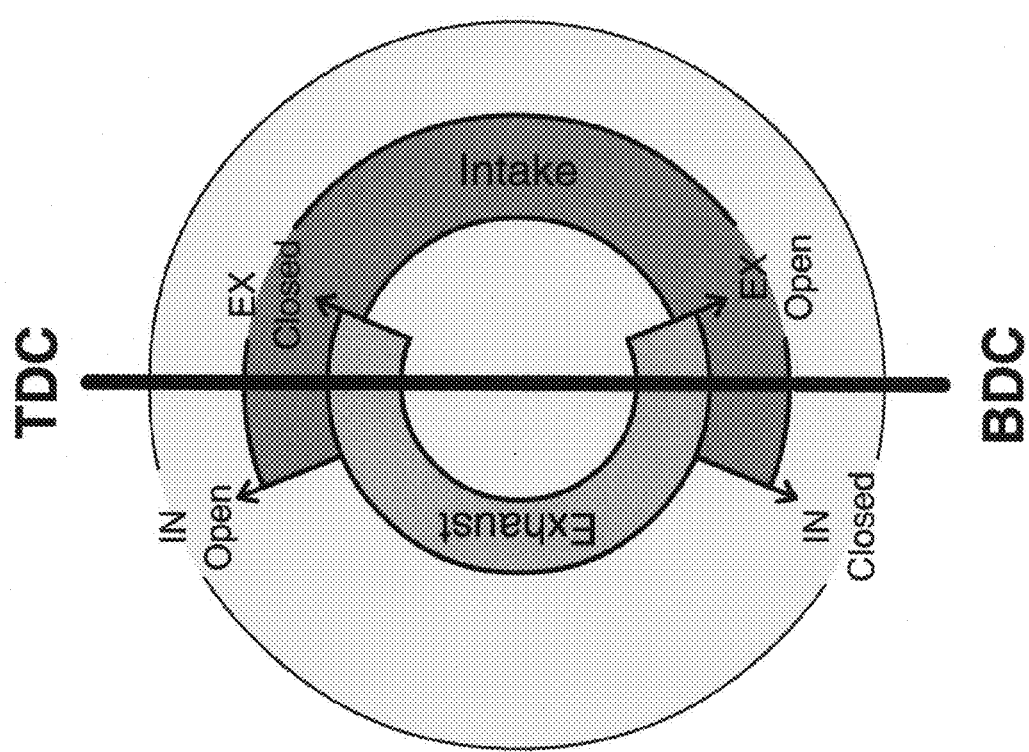
FIG. 22 is a schematic illustrating the basic relationship between a piston, its top dead center and bottom dead center positions and the opening and closing of both the exhaust and intake valves.

If the cam profile for the engine being diagnosed was known, the position (in terms of degrees of rotation) where each valve movement occurred can be compared to the pressure waveform to check the camshaft timing. Unfortunately, this is very impractical due to the number of engines in use and the difficulty of finding information on the associated cam profiles. However, it has been found that certain attributes of the cylinder compression waveform (sometimes referred to as the "compression" waveform in this specification) apply to all internal combustion engines that are subject to government regulation for emission and fuel control systems. Since such engines must meet these government regulations, the associated camshafts are all very similar in their operation. The basic valve timing relationship between top dead center (TDC) and bottom dead center (BDC) and the opening and closing of the exhaust and intake valves for a cylinder is illustrated in FIG. 22. Thus, for instance, the intake valve always opens before TDC and the exhaust valve always closes after TDC. Both valves are open at both TDC and BDC.

Figure 23:
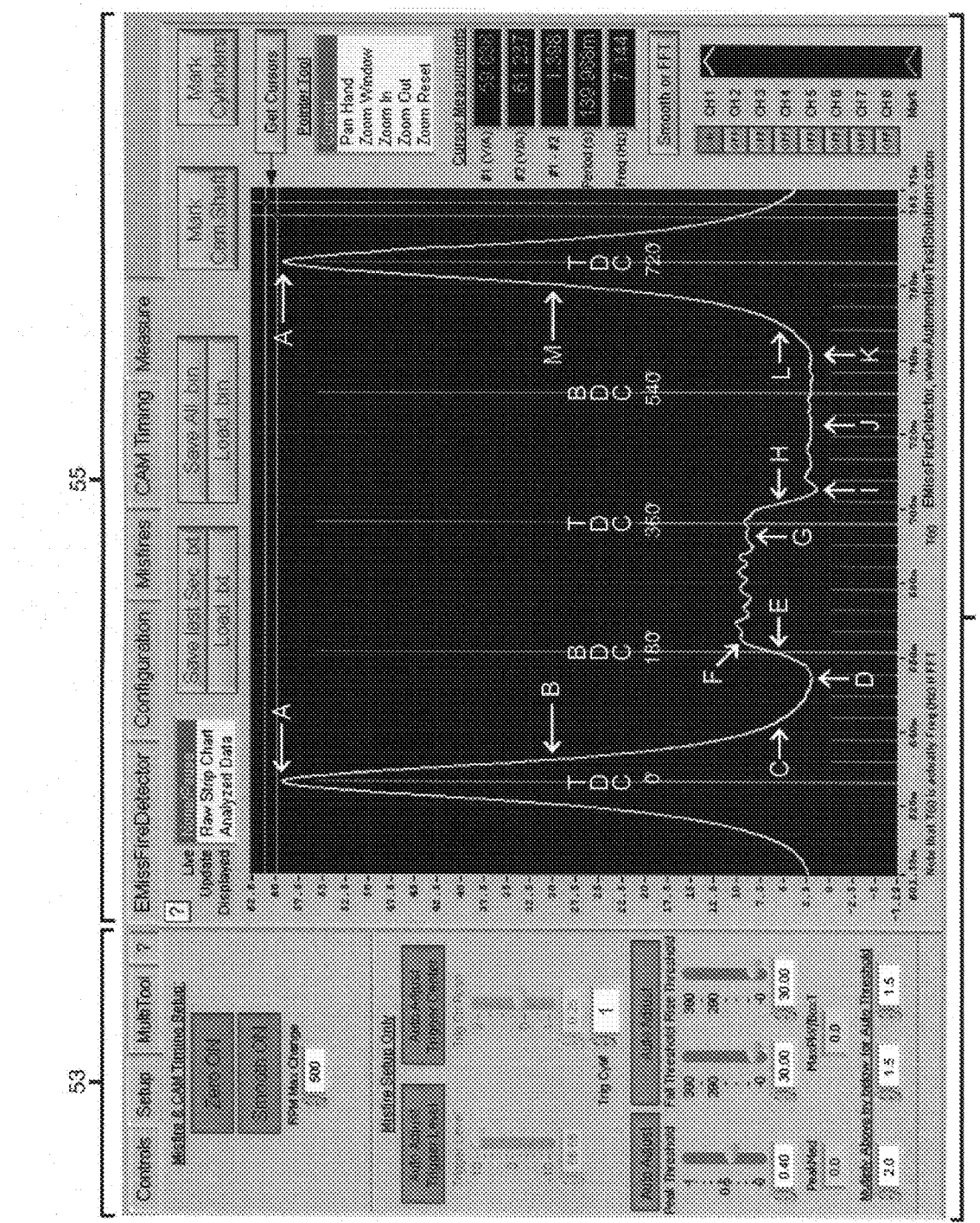
FIG. 23 illustrates the cylinder pressure waveform from a spark ignition engine in good mechanical condition at idle with the spark plug removed and replaced with a 300 psi transducer and with the key points of the waveform marked.
Figure 24:
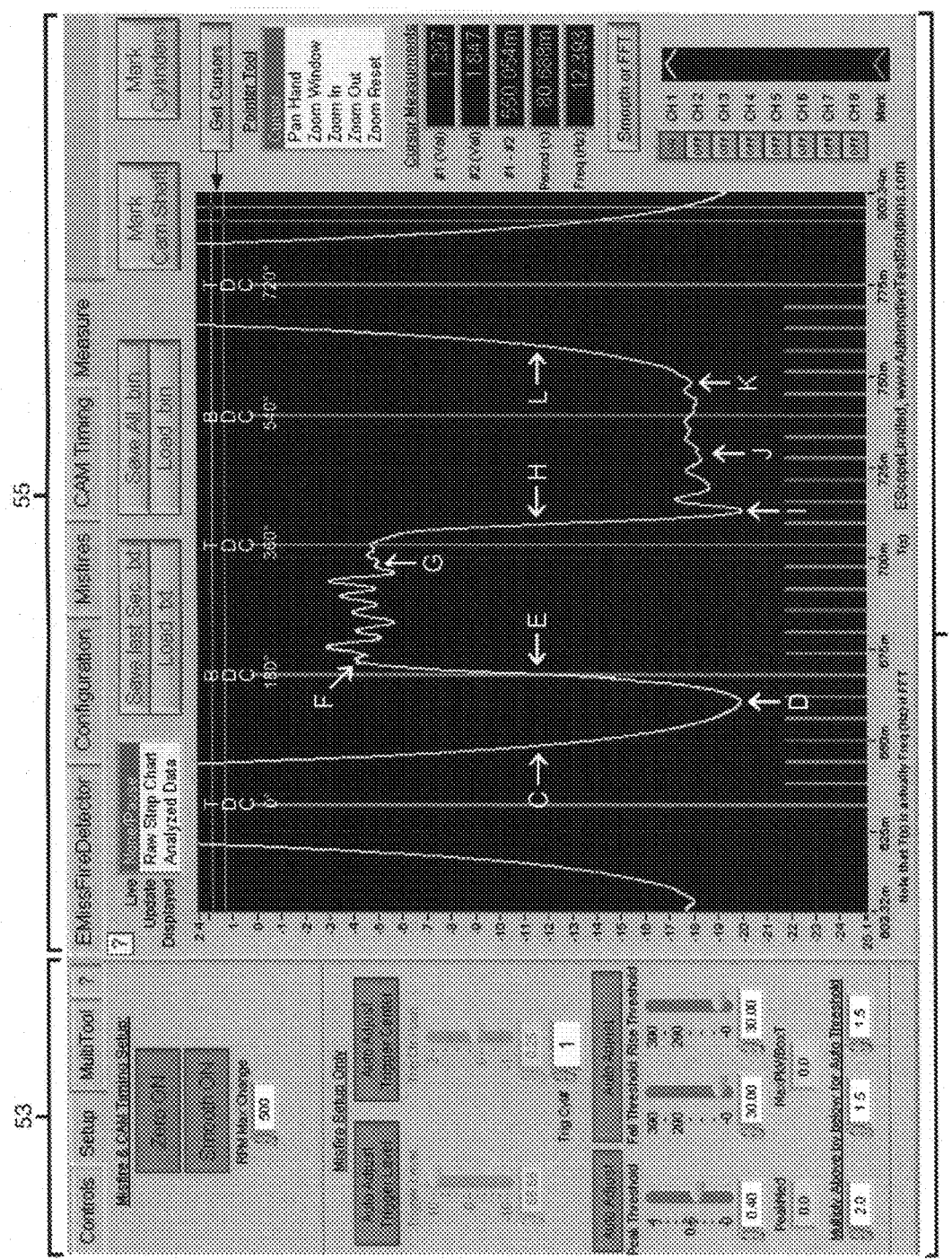
FIG. 24 illustrates the same pressure waveform, but taken with a −30 hg transducer to increase the resolution between points D and K.

As indicated in paragraph [00114], the compression waveform (a/k/a cylinder pressure waveform) produced by a cylinder holds the key to determine if the mechanical condition of such cylinder is in good working order or if there is a associated deficiency or failure. It is necessary to break the cylinder pressure waveform down into several divisions in order to make a determination of the cylinder condition. FIGS. 23 and 24, both with the Measure tab open, illustrate a compression waveform from a cylinder in a spark ignition engine in good mechanical condition at idle with key points of the waveform marked. Note that the compression waveforms in both FIGS. 23 and 24 were taken from the same spark ignition engine: the first with a 300 psi transducer; the second with a −30 hg transducer to increase the resolution of, for instance, the exhaust plateau (points F-G).

At the top of the waveform point A marks the peak pressure that occurs in the cylinder. This point will correspond to the point at which the piston position comes the closest distance to the cylinder head. This pressure is the sum of compression from point K (on the right hand side of the graph in FIG. 23) to point A. The amount of pressure built will depend on the volume between the cylinder head and the piston when the distance from the piston to the head is at its closest point. This peak pressure point will represent the top dead center (TDC or 0°) position of the piston's movement. Again, see FIG. 23. This is the point at which the piston has momentarily come to rest and is no longer in movement and occurs when the crankshaft has reached the end of its compression stroke. This maximum pressure will be different depending on the operating condition the engine is running under. When an engine is in a cranking condition the compression on a spark ignition engine should be about 130 lbs/square inch (psi). If this cranking pressure drops below 90 psi this is an indication that the pressure within such cylinder is no longer adequate to support combustion of the hydrocarbon chains. When an engine is in a running condition (and, consequently, the throttle restricting the air flow to the cylinders) the compression at idle should be about 70 psi. If this running pressure drops below 40 psi a mechanical misfire will occur. (A mechanical misfire would be other than one associated with either the ignition system or the fuel delivery system.) This is an indication that the pressure within the cylinder is no longer adequate to support the combustion of the hydrocarbon chains. During what is known as a snap throttle compression test the idle compression pressure should increase by about 3 times the idle compression.

As the crankshaft rotates past the top dead center position the piston starts to move away from the cylinder head, which allows the volume between the cylinder head and the piston to increase. (As the spark plug has been replaced with pressure sensing device 63, this would be the start of what would normally be termed the decompression stroke.) Under this condition the peak pressure that has been produced will start to decrease. If the compression tower is measured from its lowest point, point D, to its highest point, point A, and this pressure is divided in half then this point should occur at 30° after top dead center. This is indicated by point B, halfway down the compression tower. As the piston continues to move away from the cylinder head, increasing the volume between the head and piston, the piston velocity will continue to increase until the crankshaft has reached the 90° position after TDC. See Point C. (The piston was momentarily at rest at top dead center and, as the crankshaft rotation continues, the piston speed increased until it obtains its maximum velocity at the 90° position.) From this 90° position to the bottom dead center (BDC) point the piston will slow its velocity down until it reaches BDC (180°) and momentarily stops.

In this first 90° of crankshaft rotation from TDC the cylinder has totally decompressed and thereafter enters into a negative pressure or vacuum state. As the piston continues its downward travel the vacuum within the cylinder continues to increase. At the point the exhaust valve opens, point D in FIGS. 23 and 24 (which is before BDC), the piston travel is still moving in a downward movement. However, the cylinder pressure starts to rise. This is due to the pressure in the exhaust manifold being higher than the pressure in the cylinder. The cylinder pressure will continue to rise until it is equal with the exhaust pressure, point F. This exhaust pressure change should occur near the point the piston has decelerated to a stop or has reached BDC (180°).

The pressure change from point D to point F is referred to as the "exhaust ramp". For a properly functioning cylinder (i.e., one that has no mechanical problem), the target point for the center of the exhaust ramp relative to BDC (180°) is point E. See FIGS. 23, 24 and 25A. If this condition is met the exhaust camshaft timing is correctly timed to the crankshaft. We have determined that if this exhaust ramp crosses the BDC (180°) position within −10° to +15° of this target the camshaft is still in proper time with the piston position. On some high performance based engines (e.g., Ford 5.4 Triton engine, Ford 3.8 Mustang) it is normal for the exhaust cam timing to be advanced and can still be in proper time with +20° of this target. The green portion of the rising exhaust ramp in FIG. 25A illustrates the range of values where the cam timing is correct. The yellow portion illustrates the range of values of high performance engines where the cam timing is correct. FIG. 25B illustrates the case where the cam timing is advanced. Finally, FIG. 25C illustrates the basic situation where the cam timing is retarded. In both of these last two cases the green portion of the exhaust ramp does not intersect the BDC line. (As those skilled in the art understand, the camshaft is timed to the crankshaft which allows the intake and exhaust valve openings and closings to be properly timed to the piston position. This, in turn, insures that the air moving through the engine will be pumped properly. If the camshaft is out of time with the crankshaft in either the advanced or retarded position both misfires and low power will occur.)

The piston at bottom dead center is not in movement. As the crankshaft continues to rotate the piston starts to accelerate in an upward direction on the exhaust stroke. This forces the contents of the cylinder out of the cylinder into the exhaust system. The piston crosses the halfway point, 270° position, reaching its maximum velocity and then starts to slow down and momentarily stop as it reaches the TDC (360°) position. In a properly functioning cylinder, such as illustrated in FIGS. 23 and 24, at approximately 15° to 30° before TDC (360°) the intake valve will open. The pressure change in the cylinder can be seen in these two figures in the area of point G. However, in different engines this pressure change may not be as apparent. The piston is coming to a stop and has very low velocity when the intake valve opens. The exhaust valve is still open (as is evident from FIG. 22) and will equalize the cylinder pressure to the higher pressure that is within the exhaust system. As the piston reaches TDC (360°) and then starts to move away from the TDC (360°) position in a downward movement, the negative pressure will overcome the exhaust pressure within the cylinder and the cylinder pressure will decrease. The pressure will continue to decrease until it equalizes with the intake manifold pressure, which is in a negative state of pressure or a vacuum.

The intake pressure change creates the "intake ramp", point G to point I (as illustrated in FIGS. 23 and 24). It is between these two points that the exhaust valve will close. (The exact point can't be seen in the drawings.) This intake ramp should start to drop at, approximately, the TDC 360° position and equalize to the intake pressure by the 60° mark after TDC 360°, point I. If the pressure from point G to point I is divided in half this target point should occur at 20° after TDC 360°, point H in FIGS. 23, 24 and 26A. This indicates that the intake camshaft is in time with the crankshaft. If this ramp crosses the TDC 360° plus 20° position within −10° to +10° of this target the intake camshaft is in proper time of the piston position. The range for the correct timing of the intake valve cam is indicated in green in FIGS. 26A-C. Note the intersection of TDC+20° in FIG. 26 A. FIGS. 26B and 26C illustrate the conditions where, respectively, the intake valve cam timing is too advanced and the intake valve cam timing is too retarded. (In both of these situations the cam shaft (the intake cam shaft in those engines which have separate exhaust and intake cam shafts) would be out of time with the crank shaft and, depending on how much it is out of time, the cylinder may be misfiring.) On variable valve timed (VVT) engines the target for the center of the intake ramp is TDC 360°+30° within +/−10°.

As illustrated in FIGS. 23 and 24, the intake pressure at point I is approximately equal to the exhaust pressure at point D. This is due to the intake manifold pressure, point I, being compressed to the peak pressure and then decompressed to this starting pressure, which should be equal to point D. However, it should be noted that the waveform between points I and K varies depending on the engine and the mechanical condition of the cylinder being tested. In some instances (not illustrated in FIGS. 23 and 24) point J, an intermediate point between points I and K, will be lower than point I and approximately equal to point D. With a cylinder in good mechanical condition, one of points I and J should be approximately aligned with point D. If this is not the case, then there is a mechanical problem. For instance, if the exhaust valve spring is weak or broken the compression pressure will seal the valve and then during decompression the valve spring will continue to hold the valve in a closed or sealed position. As the piston continues its downward travel and approaches BDC the cam lobe will start to contact the valve. Due to the spring being weak the valve will be unable to follow the cam lobe and will open but will not have definition in the opening. Further, as the exhaust is pushed out and the intake stroke is started the exhaust valve will not be seated. In this condition the intake vacuum is weaker due to the leaking exhaust valve. This will cause a difference in pressure between point D and point I, indicating a mechanical failure has occurred.

The piston then continues to increase its velocity from TDC 360° in a downward direction until it reaches the 90° position after TDC (360°). At this point the piston has reached its maximum velocity. The piston then continues to move downward on the intake stroke, slowing down until it reaches BDC (540°). The crankshaft continues to rotate and the piston starts to move in an upward direction on the next compression stroke. However, the piston velocity is low at this point. The intake valve is still open so the pressure in the cylinder is equalized to the pressure within the intake manifold. The intake valve then closes at point K and the cylinder pressure begins to rise. This intake valve closing should occur at approximately 50° after BDC (540°). The piston continues to travel in an upward direction, gaining velocity until it reaches its maximum velocity at 90° after BDC (540°). The compression ramp at this point is clearly increasing in pressure. The piston continues to travel upward and is now slowing its velocity as it approaches the 30° before TDC (720°), point A again (on the right hand side of the graph in FIG. 23. At this point the compression should be at a halfway point between the minimum pressure and the maximum pressure, point M. The compression then continues to build until the piston slows down and reaches a stopping point at TDC 720°. It is important to note that most of the compression pressure is produced in the last 30° of crankshaft rotation.

Figure 27:
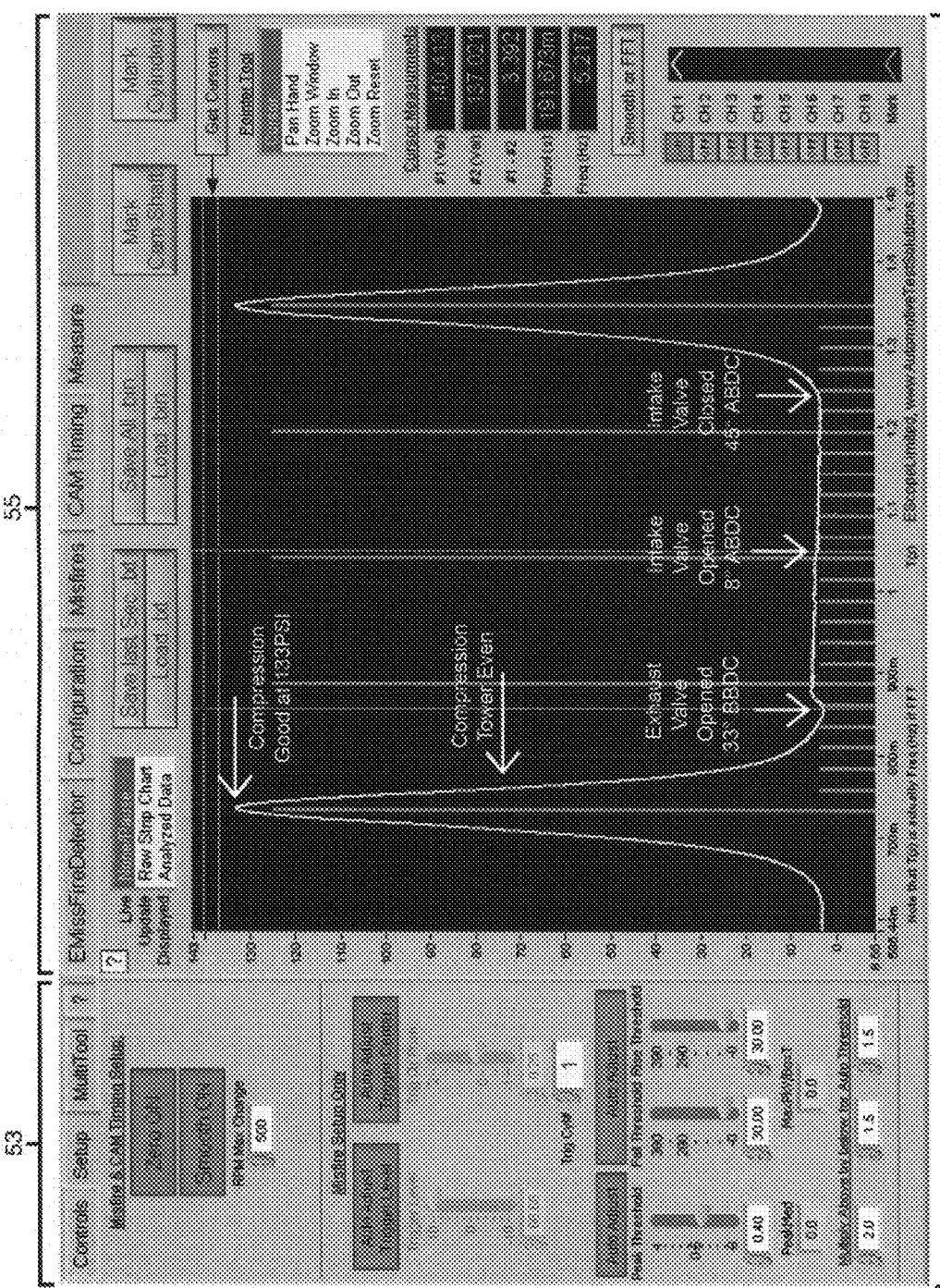
FIG. 27 illustrates a typical cylinder pressure waveform from a cylinder exhibiting good cranking compression.

The exhaust plateau, point D to point I, is created by the pressure differential within the intake manifold (or the vacuum) that is contained in the intake manifold. As this intake vacuum changes so will this exhaust plateau. For example, as illustrated in FIG. 27, when the engine is in a cranking condition the engine can only produce 1 inch hg to 3 inches hg of intake manifold cranking vacuum. With this reduced intake manifold vacuum the exhaust plateau will also be reduced or will decrease in its definition. With this decrease in the exhaust plateau's definition the exhaust plateau will change in the way that it appears and is used. Since the height of the plateau is based on only 1 to 3 inches hg, this plateau will no longer cross the bottom dead center 180° mark (as indicated above) or the TDC 360°+20 mark (as also indicated above). The intake manifold vacuum will need to be much greater in order for the exhaust plateau to have enough height or pressure change for these exhaust and intake ramps to cross their targets. Since the exhaust and intake ramps cannot be used to check cam timing during a cranking condition, the valve openings must be checked instead as follows: (1) the exhaust valve opening is checked to make sure the opening occurred at 30° to 50° before BDC (180°); (2) the intake valve opening is checked to make sure the opening occurred just after TDC (360°); and (3) the intake valve closing is checked to make sure the opening occurred at 30° to 60° after BDC (540°). If these targets are met the camshafts are timed closely enough for the engine to start. However, the camshaft timing could still be up to 1 tooth out of time. In order for the cam timing to be accurately determined the engine must be at a steady idle state.

The ignition timing is analyzed by measuring the compression pressure peak to peak time and dividing this by 720° of crankshaft rotation. The time in milliseconds will equal the degrees of crankshaft rotation per millisecond. For instance, a typical idle speed from peak to peak is approximately 150 ms. If this 150 ms time is divided by 720° of crankshaft rotation this would indicate the degrees per ms (e.g., 720°÷150 ms=4.8° per ms). If trigger apparatus 17 is connected to the ignition signal for the cylinder that is being checked the time to this ignition trigger from the peak pressure of the cylinder can be measured in milliseconds. If the ignition trigger event that ionized the sparkplug electrodes is marked and a measurement is made between this ignition trigger point and the peak of the compression waveform, which indicates the crankshaft is at top dead center (TDC), then the time between these two events will indicate the ignition timing. For example, if the event occurred 4 ms before the peak pressure point and the milliseconds per degree are equal to 4.8 then the ignition advance will be 19.2° before TDC (4 ms×4.8°/ms=) 19.2°.

In FIGS. 30, 32, 34, 36, 38, 40, 43, 46 and 49 a new screen, opened by clicking the CAM Timing tab, is illustrated. Table III below identifys, in the left hand column, all the screen names (e.g., "RPM Calc from CAM") appearing on screen 55 with the CAM Timing tab open. See, for instance, FIG. 30. The right hand column of Table III sets forth the full definition of the associated screen name (e.g., "RPM Calc from CAM" is the "RPM calculated from compression peaks").

TABLE III

| | |
|---|---|
| RPM Calc from CAM | RPM calculated from compression peaks. |
| PSI@Max | Active pressure reading from peak pressure. |
| Cranking PSI < 90 PSI | Alert light is green if greater than 90 psi and red if less than 90 psi. |
| Idle PSI < 43 PSI | Alert light is green if greater than 43 psi and red if less than 43 psi. |
| DegLeftFWHM | Percentage from center of compression tower; left side full width half mast. |
| DegRightFWHM | Percentage from center of compression tower; right side full width half mast. |
| FWHM%Diff | Percentage difference from left to right side of compression tower. |

TABLE III-continued

| | |
|---|---|
| FWHMError (>20%) | Alert light is green if less than 20% and red if greater than 20%. |
| PSI@ExhMed | Pressure at exhaust plateau. |
| PSI@90 (CompFall) | Checks the pressure at 90° of crankshaft rotation |
| PSI@Min | Minimum pressure at exhaust valve opening. |
| Deg@Min | Crankshaft degrees at the point exhaust valve opened. |
| DegF/142.5ExhOpen | Degree difference from exhaust opening target. |
| ExhOpenNot130-155 | Alert light is green if between 130° and 155° and red if outside these parameters. |
| Advanced (<−12) | Alert light is green if less than −12° from center of exhaust ramp. |
| Retarded (>+10) | Alert light is green if less than +10° from center of exhaust ramp. |
| DegRetAdv (+ve=Retarded, −ve=Advanced) | Active number of degrees from center of exhaust ramp. |
| Deg@MidExhRise | Active number of degrees at center of exhaust ramp. |
| Deg@MidExhFall | Active number of degrees at center of intake ramp. |
| DegMidExhFall from TDC+20 | Active number of degrees from center of intake ramp. |
| Fall Advanced (<−10) | Alert light is green if less than −10° from center of intake ramp. |
| Fall Retarded (>+10) | Alert light is green if less than +10° from center of intake ramp. |
| PSI@360TDC | Maximum pressure at 360°. |
| PSI1stMin-2ndMin | Difference between the exhaust opening pressure and the intake pressure. |
| PSI@MinAfter Exh | Minimum pressure at exhaust valve opening. |
| Deg@MinAfter Exh | Minimum pressure at intake stroke. |
| Deg@MidExhRise | Pressure rise from intake valve closing. |
| Snap RPM | Indicates peak pressure during RPM increase. |
| PSI Change | Alert light green if greater than 3× idle PSI. Red if less than 3× idle PSI. |
| RPM Idle Variation % | Monitors idle peak compression variations. |
| RPM High Idle Variation % | Monitors high idle peak compression variations. |
| Ignition Timing Deg | Monitors ignition trigger compared to peak pressure and marks degrees of advance or retard. |
| Exhaust Variation Mid Exh Rise | Monitors exhaust rising ramp change in crankshaft degrees. |
| Exhaust Variation Mid Exh Fall | Monitors exhaust falling ramp change in crankshaft degrees. |

Table IV, below also sets forth the test names (left hand column), as well as the Internal Program Name (center column), and the associated algorighm in the Formula/Description column.

TABLE IV

| Name on Screen | Internal Program Name | Formula/Description |
|---|---|---|
| RPM Calc from CAM | RPM | 60/(Seconds from 0 Deg to 720 Deg (Peaks)) |
| PSI@Max | PSI@Max | Max PSI on first peak (near 0 Deg mark) |
| PSI@Min | PSI@Min | Min PSI from 0 Deg to 270 Deg (before exhaust cycle) |
| Deg@Min | Deg@Min | Deg at Min PSI |
| DegF/142.5ExhOpen | DegF-142.5ExhOpen | Deg@Min − 142.5 Deg = Distance of Deg@Min from expected location |
| ExhOpenNot130-155 | ExhOpenNot130-155 | Error if Deg@Min is not between 130 and 155 Deg |
| PSI@90(CompFall) | DegF/90CompFall | PSI at 90 Degrees |
| PSI@ExhMed | PSI@ExhMed | Median PSI between 180 and 360 Deg |
| Deg@MidExhRise | Deg@MidExhRise | Deg on exhaust rise curve where PSI = PSI@Min + (PSI@Min+PSI@ExhMed)/2 |
| DegRet/Adv (+ve=Retarted, −ve=Advanced) | DegRet/Adv | Deg@MidExhRise-180, Distance from expected location of PSI@ExhMed |
| Advanced (<−19) | Advanced | Error if DegRet/Adv < −12 Deg |
| Retarded (>+10) | Retarded | Error if DegRet/Adv > 10 Deg |
| PSI@360TDC | PSI@360TDC | PSI at 360 Deg |

TABLE IV-continued

| Name on Screen | Internal Program Name | Formula/Description |
|---|---|---|
| Deg@MidExhFall | Deg@MidExhFall | Degrees on exhaust fall curve where PSI = PSI@ExhMed |
| DegMidExhFall from TDC+20 | DegMidExhFallfTDC+20 | Deg@MidExhFall − 380, Distance of Deg@MidExhFall from expected location |
| Fall Advanced (<−10) | ExhFallAdvanced | Error if DegMidExhFallfTDC+20< −10 Deg |
| Fall Retarded (>+10) | ExhFallRetarded | Error if DegMidExhFallfTDC+20> 10 Deg |
| PSI@MinAfterExh | PSI@MinAfterEx | Minimum PSI after Exhaust cycle |
| Deg@MinAfterExh | Deg@MinAfterExh | Deg at PSI@MinAfterEx |
| PSI1stMin−2ndMin | PSI1stMin−2ndMin | PSI@Min − PSI@MinAfterEx |
| Deg from 720-90(CompRise) | DegF/630CompRise | 630 − Point where compression rise crosses DegF/90CompFall |
| DegLeftFWHM | DegLeftFWHM | FWHMHeight= PSI@Min + (PSI@Max− PSI@Min)/2, DegLeftFWHM is the deg to the left of TDC where the ramp crosses FWHMHeight |
| DegRightFWHM | DegRightFWHM | DegRightFWHM is the deg to the right of TDC where the ramp crosses FWHMHeight |
| FWHM%Diff | FWHM%Diff | 100*(DegLeftFWHM−DegRightFWHM)/DegLeftFWHM |
| FWHMError (>20%) | FWHMError | Error if |FWHM%Diff|>20% |
| Deg@MidExhRise | Deg@MidExhRise | Deg where rising ramp after exhaust crosses PSI@ExhMed |
| Cranking PSI < 90 PSI | CrankingPSILow | Error if RPM < 250 AND PSI@Max < 90 |
| Idle PSI < 43 PSI | IdlePSILow | Error if RPM is between 500 and 1200 and PSI@Max <43 |
| Snap RPM PSI Change | Snap RPM PSI Change | Max of last 20 PSI@Max values, Note: Only update if Snap: Snap is true if last 20 RPMS go from <= 1200 to >= 2700 and RPM is increasing |
| Snap RPM PSI Change Error | Snap RPM PSI Change Error | Error if (Snap RPM PSI Change) < 3 × (Min of last 20 PSI@Max values), Note: Only update if Snap (see above) |
| RPM Idle Variation % | RPM Idle Variation % | 100 × (Max of last 20 PSI@Max) − (Latest PSI@Max)/(Max of last 20 PSI@Max), only update if at idle: 500 <= RPM <= 1200 |
| RPM Idle Variation % Error | RPM Idle Variation % Error | Error if (RPM Idle Variation %) > 20, only update if at idle (see above) |
| RPM HIgh Idle Variation % | RPM HIgh Idle Variation % | 100 x (Max of last 20 PSI@Max) − (Latest PSI@Max)/(Max of last 20 PSI@Max), only update high idle: RPM > 1200 |
| RPM HIgh Idle Variation % Error | RPM HIgh Idle Variation % Error | Error if (RPM HIgh Idle Variation %) > 20, only update high idle (see above) |
| Ignition Timing Deg | Ignition Timing Deg | Degrees from Peak TDC of pressure pulse to ignition trigger. If ignition trigger is before TDC the value is negative and it is positive if it is after. |
| Ignition Timing Deg Error | Ignition Timing Deg Error | Error if −10 < Ignition Timing Deg < 10. |
| Exhaust Variation Mid Exh Rise | Exhaust Variation Mid Exh Rise | (Max of last 20 Deg@MidExhRise) − (Latest Deg@MidExhRise), only update if at idle (see above) |
| Exhaust Variation Mid Exh Rise Error | Exhaust Variation Mid Exh Rise Error | Error if (Exhaust Variation Mid Exh Rise) > 5, only update if at idle (see above) |
| Exhaust Variation Mid Exh Fall | Exhaust Variation Mid Exh Fall | (Max of last 20 Deg@MidExhFall) − (Latest Deg@MidExhFall), only update if at idle (see above) |
| Exhaust Variation Mid Exh Fall Error | Exhaust Variation Mid Exh Fall Error | Error if (Exhaust Variation Mid Exh Fall) > 5, only update if at idle (see above) |

Notes:
Deg = Degrees 0-720 between two peaks, Error = Bright Red indicator

Figure 28:
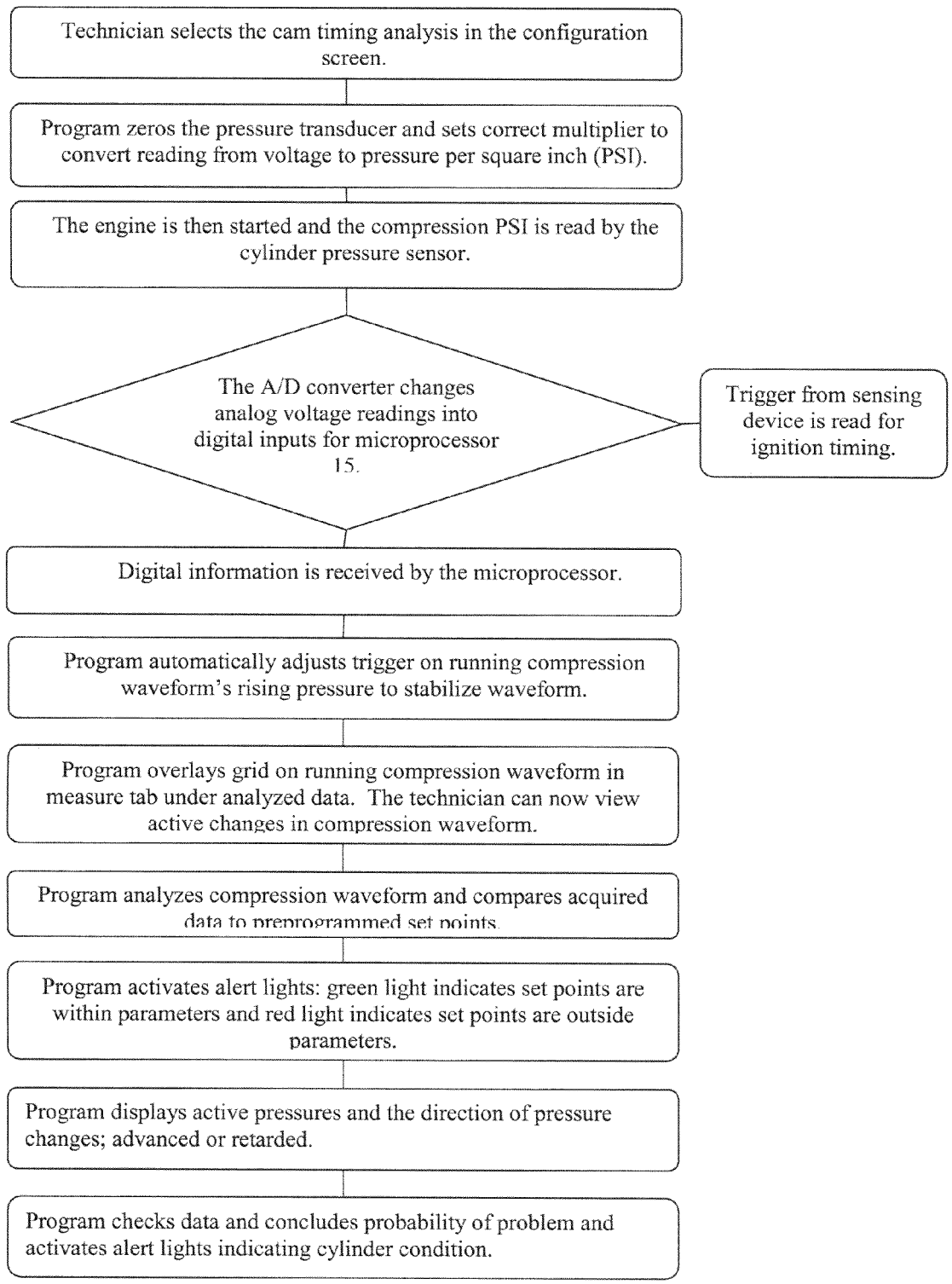
FIG. 28 is flow chart illustrating the overall operational sequence of the cylinder pressure analysis of the present invention.

The overall methodology of the cylinder pressure analysis, including cam the cam timing analysis, utilizing the algorithms set forth in Table IV is illustrated in FIG. 28.

The following examples are case studies which demonstrate how pressure sensing device 63 operates.

Figure 29:
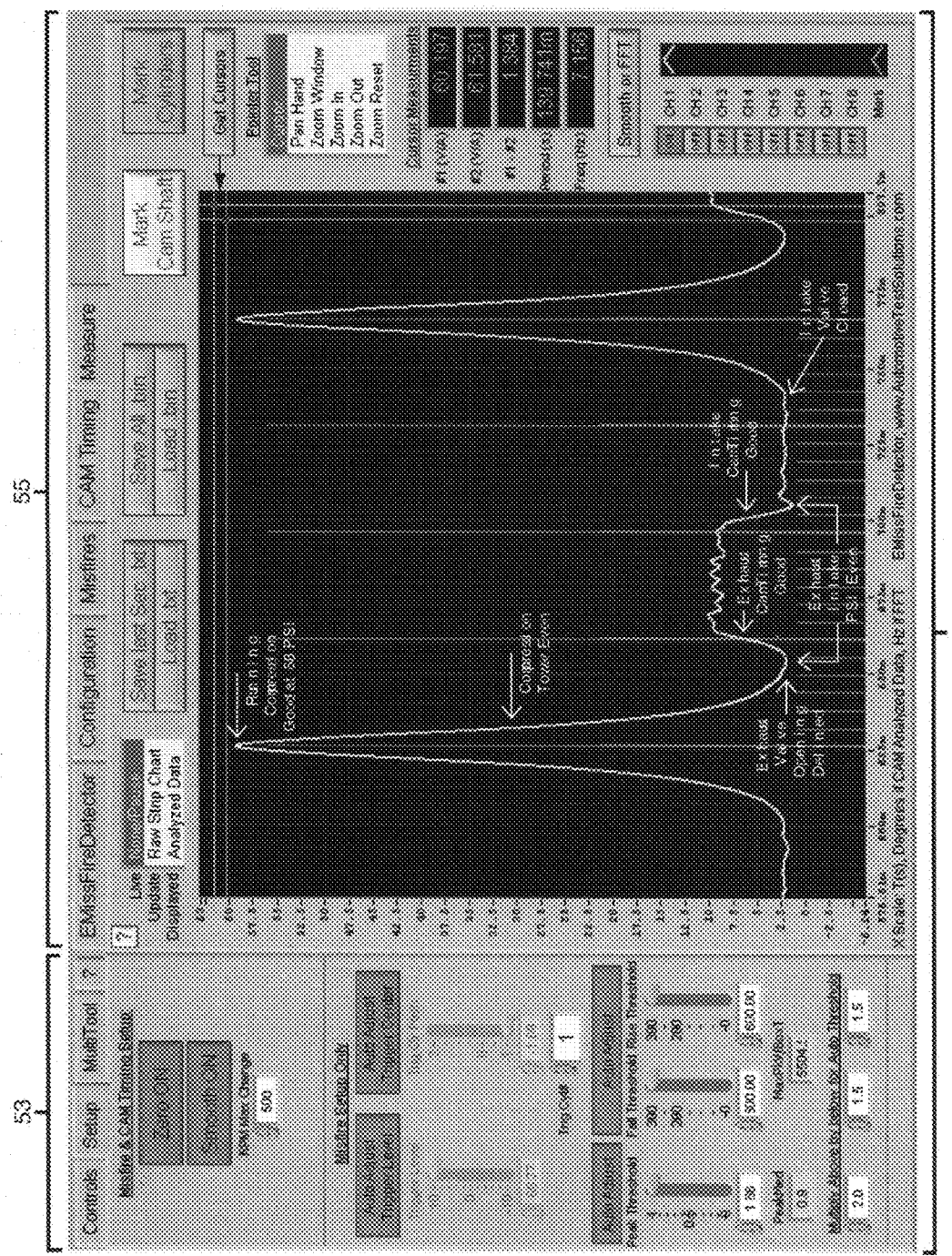
FIG. 29 is a screen display with the Setup tab open and the Measure tab open to show the cylinder pressure waveform (with portions marked for purposes of illustration) from a cylinder in good mechanical condition from a 2002 Dodge 2.7 liter engine.

In FIG. 29 with the Measure tab opened a 2002 Dodge 2.7 liter engine cylinder pressure waveform is displayed. This waveform has been manually marked by selecting the cursors on the upper right hand corner of the graph on screen 55 and placing them through the two peak compression events. The time between the two peaks is equal to two crankshaft revolutions or 720° of revolution. In this example the time between cursors is 139.74 ms. See the middle of the right hand side of the drawing (#1-#2). This time interval is now divided by 4 by pushing the Mark Cam Shaft button (in the upper right hand corner of screen 55), which overlays a grid, as indicated by the red hash lines, on the waveform. Each of the 4 divisions indicates 1 stroke of the 4 stroke engine. This $1^{st}$ division indicates the power (or combustion) stroke. The $2^{nd}$ division indicates the exhaust stroke. The $3^{rd}$ division indicates the intake stroke. The $4^{th}$ division indicates the compression stoke. Once the waveform has been marked, each stroke can be analyzed.

Figure 30:
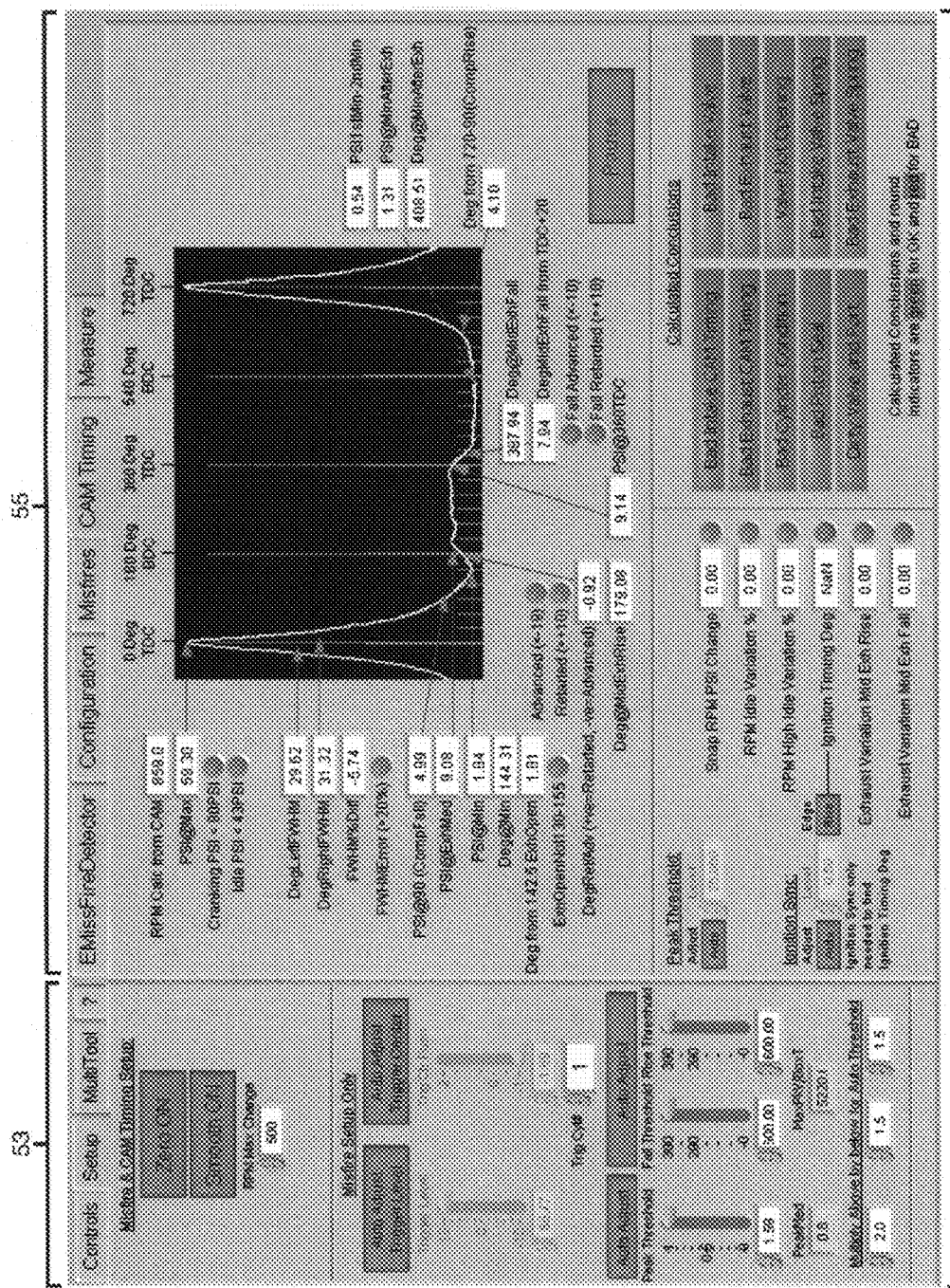
FIG. 30 is a screen display showing the Setup tab open and the CAM Timing tab open to show the evaluation of the waveform of FIG. 29 with the algorithms of Table IV.

FIG. 30 the same Dodge 2.7 liter engine compression waveform is evaluated with the algorithms set forth in the right hand column of Table IV. The graph on FIG. 29 shows the actual pressure changes within the cylinder being tested. In FIG. 30 (like FIGS. 32, 34, 36, 38, 40, 43, 46 and 49) the waveform is generalized (similar to what is illustrated in FIG. 23). Also note that the red arrows in these figures is for purposes of illustration only and, in operation, would not be visible in actual use. However, the data displayed is from the waveform of FIG. 29. In this example the engine has no problems as the data displayed (e.g., RPM Calc from CAM=859 RPM) all falls within the predetermined set points and all the lights (e.g., Cranking PSI<90PSI) are green.

With further reference to the CAM Timing window, such as illustrated in FIG. 30, the various screen names (e.g., "RPM Calc from CAM") are all listed in Table IV in the left-hand column. As previously indicated, the internal program names and the associated algorithms are listed in, respectively, the center and right-hand columns of this table. RPM Calc from CAM through "Idle PSI<43PSI" are in the upper half of the window. "Snap RPM PSI Change" through "Exhaust Variation Mid Exh Fall" are all in the lower left-hand portion of the screen. Finally, "Bad Intake CAM Timing" through "Bad Exhaust Valve Spring" refer to the alert lights appearing in the bottom right-hand portion of the window under the "Calculated *Conclusions*" heading. Note that in Table IV and on the CAM Timing screens, "ExhFall" (as in "Deg@MidExhFall" and "DegMidExhFall from TDC=20") and "Fall" (as in "Fall Advanced (<−10)") are all referring to the intake ramp (points G-I in FIGS. 23 and 24). Also note on these screens that "Retarted" should be "Retarded".

Figure 31:
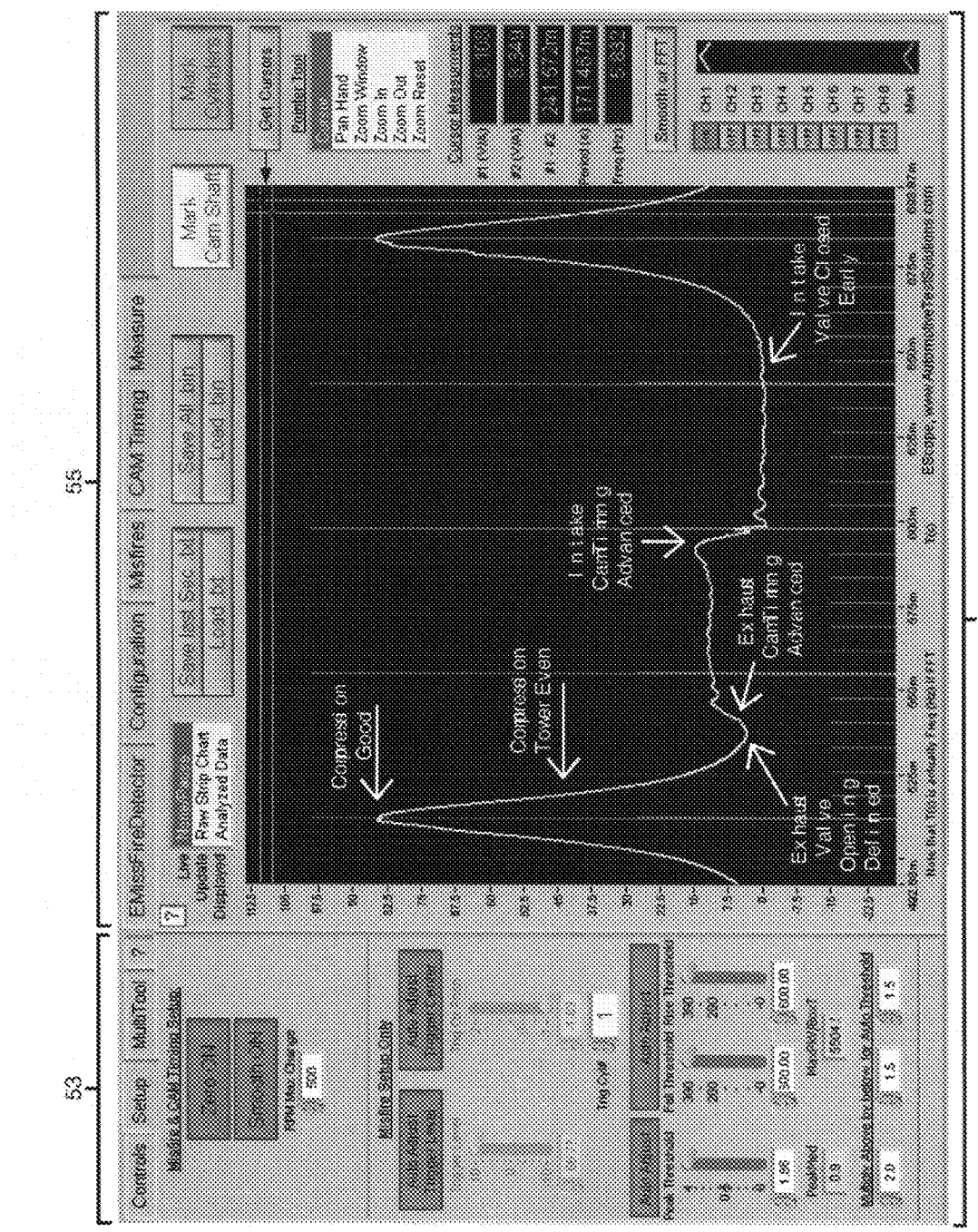
FIG. 31 is a screen display again showing Setup tab open and the Measure tab open to show the cylinder pressure waveform from a misfiring cylinder of a 2004 Ford Focus 2 liter engine.
Figure 32:
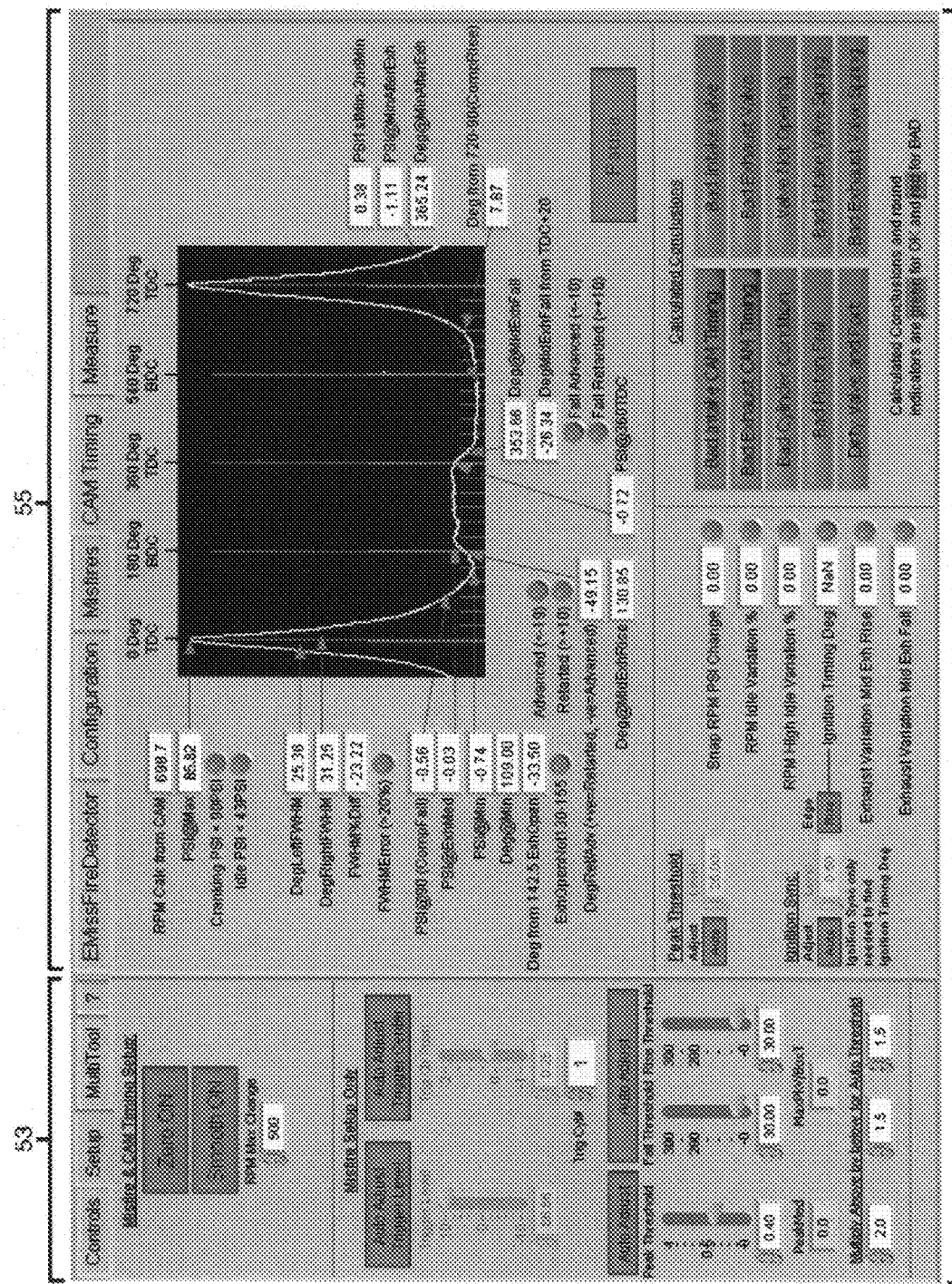
FIG. 32 is a screen display again showing the Setup tab open and the CAM Timing tab open to show the evaluation of the waveform of FIG. 31 with the algorithms of Table IV.

In FIG. 31, with the Measure tab open, the waveform obtained by sensing device 63 from a missing cylinder a 2004 Ford Focus 2 liter, 4cylinder engine has been manually marked in the manner discussed above. In FIG. 32 this waveform has been automatically processed according to the methodology set forth in Table III. By evaluating where the exhaust plateau (as defined by points D-I in FIG. 23) between the two compression peaks is located the exhaust valve opening and intake valve opening position can be calculated in the manner set forth above. By measuring the peak to peak time of the waveform and dividing this by 720°, the degrees per millisecond will be determined. By measuring from the center of the exhaust ramp (the midpoint between points D and F in FIG. 23) to BDC (180°) the time (in milliseconds) will indicate the crankshaft degrees of rotation which, in turn, shows that the camshaft is out of time. In this example the crankshaft degrees (form TDC) at the middle of the exhaust rise is 128.31°. See the box to the right of DegRet/Adv (+ve=Retarded, −ve=Advanced). This indicates that the camshaft timing is −51.89° advanced. To correct this camshaft timing error the front cover of the engine will have to be removed to allow access to the timing chains. The timing chains will then be removed and the camshaft gear positioned correctly to the crankshaft gear. The timing chain will then be reinserted holding these 2 gears into the correct alignment.

Figure 33:
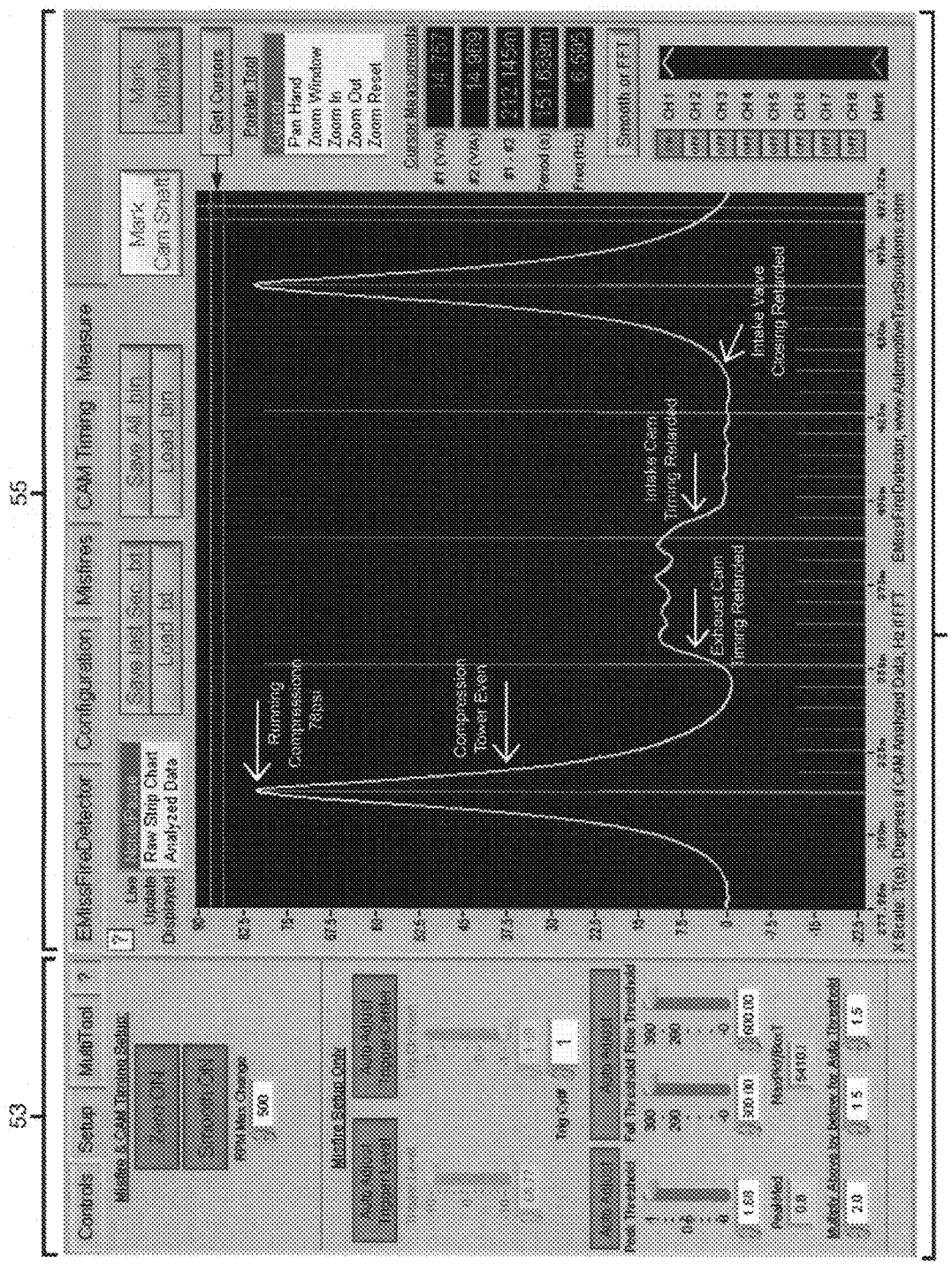
FIG. 33 is a screen display again showing Setup tab open and the Measure tab open to show the cylinder pressure waveform from a misfiring cylinder of a 1995 Dodge Van 3.0 liter engine with a regarded cam.
Figure 34:
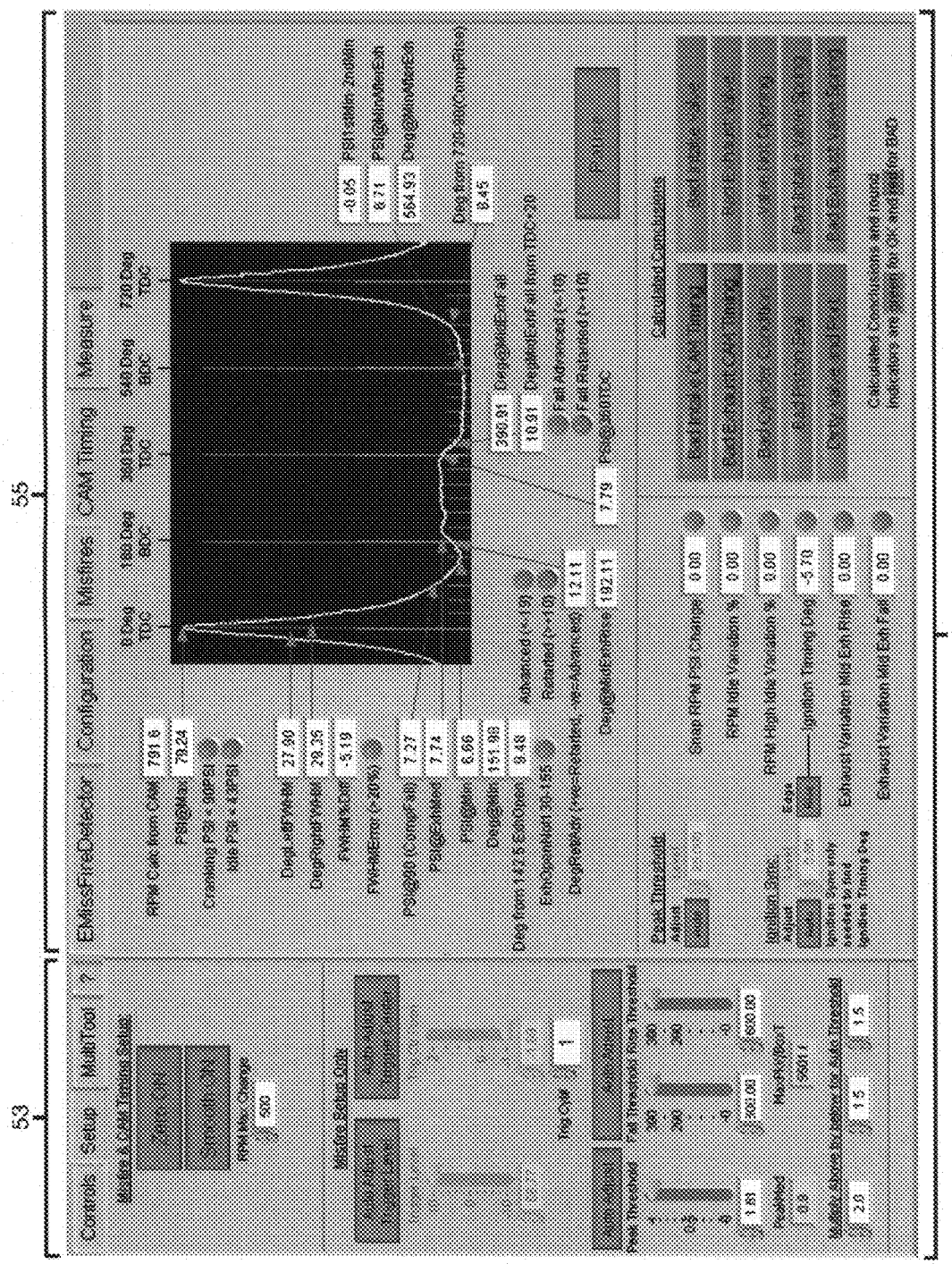
FIG. 34 is a screen display again showing the Setup tab open and CAM Timing tab open to show the evaluation of the waveform of FIG. 33 with the algorithms of Table IV.

In FIG. 33, the compression waveform from a misfiring cylinder in a 1995 Dodge van with a V-6 3 liter engine is shown. It is marked in the manual mode as discussed above. In FIG. 34 the pressure waveform from the missing cylinder of this same 3 liter engine is evaluated in the automated with algorithms set forth in Table IV. By evaluating where the exhaust plateau between the two compression peaks is located (including where the exhaust ramp crossed BDC (180°) and the intake ramp crossed TDC (360°)+20°) the exhaust valve opening and intake valve opening positions can be calculated. In this example the crankshaft degrees at the middle of the exhaust rise is 192.11°. (The bottom dead center mark is equal to 180° of crankshaft rotation. The center of the exhaust rising ramp occurs 12.11° after bottom dead center. When 180° is added to 12.11° the total crankshaft degrees equals 192.11°.) This indicates that the camshaft timing is 12.11° retarded. This is due to the exhaust ramp occurring after the bottom dead center mark which, in turn, shows that the camshaft is out of time (the cause of the misfire). With reference to FIG. 33 note that the cylinder pressure waveform is, for the purpose of illustration, marked as follows: "Running Compression 78 psi"; "Compression Tower Even"; "Exhaust Cam Timing Retarded"; "Intake Cam Timing Retarded"; and "Intake Valve Closing Retarded". In operation, this information (and comparable information in FIGS. 35, 37, 39, 42, 45 and 48) would not be displayed on the graph of the cylinder being tested. With reference to FIG. 34, the data as determined by the algorithms of Table IV, is set forth in the various boxes in the CAM Timing screen. Also, the alert lights are illuminated green (within range or good) or red (outside of range or bad) as indicated. Note that the Retarded (>+10) is red (indicating that the exhaust cam is retarded as discussed above) and the Fall Retarded (>+10) is also red indicating that the intake cam is also retarded. Also note that the Bad Intake CAM Timing and the Bad Exhaust CAM Timing alert lights (in the bottom right-hand portion of the window are red. (As the 1995 Dodge Van 3.0 liter engine has a single cam shaft for each bank if the exhaust cam is retarded the intake cam will also be retarded.) With further reference to FIG. 34, again note that the compression waveform is an idealized one (not intended to duplicate the actual waveform illustrated in FIG. 33) and that the red arrows are for purposes of explanation only and not present in actual operation.

By applying the above described methodology to engines that have cam phasing (generally referred to as variable valve timing or VVT) the operation (movement) of a VVT camshaft can be checked. In most VVT engines only the exhaust cams are on a VVT camshaft. However, some engines, such as Volvo engines, can have cam phasing on both the intake and exhaust cams which are on separate VVT camshafts. Problems associated with VVT camshafts include sticking gears, solenoid problems, PCM (powertrain control module) driver problems, wiring and circuit problems, and the oil line to the solenoid which activates the cam phasing being plugged.

Figure 35:
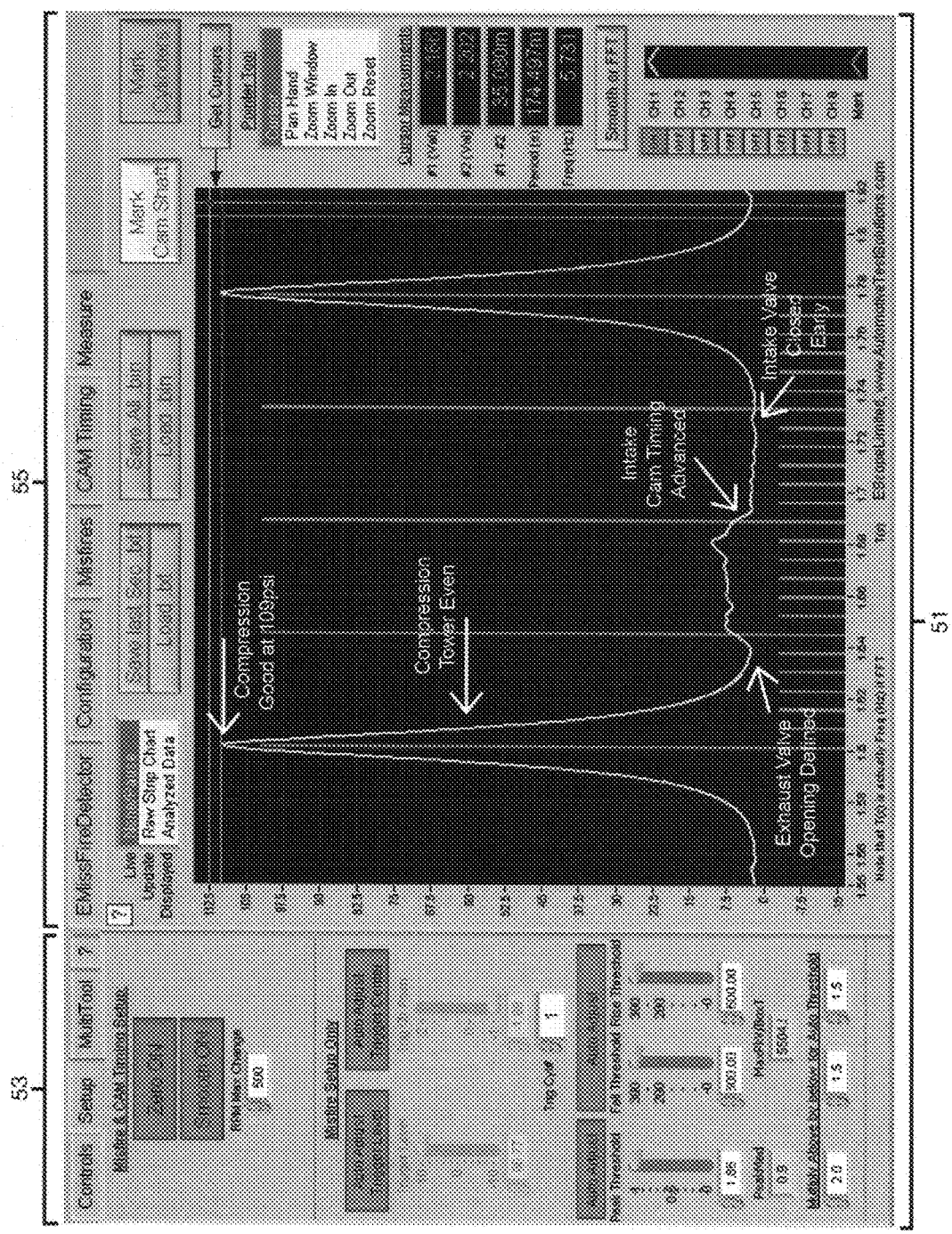
FIG. 35 is a screen display again showing Setup tab open and the Measure tab open to show the cylinder pressure waveform from a misfiring cylinder of a 2004 Volvo S60 engine with the intake VVT on and the intake cam timing advanced.
Figure 36:
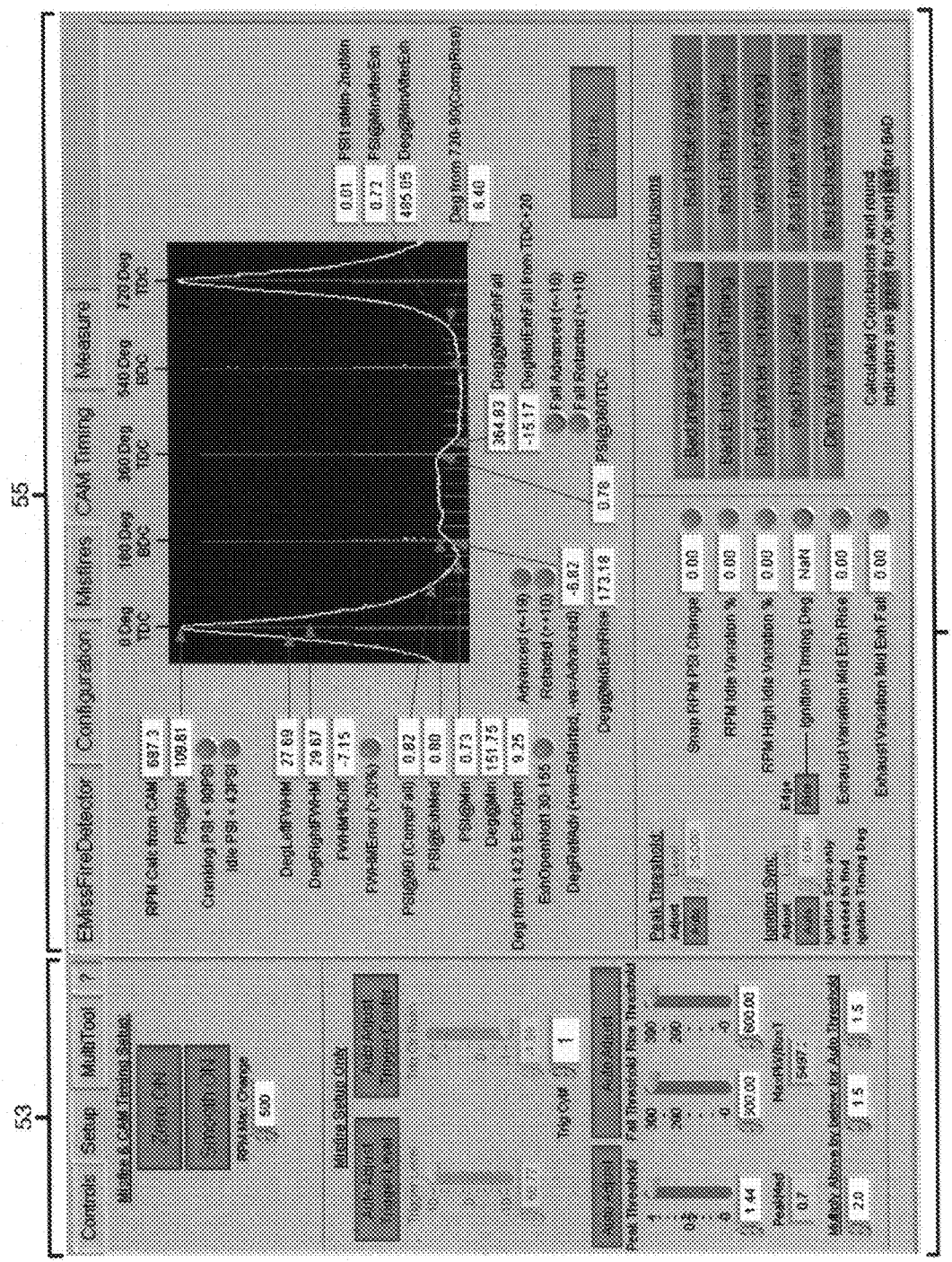
FIG. 36 is a screen display again showing the Setup tab open and the CAM Timing tab open to show the evaluation of the waveform of FIG. 35 with the algorithms of Table IV.

In a 2004 S60 Volvo VVT with a bank of missing cylinders the intake solenoid is activated to open an oil passage from the oil pump to the intake camshaft timing gear permitting oil pressure to rotate the intake camshaft position relative to the intake camshaft gear position. (VVT type engines have separate camshafts for the intake and exhaust valves.) This allows the intake camshaft timing to be phased or adjusted relative to the crankshaft position (as opposed to the previously described engines in which the position of the camshaft relative to the crankshaft is fixed). In FIG. 35 the compression waveform form from one of the missing cylinders from the missing bank has been manually marked for evaluation in the manner previously described. In FIG. 36 this same S60 Volvo engine compression waveform is evaluated with the algorithms identified above in Table IV. By evaluating where the exhaust plateau between the two compression peaks is located the exhaust valve opening and intake valve opening can be calculated. In this example the crankshaft degrees at the middle of the intake ramp is 364.83°. See the box immediately to the left of Deg@MidExhFall in FIG. 36. (Again note that screen names including the expression ExhFall are referencing the intake ramp. Thus, Deg@MidExhFall is the degrees at the middle of the intake ramp.) This indicates that the intake camshaft timing has moved 15.17° advanced, proving the VVT control is functional. However, if this VVT camshaft timing remains in this advanced position the random bank misfires and associated low power problem will continue.

Figure 37:
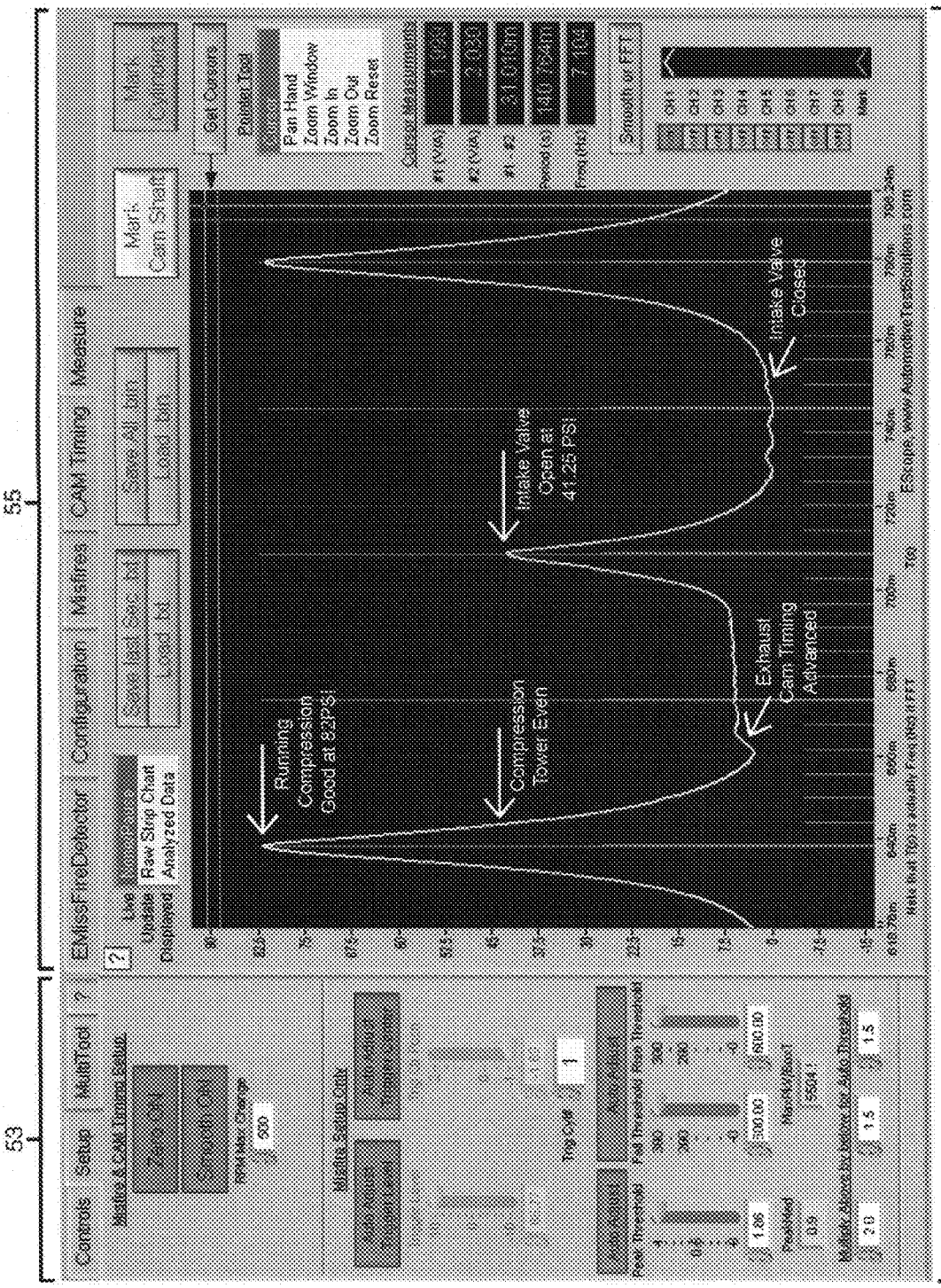
FIG. 37 is a screen display again showing the Setup open and the Measure tab open to show the cylinder pressure waveform from a misfiring cylinder of a 2004 Volvo S60 engine (the same engine as referenced in FIG. 35 with the exhaust VVT on and the exhaust cam timing advanced.
Figure 38:
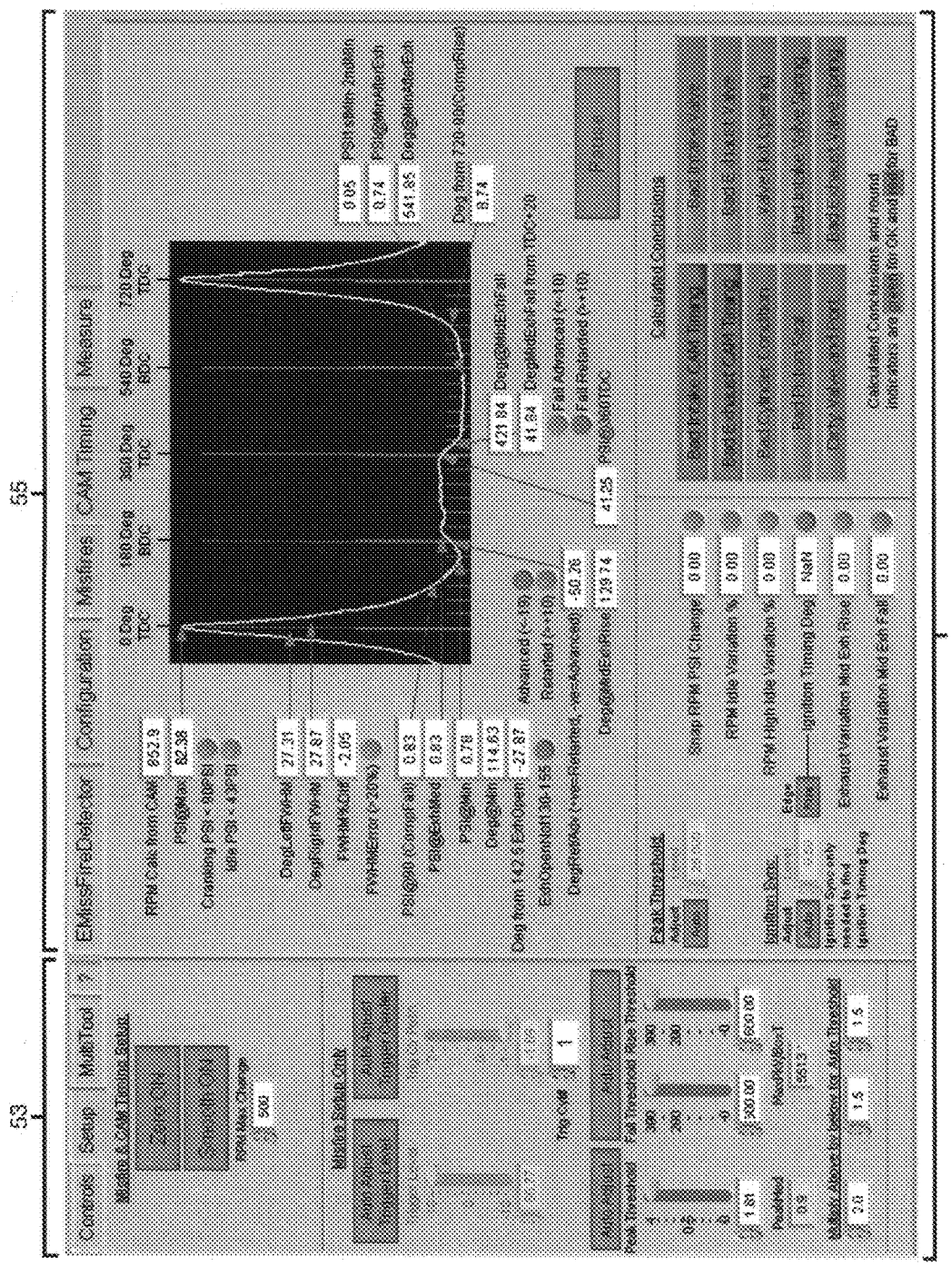
FIG. 38 is a screen display again showing the Setup tab open and the CAM Timing tab open to show the evaluation of the waveform of FIG. 37 with the algorithms of Table IV.

In the same 2004 S60 Volvo VVT as in the previous example (and with the same multiple intermittent misfires in the same bank) the exhaust solenoid was then activated to rotate the exhaust camshaft position relative to the crankshaft gear position. (Again note that the Volvo VVT engine has separate intake and exhaust camshafts; the intake camshaft is activated via the intake solenoid; and the exhaust camshaft is activated by the exhaust solenoid.) In FIG. 37 the cylinder pressure waveform from one of the missing cylinders has been manually marked for evaluation in the manner previously described. FIG. 38 shows the results of the analysis of this waveform with the previously described automated program. By evaluating where the exhaust plateau between the two compression peaks is located the exhaust valve opening and intake valve opening can be calculated. In this example the crankshaft degrees at the middle of the exhaust ramp is 129.74° (BDC (180°)–50.26° (the middle of the exhaust ramp)). That the exhaust ramp is advanced is quite evident from the graph in FIG. 37 as it is to the left of BDC) (180°. See "Exhaust Cam Timing Advanced" and the associated arrow. This same information is illustrated in the CAM Timing screen in FIG. 38, noting DegRetlAdv (+ve=Retarded, −ve=Advanced) and the number in the box to the immediate right. Also note the light associated with Advanced (<−19) is red, as is the Bad Exhaust CAM Timing alert light. This indicates that the camshaft timing has moved −50.26° advanced, proving the VVT control is functional. However, if this VVT function allows the camshaft timing to remain in this advanced position the intermittent bank misfires and low power problem will continue. Also note that in FIG. 37 that the pressure at TDC (360°) is very high indicating that the exhaust pressure could not be released out to the exhaust system. As with the other cam timing examples, the information on the graph of FIG. 37 and the associated arrows is for purposes of illustration and are not present in actual operation. Similarly, the red arrows in FIG. 38 are for purposes of illustration only.

Figure 39:
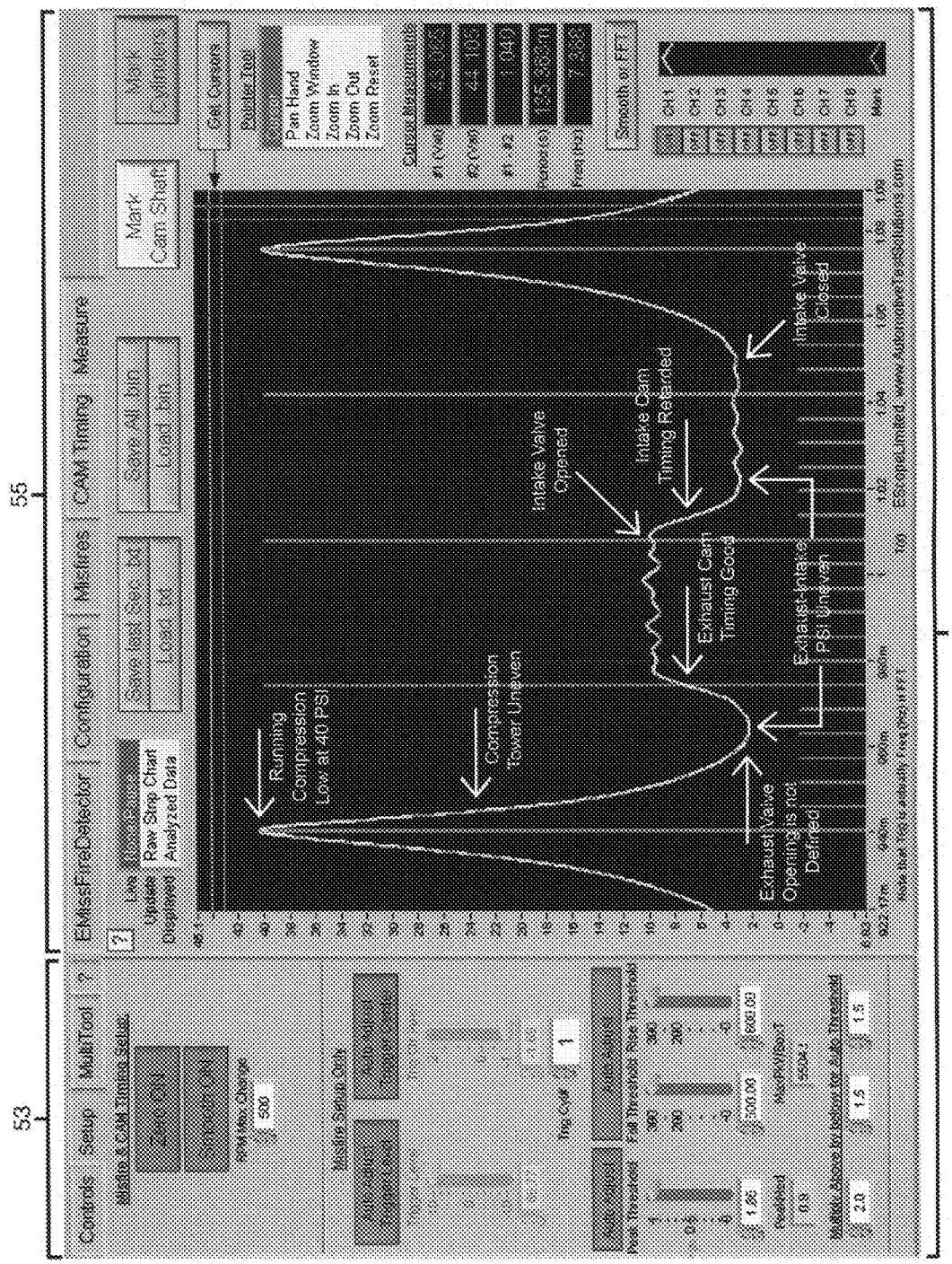
FIG. 39 is a screen display again showing the Setup tab open and the Measure tab open to show the cylinder pressure waveform from a misfiring cylinder of a 2000 Ford Taurus 3 liter engine with a broken exhaust valve spring.
Figure 40:
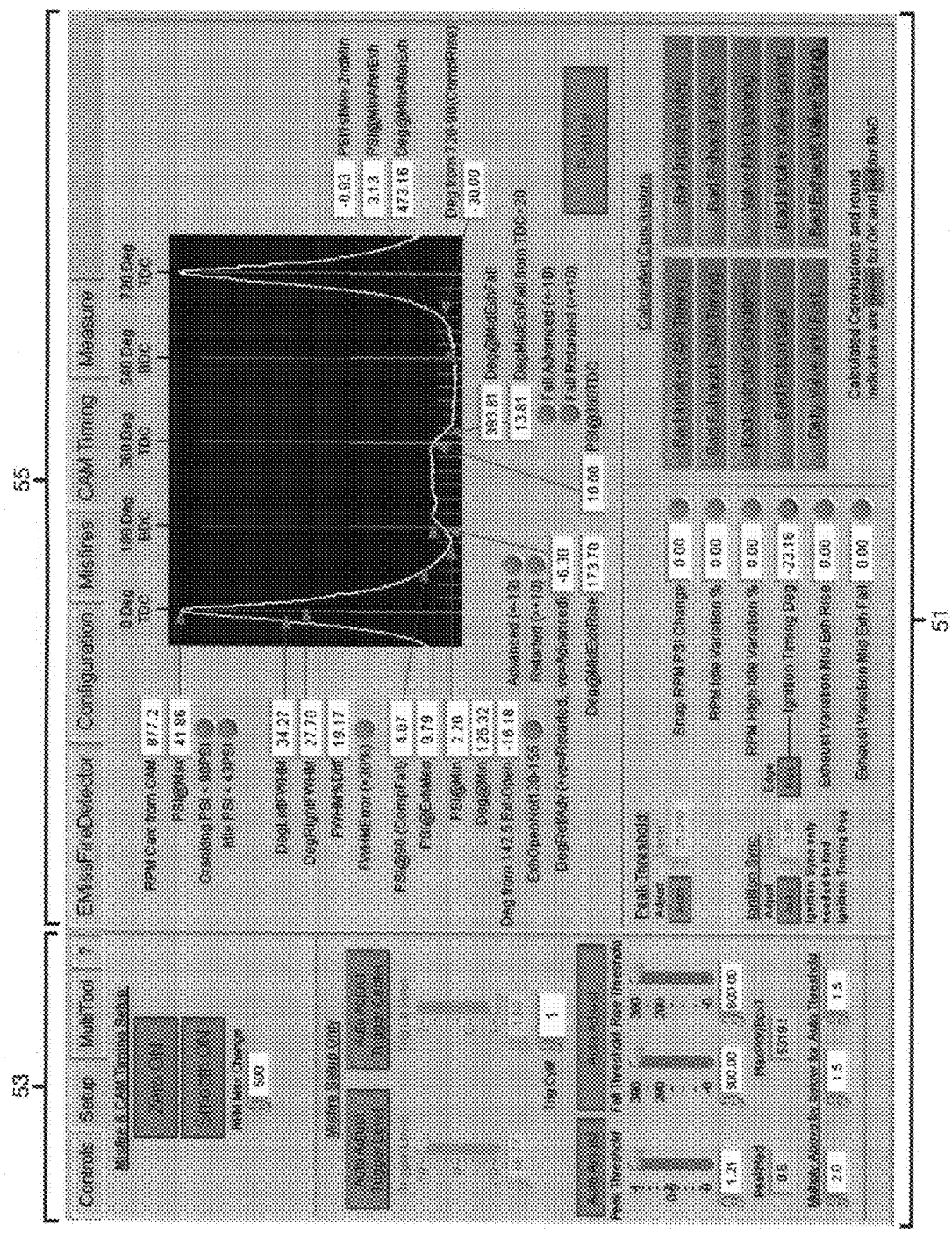
FIG. 40 is a screen display again showing the Setup tab open and the CAM Timing tab open to show the evaluation of the waveform of FIG. 39 with the algorithms of *Table IV,* noting that the Bad Exhaust Valve Spring alert light is illuminated.
Figure 41:
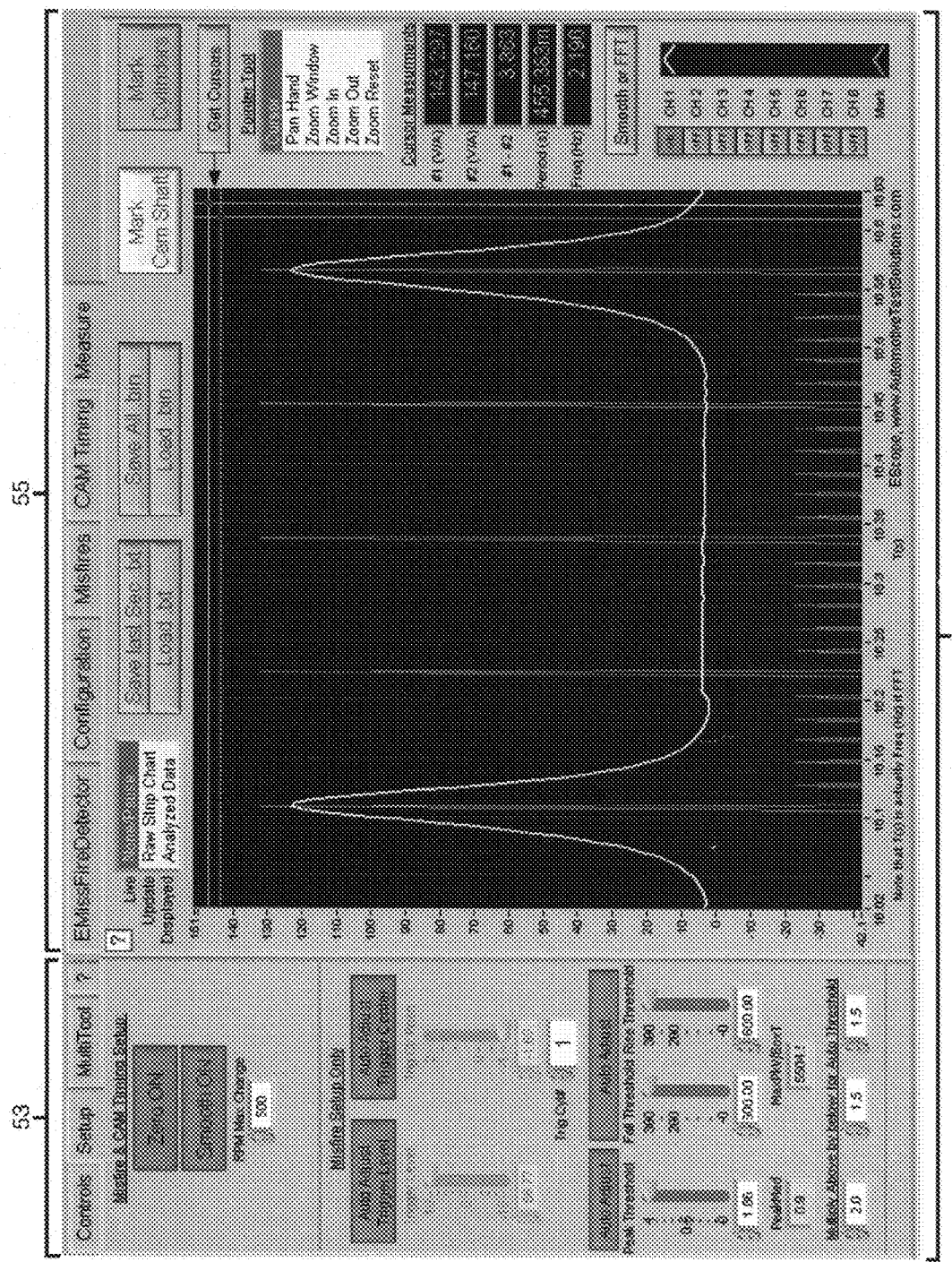
FIG. 41 is a screen display again showing the Setup tab open and Measure tab open to show the cylinder pressure waveform from the misfiring cylinder of the same Taurus engine referenced in FIG. 39, but with the engine cranking to show the cranking cylinder pressure waveform instead of the idle cylinder pressure waveform.

In FIG. 39 the compression waveform from the missing cylinder in a 2000 Ford Taurus with a V-6 3 liter engine has also been manually marked for evaluation. In FIG. 40 the same compression waveform is evaluated with an automated program discussed above. By evaluating where the exhaust plateau between the two compression peaks is located the exhaust valve opening and intake valve opening can be calculated. In this example the crankshaft degrees at the middle of the exhaust ramp is correct. Note the green lights associated with both Advanced (<−19) and Retarded (>=10). (Again, note that as it appears on the screen in FIG. 40, Retarded is inadvertently miss-spelled as "Retarted".) Also note the −1.88° value in the box to the immediate right of DegRet/Adv (+ve=Retarded, −ve=Advanced), which is within the −10°-+15° range set forth in paragraph [00119]. However, the crankshaft degrees at the middle of the intake ramp are 393.81°, as indicated by the box to the immediate left of Deg@MidExhFall. This indicates that the intake cam timing is 13.81° retarded as also shown in FIG. 40 where the Fall Retarded (>+10) light is red. It is also important to notice in FIGS. 39 and 40 that the peak compression waveform is uneven. The left tower is 34.27° at full width half mast. See the box to the immediate right of DegLeftFWHM. The right side of the tower, DegRightFWHM, is 27.70° and the difference, WFHM % Diff, is 19.17°. When this tower is uneven it indicates that one of the valves have a problem. By checking the degrees at exhaust valve opening (126.32°) the valve opened −16.18° advanced. See Deg@Min and Deg from 142.5 ExhOpen in FIG. 40. This data and the smoothness of the curve between the Compression Tower and the exhaust plateau (there is no definite opening point such as illustrated in FIGS. 25A-C) shows that the exhaust valve is not seating. The peak pressure at running idle, 41.86 psi (the box to the immediate right of PSI@Max in FIG. 40), shows that there is not enough pressure at idle. Checking the cranking compression, FIG. 41, shows 120 psi, which indicates good cranking pressure. This data indicates that the exhaust valve spring is bad and the cause of the misfire because, at cranking RPM this valve spring has enough pressure to still close the valve. However, once the engine RPM is increased the spring pressure is compromised and cannot close the valve.

In the lower right hand quadrant of screen 55 in FIG. 40 is a box marked "Calculated Conclusions" which includes the alert lights: "Bad Intake CAM Timing"; "Bad Exhaust CAM Timing"; "Bad Cylinder Condition"; "Bad Piston Seal"; "Dirty Valve and Port"; "Bad Intake Valve"; "Ban Exhaust Valve"; "Valve Not Opening"; "Bad Intake Valve Spring"; and "Bad Exhaust Valve Spring". Below these alert lights is the informational statement "Calculated Conclusions and round indicators are green for OK and red for BAD." The round indicators are the round lights in the top half of the CAM Timing screen. The analysis of the date from the missing cylinder of the 2000 Ford Taurus V-6 3 liter engine with the algorithms set forth in Table IV determines the color of the Calculated Conclusions alert lights. Since this cylinder has a bad exhaust valve spring, as discussed above, the Ban Exhaust Valve Spring light is illuminated red. While the intake cam is retarded, as discussed in the previous paragraph, the Bad Intake CAM Timing alert light is not red as the retarded cam is due to a slow vacuum increase, which is due to a leaking exhaust valve, which (in turn) is due to the bad exhaust valve spring. Thus, the intake ramp appears retarded because of a pressure problem, not because of a cam problem. Replacing the exhaust valve spring on the missing cylinder corrected the problem; no adjustment of the cam timing was necessary.

Figure 42:
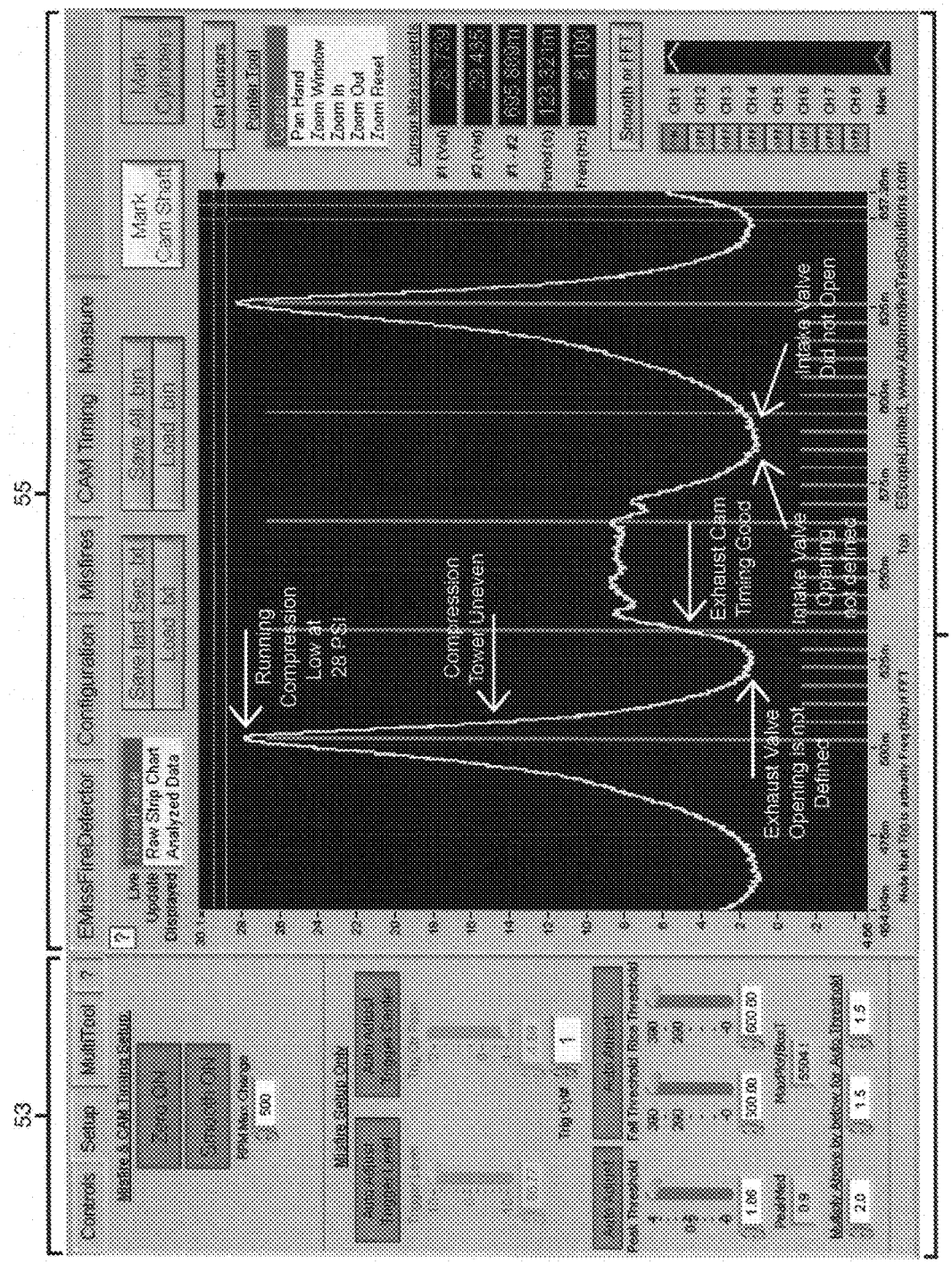
FIG. 42 is a screen display again showing the Setup tab open and the Measure tab open to show the cylinder pressure waveform from a misfiring cylinder of a 2006 Ford 5.4 liter engine with the intake valve not opening.
Figure 43:
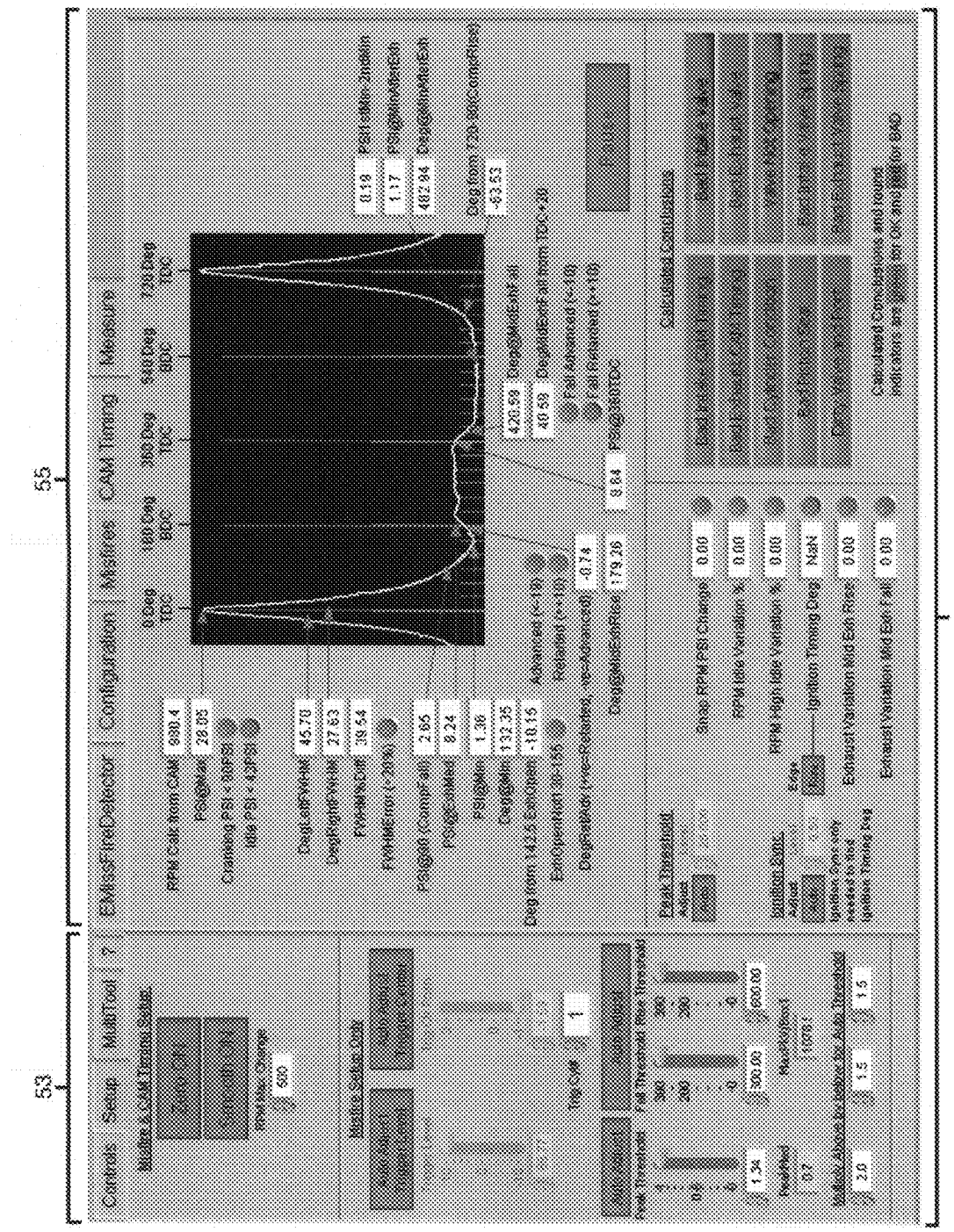
FIG. 43 is a screen display again showing the Setup tab open and the CAM Timing tab open to show the evaluation of the waveform of FIG. 42 with the algorithms of Table IV.
Figure 44:
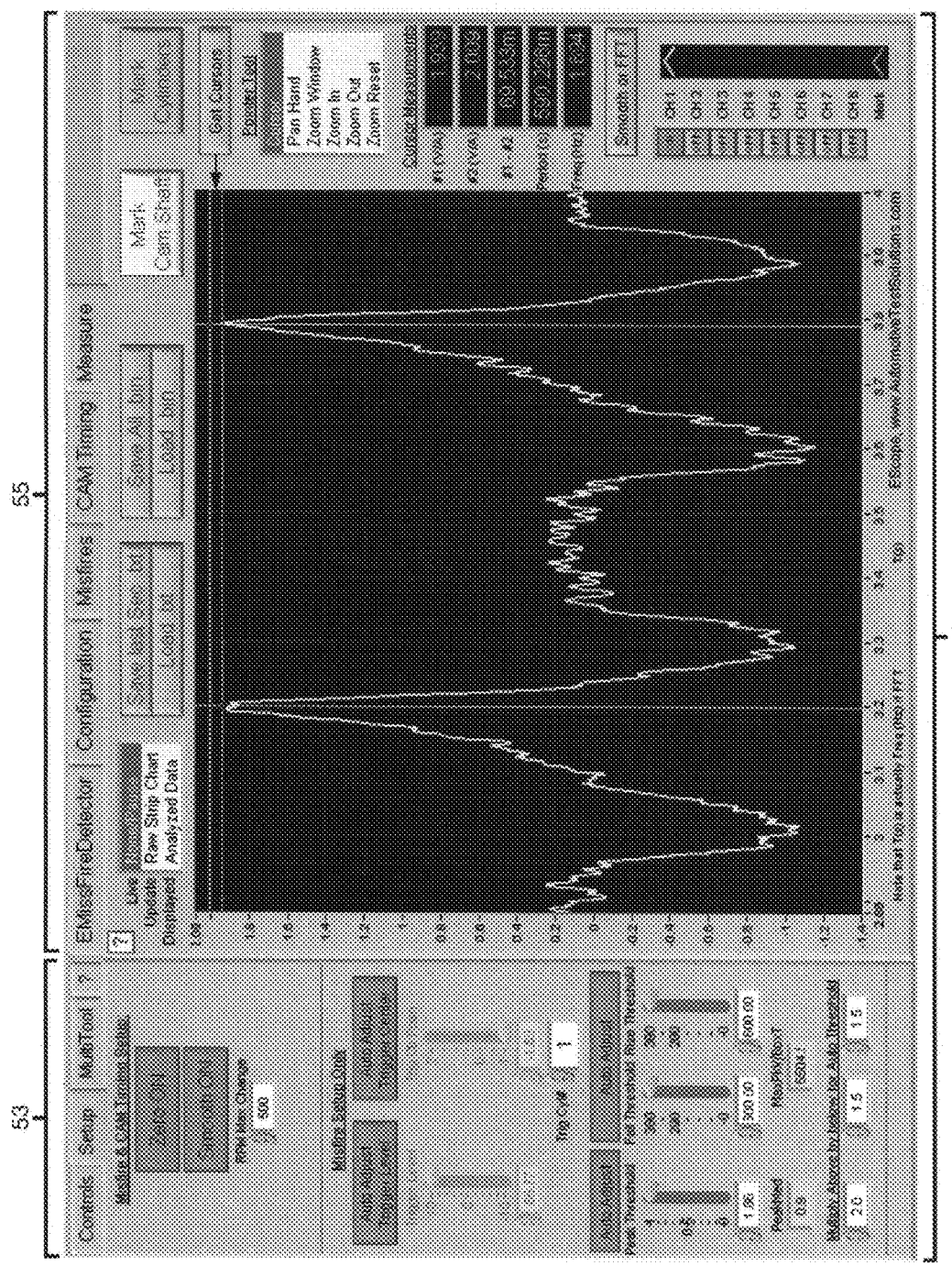
FIG. 44 is a screen display again showing the Setup tab open and Measure tab open to show the cylinder pressure waveform from a misfiring cylinder of the same Ford 5.4 liter engine referenced in FIG. 42, but with the engine cranking to show the cranking cylinder pressure waveform instead of the idle cylinder pressure waveform.

In FIG. 42 the cylinder pressure waveform (again, sometimes referred to as the compression waveform) from the missing cylinder of a 2006 Ford 5.4 liter engine has been manually marked for evaluation in the manner previously described. In FIG. 43 this same waveform is evaluated with the algorithms of Table IV. As before, by evaluating where the exhaust plateau between the two compression peaks is located the exhaust valve opening and intake valve opening can be calculated. In this example the crankshaft degrees at the middle of the intake ramp is 420.59° (see Deg@MidExhFall in the middle of the CAM Timing screen, which indicates that the intake cam timing is −40.59° advanced. (For the exhaust cam the middle of the exhaust ramp is 179.26°, as indicated by Deg@MidExhRise in the middle of FIG. 43, which is within the engine's normal operating range.) It is also important to notice that the peak compression waveform is uneven. See FIG. 42 as the waveform on all the CAM Timing screens is the same (e.g., FIGS. 38, 40, and 43) and not a duplicate of the actual waveform as it appears on the graph on the Measure screen. The left tower is 45.7° at full width half mast. The right tower is 27.63° at full width half mast. This is a difference of 39.54%. Again, an uneven tower indicates a valve problem. By checking the degrees at exhaust valve opening of 132.35°, the exhaust valve opened at the correct time. Checking the peak pressure at running idle, 28.05 psi (see PSI@Max in the upper hand portion of the CAM Timing screen), shows not enough pressure at idle. Checking the cranking compression, FIG. 44, shows 2.1 psi, which indicates poor cranking pressure. Also note that the compression towers are uneven and the exhaust plateau has definition even though at low vacuum during cranking it should not. This data indicates that intake valve is not opening. In the automated mode this is indicated to the automotive technician by the Bad Intake Valve and Valve Not Opening alert lights being illuminated red. With this information the technician knows that the intake valve for the missing cylinder is not opening and that the valve cover needs to be removed to permit inspection. This, in turn, would permit the technician to check if the rocker arm is broken or fallen out or, possibly, that the cam lobe has worn away and is flat.

Figure 45:
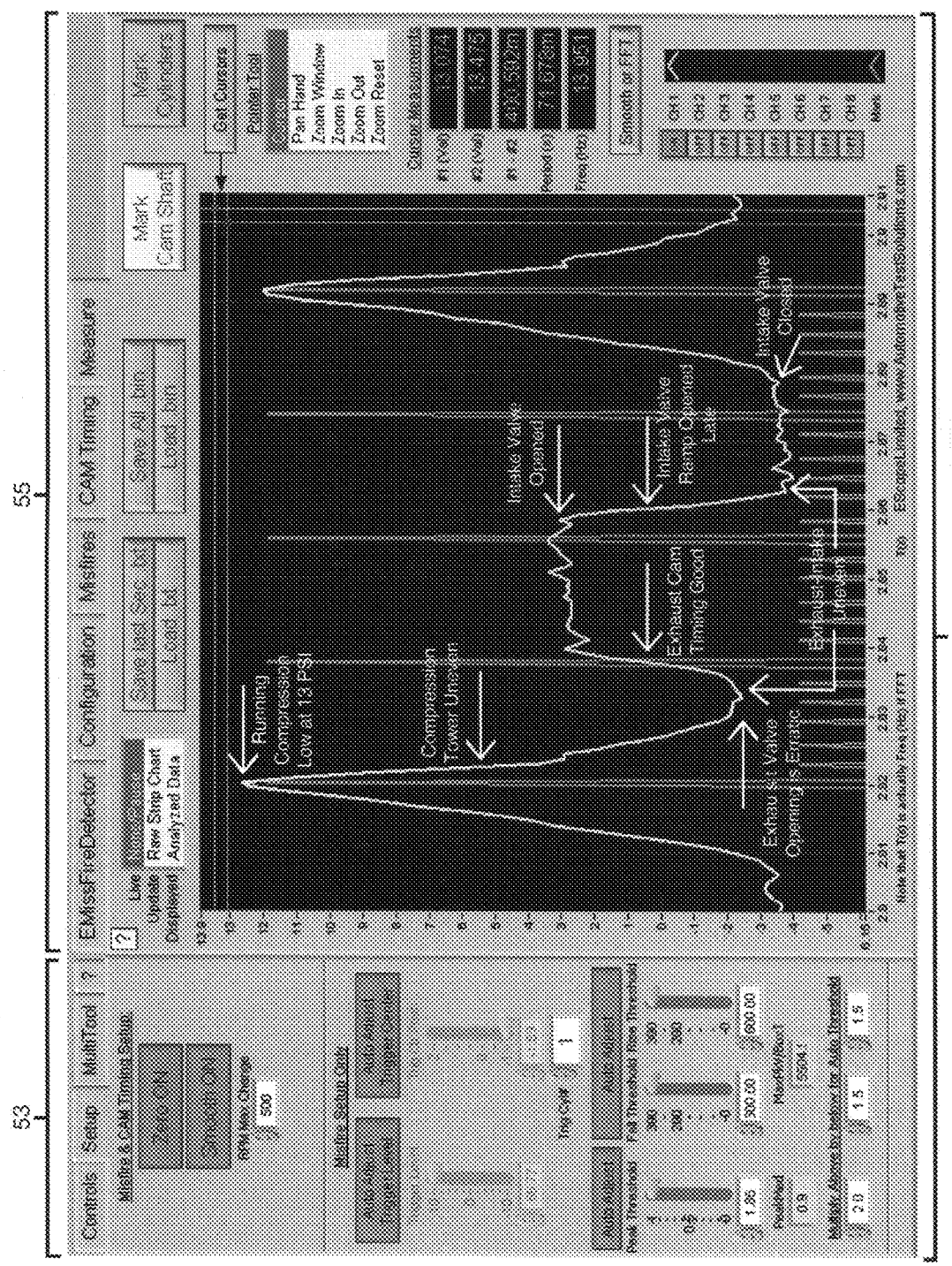
FIG. 45 is a screen display again showing the Setup open and Measure tab open to show the cylinder pressure waveform from a misfiring cylinder of a Toyota 4Runner 3.0 liter engine with a bad exhaust valve.
Figure 46:
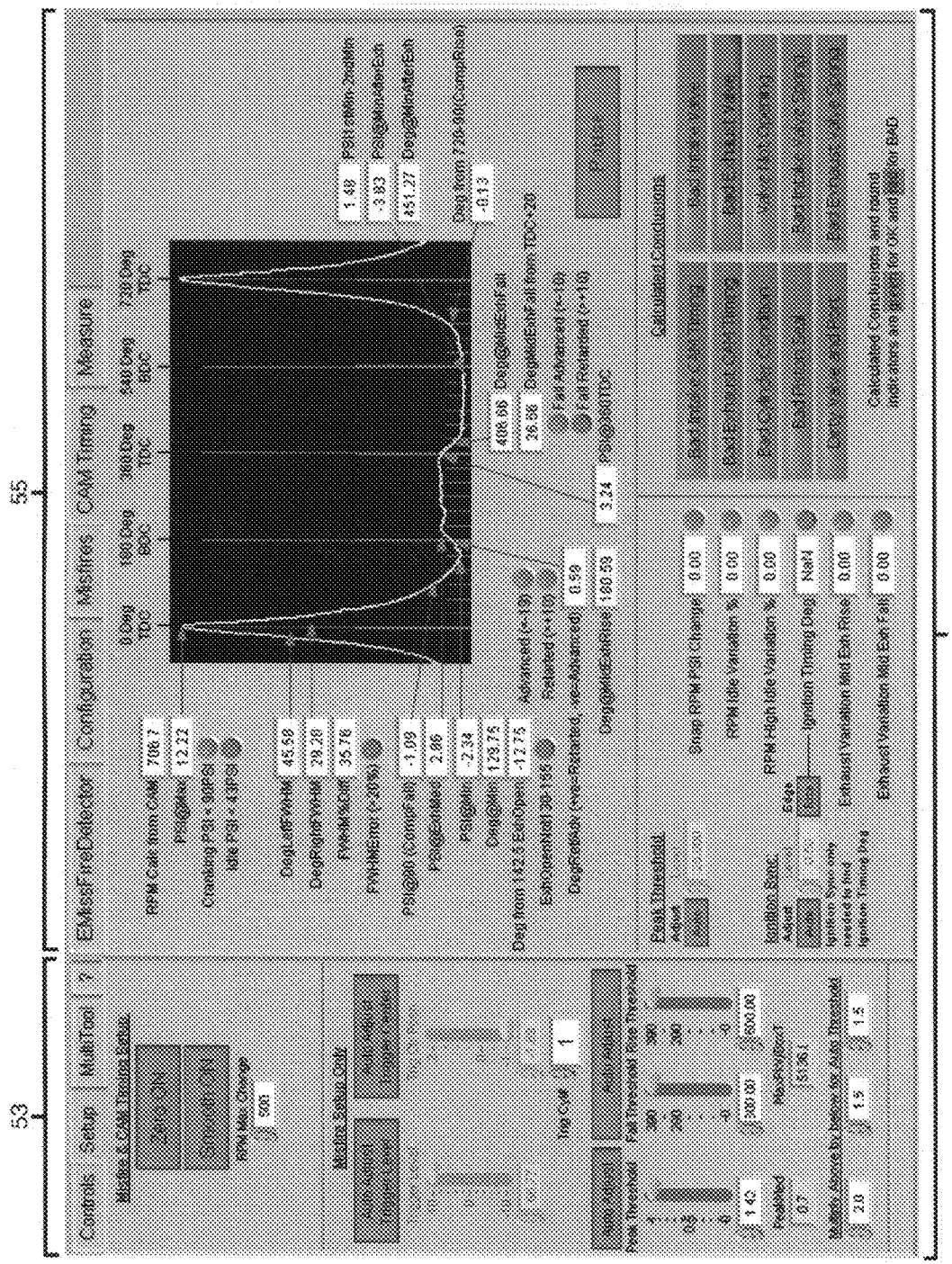
FIG. 46 is a screen display again showing the Setup tab open and the CAM Timing tab open to show the evaluation of the waveform of FIG. 45 with the algorithms of Table IV.
Figure 47:
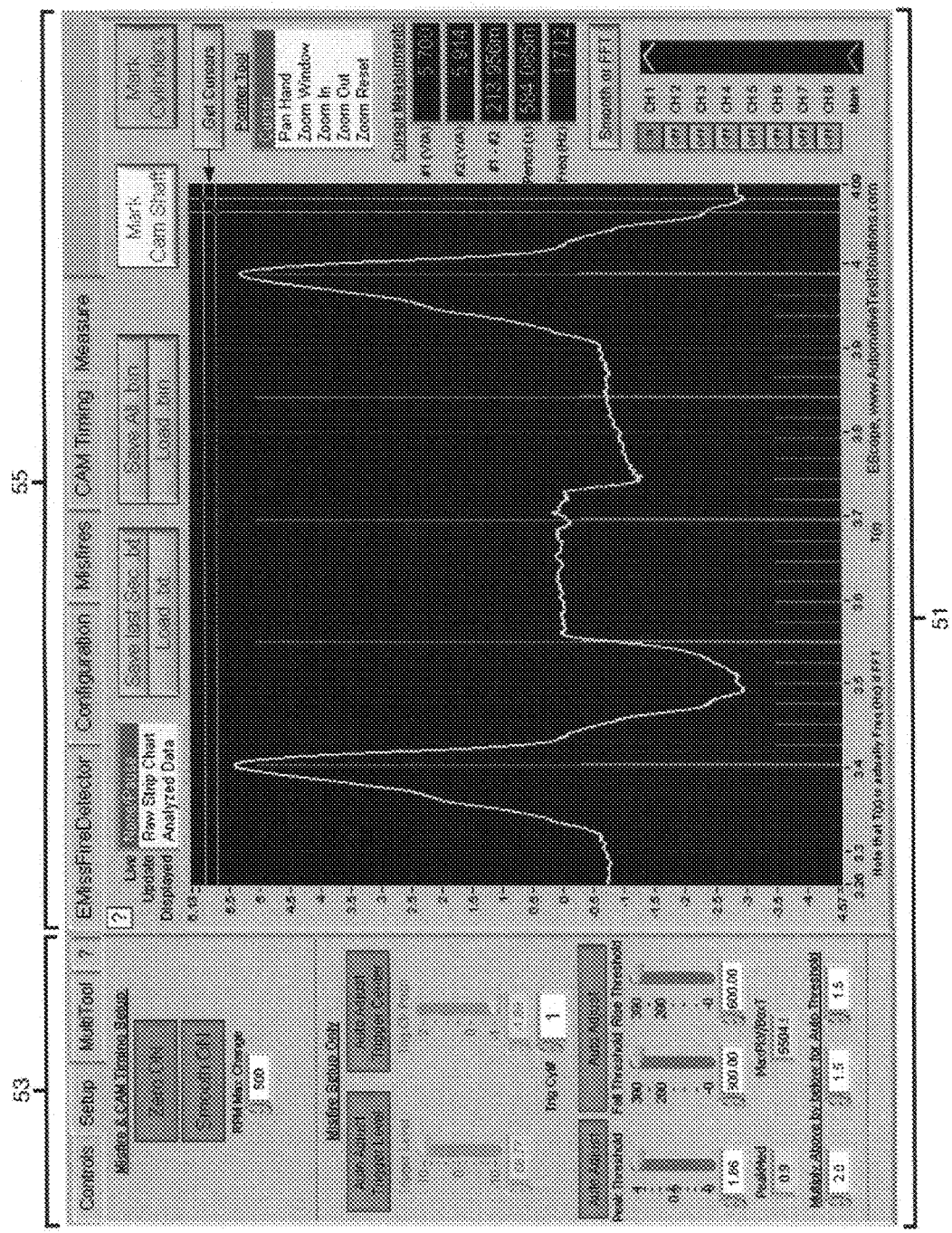
FIG. 47 is a screen display again showing the Setup tab open and the Measure tab open to show the cylinder pressure waveform from a misfiring cylinder of the same *Toyota* 3.0 liter engine, but with the engine cranking to show the poor cranking pressure.

In FIG. 45 the cylinder compression waveform from the missing cylinder in a 1997 Toyota 4runner 3.0 liter engine has been manually marked for evaluation. In FIG. 46 this is evaluated with the algorithms of Table IV. As before, by evaluating where the exhaust plateau between the two compression peaks is located the exhaust valve opening and intake valve opening can be calculated. In this example the crankshaft degrees at the middle of the intake ramp is 406.66°, which indicates that the camshaft timing is 26.66° retarded. The data for the exhaust rise, as indicated in FIG. 45 is within range. Note, however, that the peak compression waveform is uneven. The left tower is 45.58° at full width half mast. The right tower is 29.28° at full width half mast. This is a difference of 35.76%. Again, an uneven tower indicates a valve problem. By checking the degrees at exhaust valve opening of 129.75°, the valve opened at the correct time. Checking the peak pressure at running idle, 12.22 psi (see the value in the box to the right of PSI@Max), shows not enough pressure at idle. Checking the cranking compression, FIG. 47, shows 5.63 psi which indicates poor cranking pressure. This data indicates that exhaust valve is not sealing. In the automated mode the algorithms of Table IV provide this information to the technician by illuminating Bad Exhaust Valve red.

Figure 48:
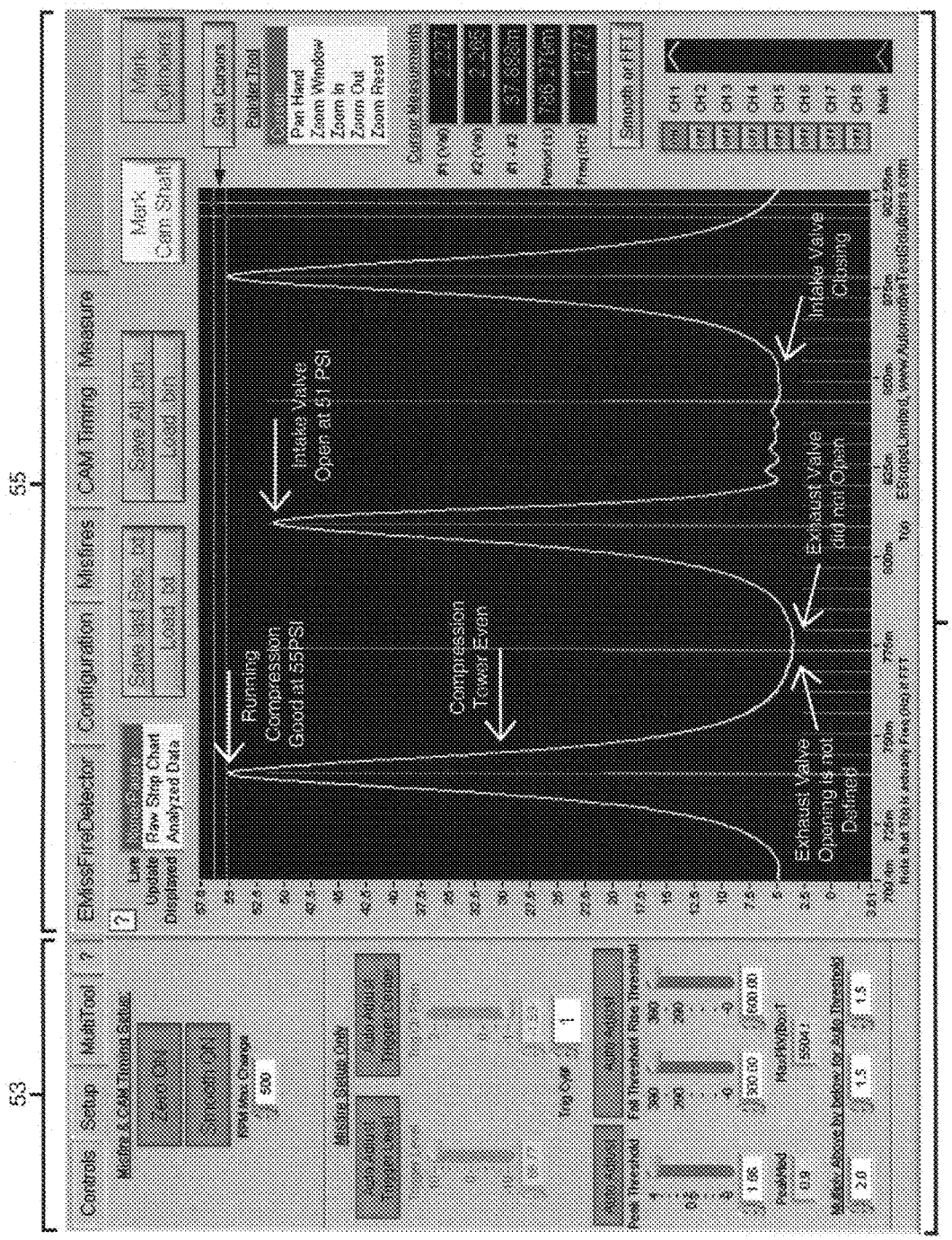
FIG. 48 is a screen display again showing the Setup tab open and the Measure tab open to show the cylinder pressure waveform from a misfiring cylinder of a 1993 Dodge Van 3.3 liter engine with the exhaust valve not opening on the missing cylinder.
Figure 49:
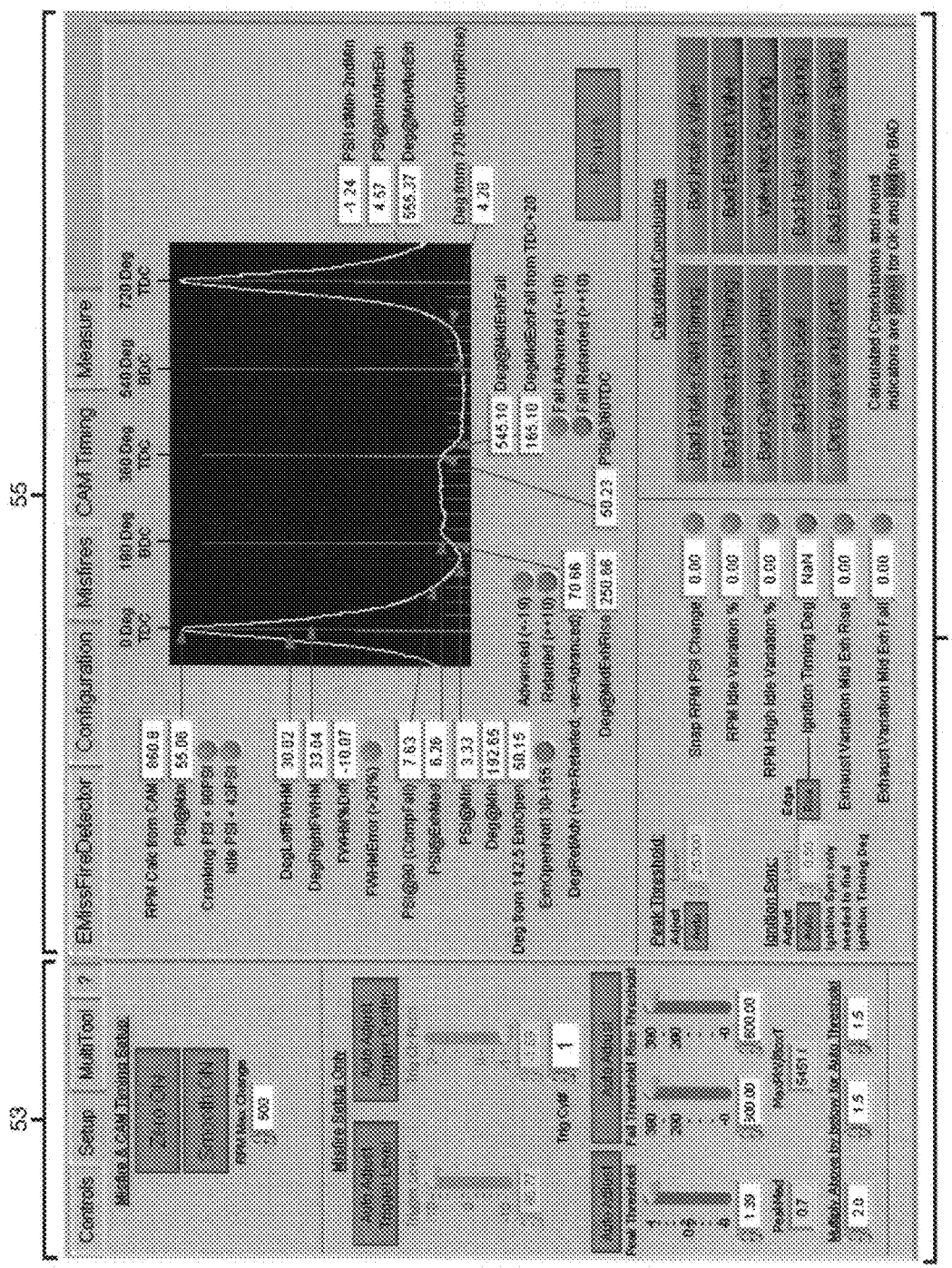
FIG. 49 is a screen display again showing the Setup tab open and the CAM Timing tab open to show the evaluation of the waveform of FIG. 48 with the algorithms of Table IV.

In FIG. 48 the waveform from the misfiring cylinder of a 1993 Dodge van with a 3.3 liter engine has also been manually marked for evaluation. In FIG. 49 the same waveform is evaluated with the algorithms running. As before, by evaluating where the exhaust plateau between the two compression peaks is located the exhaust valve opening and intake valve opening can be calculated. In this example the crankshaft degrees at the middle of the intake ramp is 545.10°. This indicates that the intake cam timing is 165.10° retarded. See the values in the boxes to the immediate left of Deg@MidExhFall and DegMidExhFall from TDC+20 in FIG. 49. The exhaust valve opening point is 192.65°. This indicates that the exhaust valve opening would be 50.15° retarded. It is important to notice in FIG. 49 that the pressure @ TDC (360°) is 50.23° (illustratively marked as 51 PSI in FIG. 48), which is very high for the exhaust plateau. Such a high pressure at this point indicates that the exhaust valve movement is very retarded (in this case it is 50.15° retarded) or the exhaust valve is not opening, or the cam lobe is worn, or the exhaust outlet is restricted. If the camshaft is retarded the valve opening would also be retarded. The exhaust valve having a retarded opening point and high pressure at TDC indicates the exhaust valve did not open. With reference to the CAM Timing screen in FIG. 49 the foregoing is indicated by the red lights to the right of both ExhOpenNot130-155 and Retarded (>+10), and the red alert lights Bad Exhaust Valve and Valve Not Opening. With this information the valve cover was removed which revealed that the exhaust rocker arm for the missing cylinder was broken which was the reason the exhaust valve was not opening. The rocker arm was replaced which eliminated the misfire.

Figure 50:
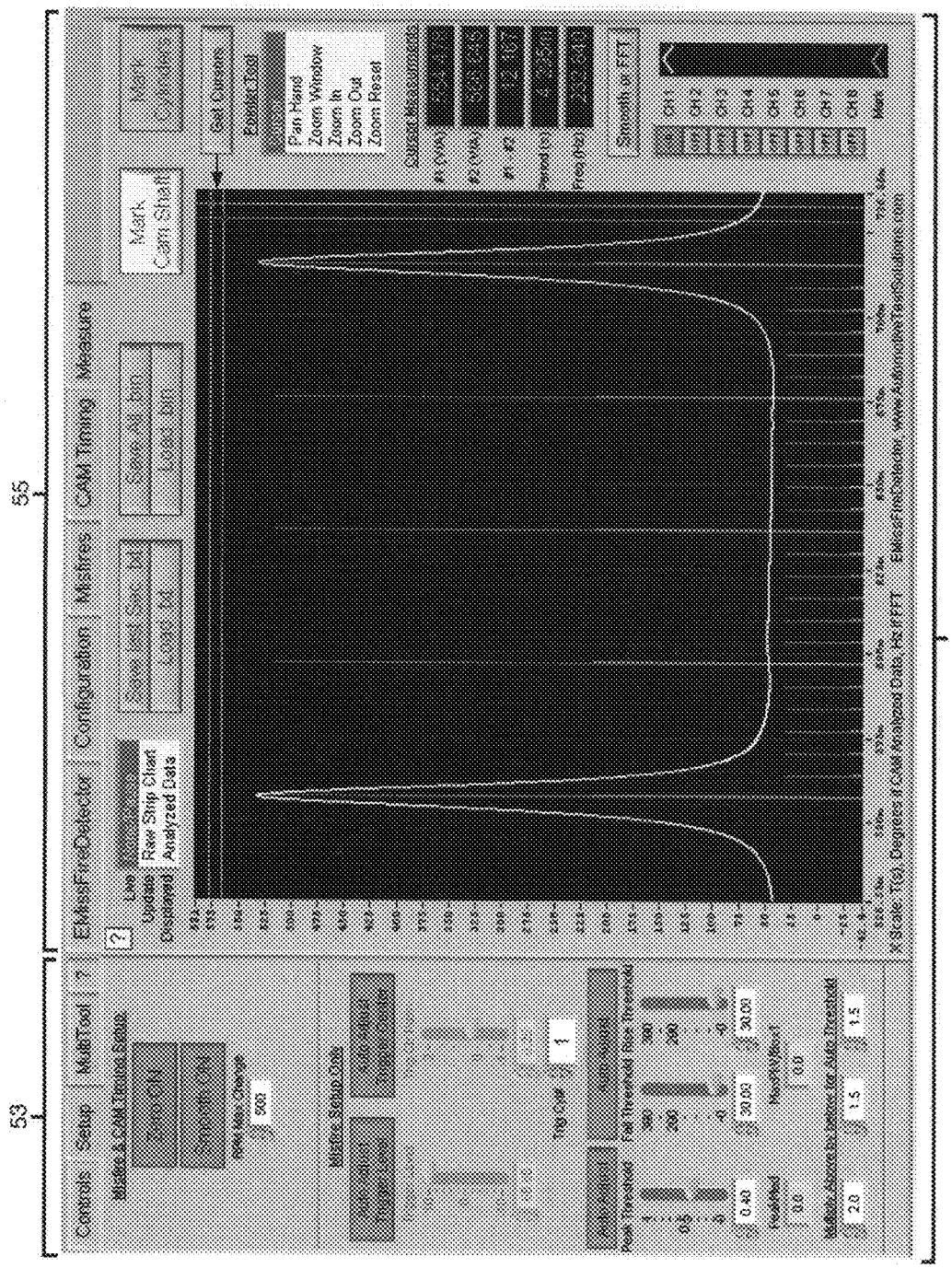
FIG. 50 is a screen display again showing the Setup open and the Measure tab open to show the cylinder pressure waveform from a cylinder of a 1990 Ford 6.2 liter diesel without a misfire.
Figure 51:
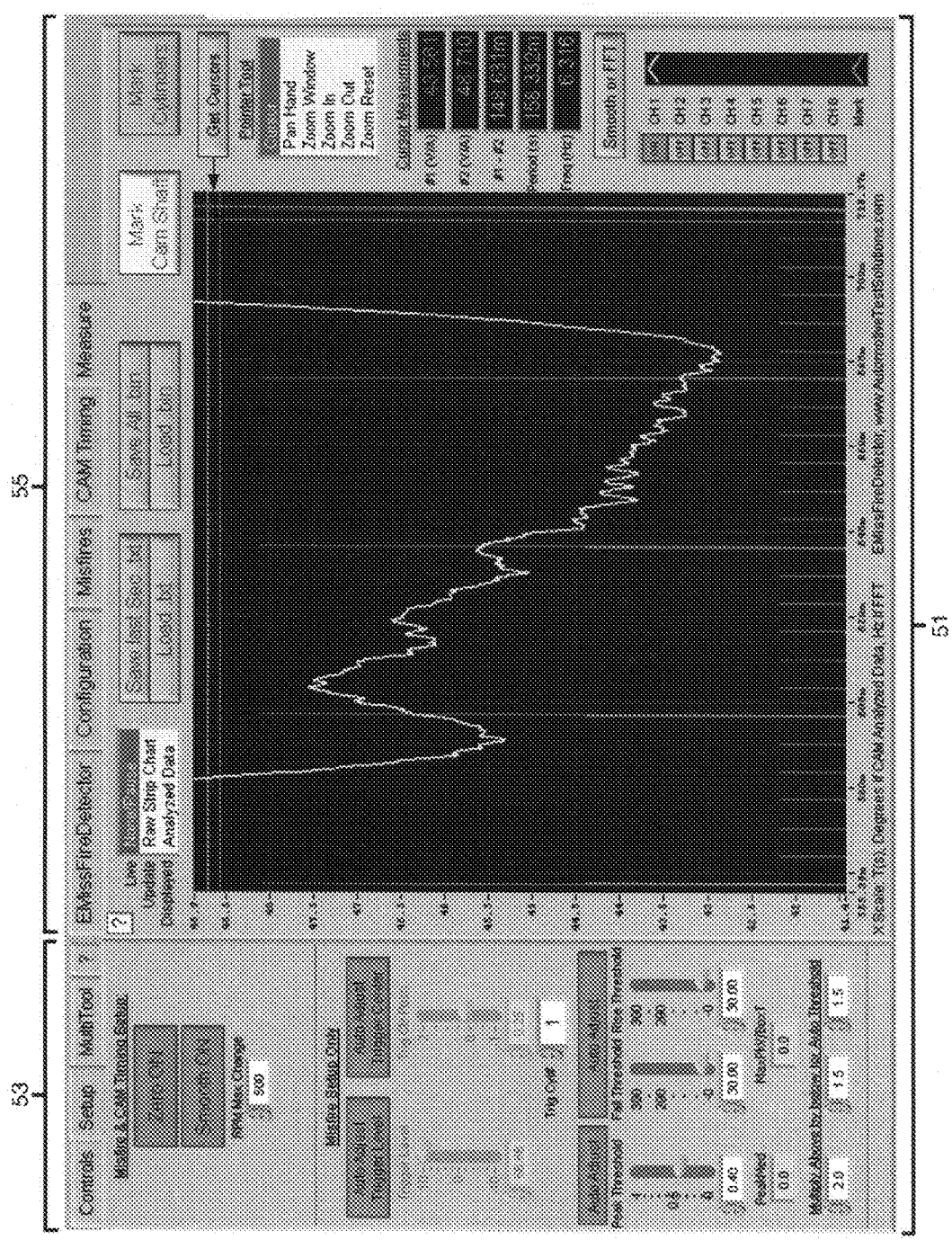
FIG. 51 is a screen display again showing the Setup tab open and the Measure tab open to show the cylinder pressure waveform from the same cylinder of the same 1990 For 6.2 liter diesel, but with the exhaust plateau magnified.
Figure 52:
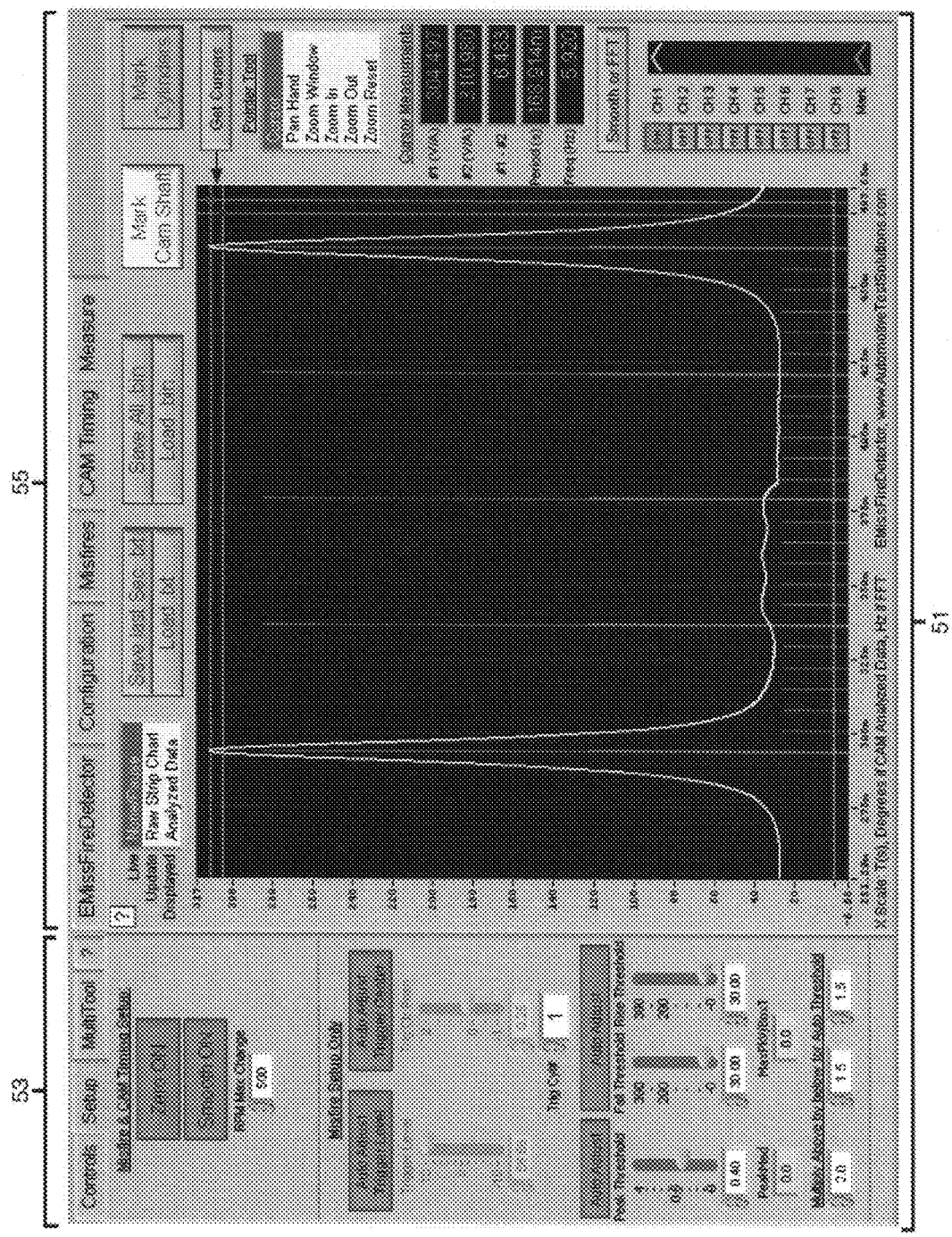
FIG. 52 is a screen display again showing the Setup tab open and the Measure tab open to show the cylinder pressure waveform from the same cylinder of the same Ford 6.2 liter diesel engine, but with a restriction placed over the induction inlet.
Figure 53:
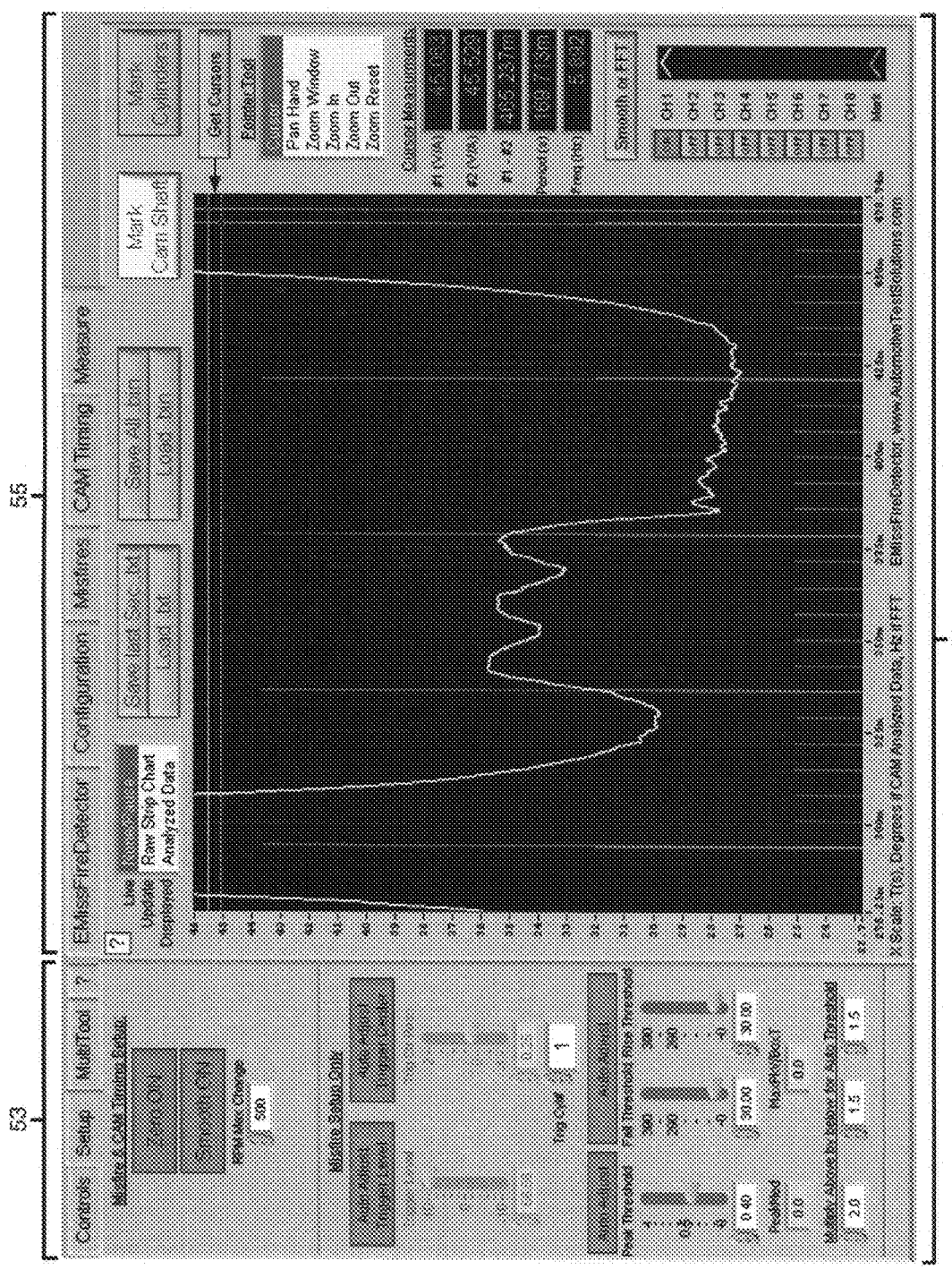
FIG. 53 is a screen display again showing the Setup tab open and the Measure tab open to show the cylinder pressure waveform from the same cylinder of the same Ford 6.2 liter diesel engine, but with a restriction placed over the induction inlet and with the exhaust plateau magnified.
Figure 54:
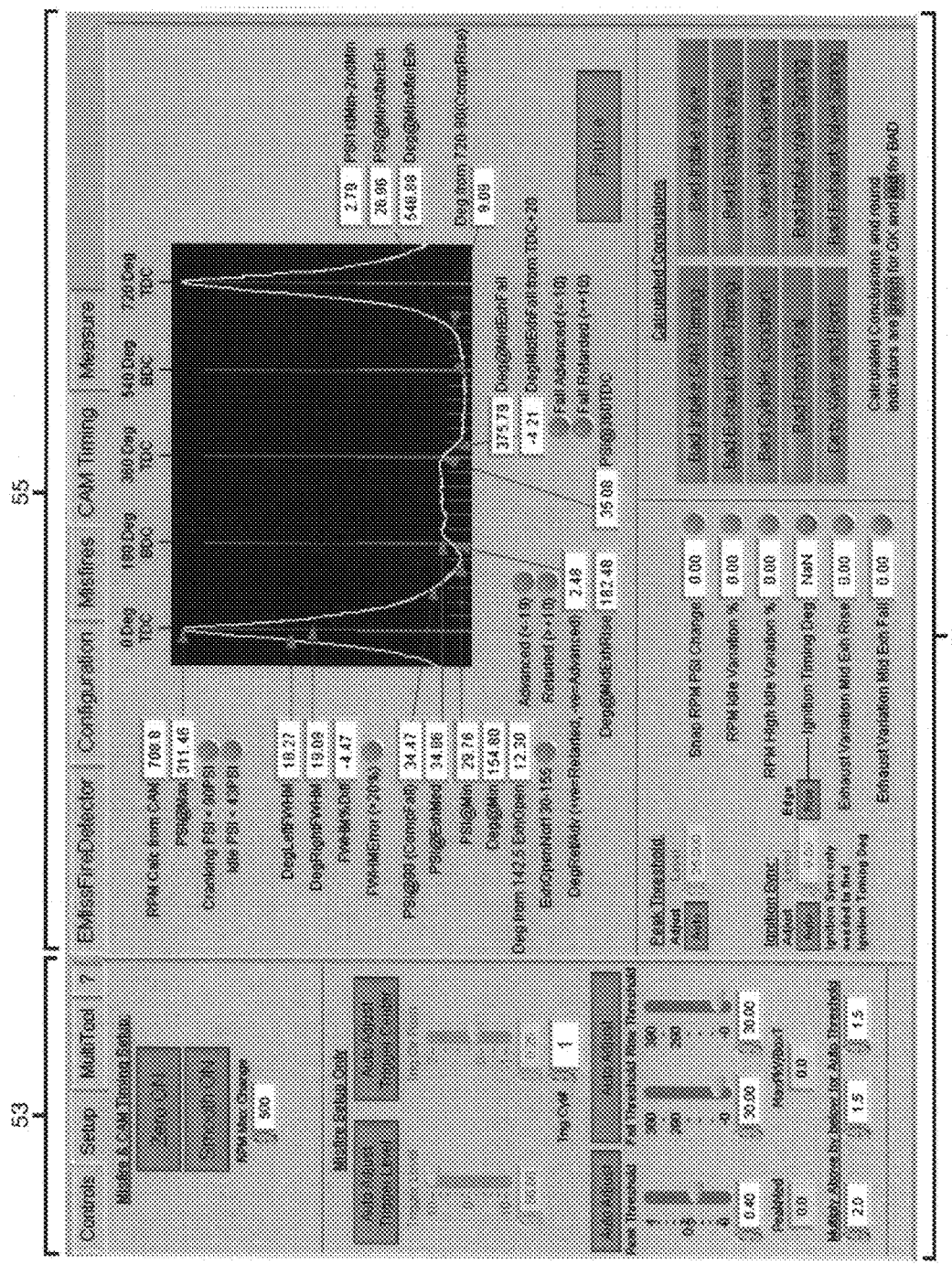
FIG. 54 is a screen display again showing the Setup tab open and the CAM Timing tab open to show the evaluation of the waveform of FIGS. 52 and 53 with the algorithms of Table IV.

As previously indicated, the present the apparatus and methodology of the present invention also works for compression ignition (or CI) engines. In FIG. 50 the compression waveform from a 6.2 liter Ford diesel taken at idle is illustrated. It is important to note that in a normally running CI engine (no misfire) the exhaust plateau is very small and is hard to see in the waveform. In FIG. 51 the exhaust plateau is magnified and can now be readily seen. Note that the y-axis scale in FIG. 50 is −42.4-591 psi, while in FIG. 51 it is 41.4-48.9 psi. The exhaust plateau is produced by the intake manifold vacuum. Since most compression ignition engines do not have a throttle plate to restrict the induction system they do not produce vacuum at idle. To produce the waveform illustrated in FIG. 52 a restriction is placed over the induction inlet. In FIG. 53 the exhaust plateau of the waveform produced by the induction restriction has been magnified to demonstrate how the induction restriction created a vacuum which created a pressure differential to, in turn, allow the exhaust plateau to rise up and clearly be seen. In FIG. 54 the automated test program has been run on the compression waveform from this 6.2 liter diesel. The cam timing is checked and shows to be in proper time. Note all the round indicators in the upper half of screen 55 are green, as are all the alert lights in the Calculated Conclusions portion.

While the foregoing cylinder pressure analysis has focused on identifying the cause (or causes) of a misfire (or misfires), as indicated in paragraph [00115] it can be used for other purposes. The cylinder pressure analysis is also useful in the following situations: (1) the powertrain control module identifies a misfire when, in fact, there is no misfire; (2) the powertrain control module correctly identifies the existence of a misfire, but misidentifies the misfiring cylinder; (3) the cam is not correctly timed, but not off enough to cause a misfire; (4) the angular velocity of the camshaft is changing even though the angular velocity of the crankshaft is not, which may or may not cause an intermittent misfire; and/or (5) the powertrain control module sets a DTC code for a camshaft to crankshaft correlation problem, potentially caused by the cam to crank triggers having moved on the camshaft or the cam sensor or the crank sensor having come loose on its bracket. As those familiar with the operation of engines should appreciate, if the cam timing is off (with or without a misfire) the engine will have reduced power. The above described cylinder pressure analysis provides a simple and effective way of checking the cam timing of an engine and, hence, checking for the cause of low engine power.

In addition to the cylinder pressure, the intake pressure can be measured with intake pressure sensing device 61 (see FIG. 1 and paragraph [00112]) and the waveform displayed on the graph on the Measure tab. As a general proposition, if there is a mechanical problem with the engine (as opposed to a spark or fuel delivery problem) checking the vacuum can help identify the problematic cylinder.

Figure 55:
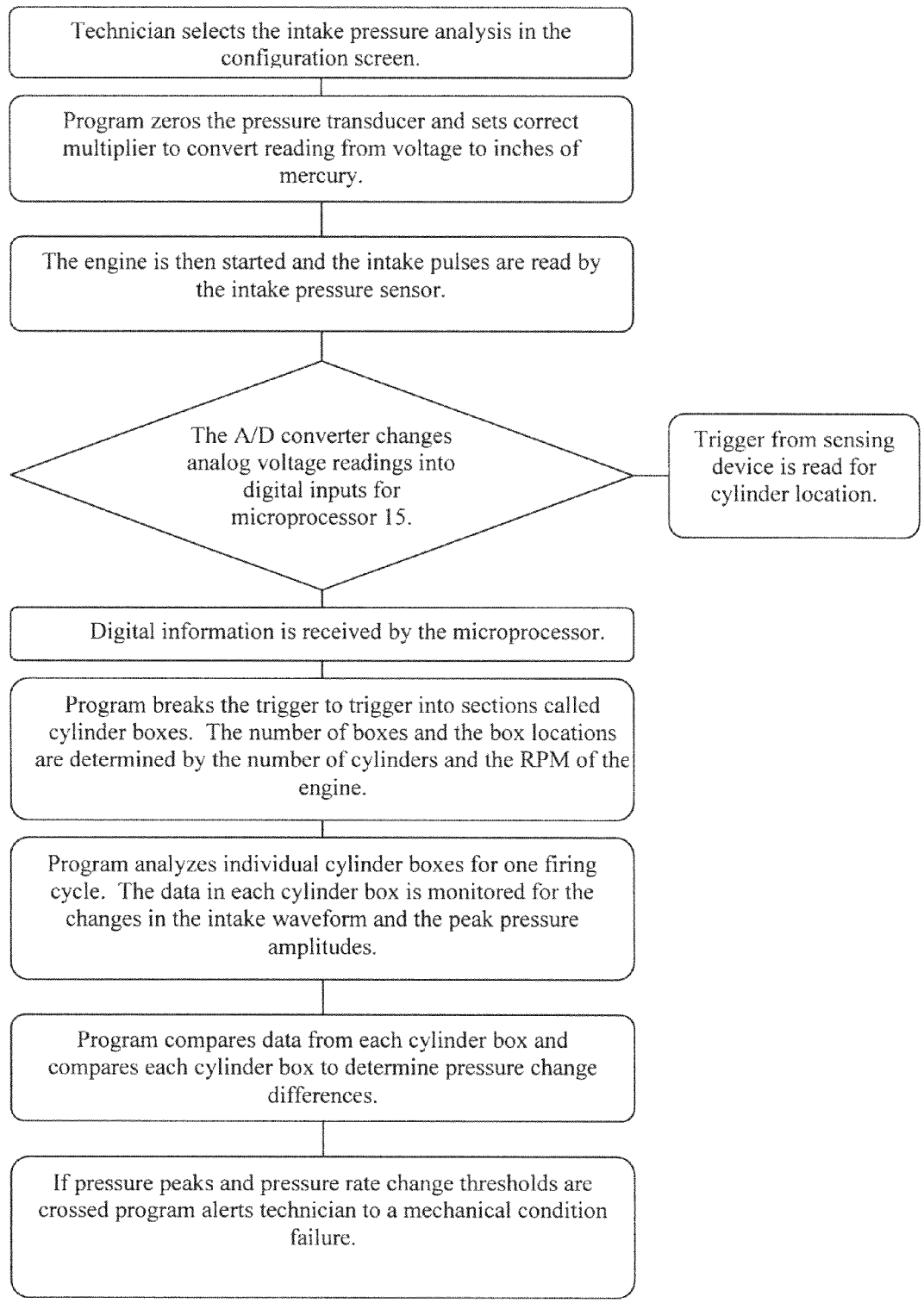
FIG. 55 is a flow chart illustrating the overall operational sequence of the intake pressure analysis of the present inventions.
Figure 56:
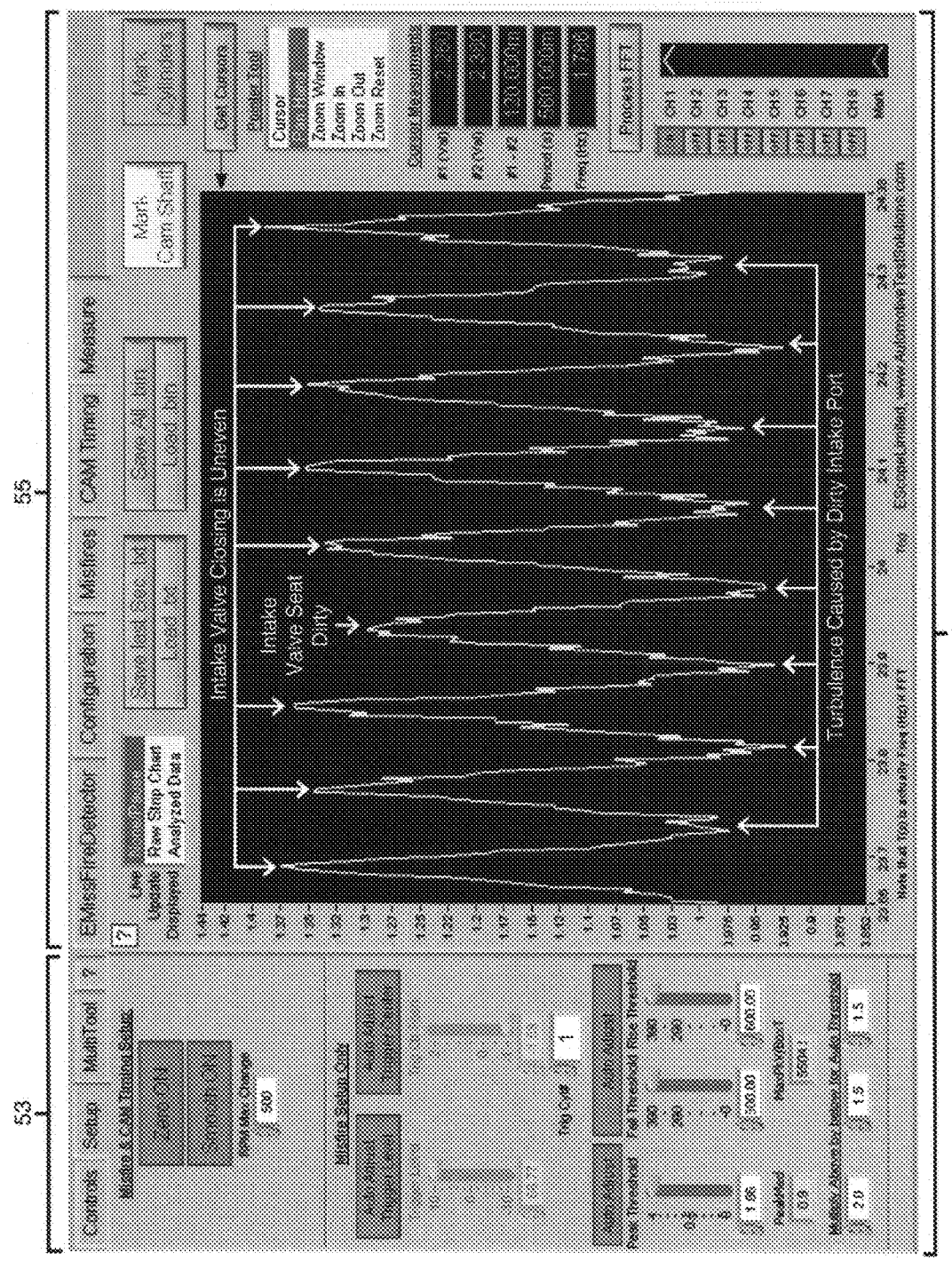
FIG. 56 is a screen display again showing the Setup tab open and the Measure tab open to show the intake pressure waveform from a 1995 Chevrolet Astro Van 4.3 liter engine with a multiple missing cylinders having a dirty intake valves and intake ports.

Once the misfiring cylinder has been identified the brake booster hose is removed from the intake manifold and intake pressure sensing device 61 inserted into this common intake port. To correlate the intake pressure waveform to the missing cylinder the previously described trigger signal is required. This will insure that the vacuum waveform being displayed on the graph of the Measure tab (see, for instance, FIG. 56) will correspond to the specific cylinder (or cylinders) being tested. However, for the vacuum waveforms, the signal from trigger 17 will need to be adjusted differently from the manner previously described due to the intake and exhaust valves for the misfiring cylinder being closed when the ignition event for that cylinder occurs. The two strokes that occur prior to the ignition event are, respectively, the intake stroke and then the compression stroke. See paragraph [0003] and FIGS. 1-4 of provisional application Ser. No. 60/842,310. These two 180° events, from intake through compression, equal 360° of crankshaft rotation before the ignition event. Accordingly, the trigger signal necessary to align the intake pressure changes being measured will need to be off an event one cylinder after 360° prior to the ignition event for such cylinder. Because the trigger signal is prior to the event being synchronized, as opposed to after as is the case in synchronizing the trigger signal to the exhaust pulse, Trig Ctr Posn=Trig Ctr Posn−(minus) number of cylinders the chosen cylinder is away from cylinder # 1. In a 4 cylinder engine with a firing order of 1-3-4-2, to align the intake pulse to the number 1 intake event the trigger signal needs to be based on the ignition of number 2 cylinder. Thus, Trig Ctr Posn=0.25-2=1.75. This will allow the intake pulse corresponding to cylinder 1 to correctly be identified to the cylinder that created it. With this timing sequence the cylinder box (previously described) can be aligned with the vacuum pressure changes associated with the misfiring cylinder. A manual grid can now be overlaid to evaluate the intake vacuum pressure waveform. As with the synchronization of the trigger signal to the exhaust pulse, as previously described with regard to misfire detection (e.g., paragraphs [0093] and Table II), this trigger signal also has to be adjusted for drift. The overall operation of the intake pressure analysis, after sensor 61 has been coupled to the intake manifold, is set forth in FIG. 55.

Figure 57:
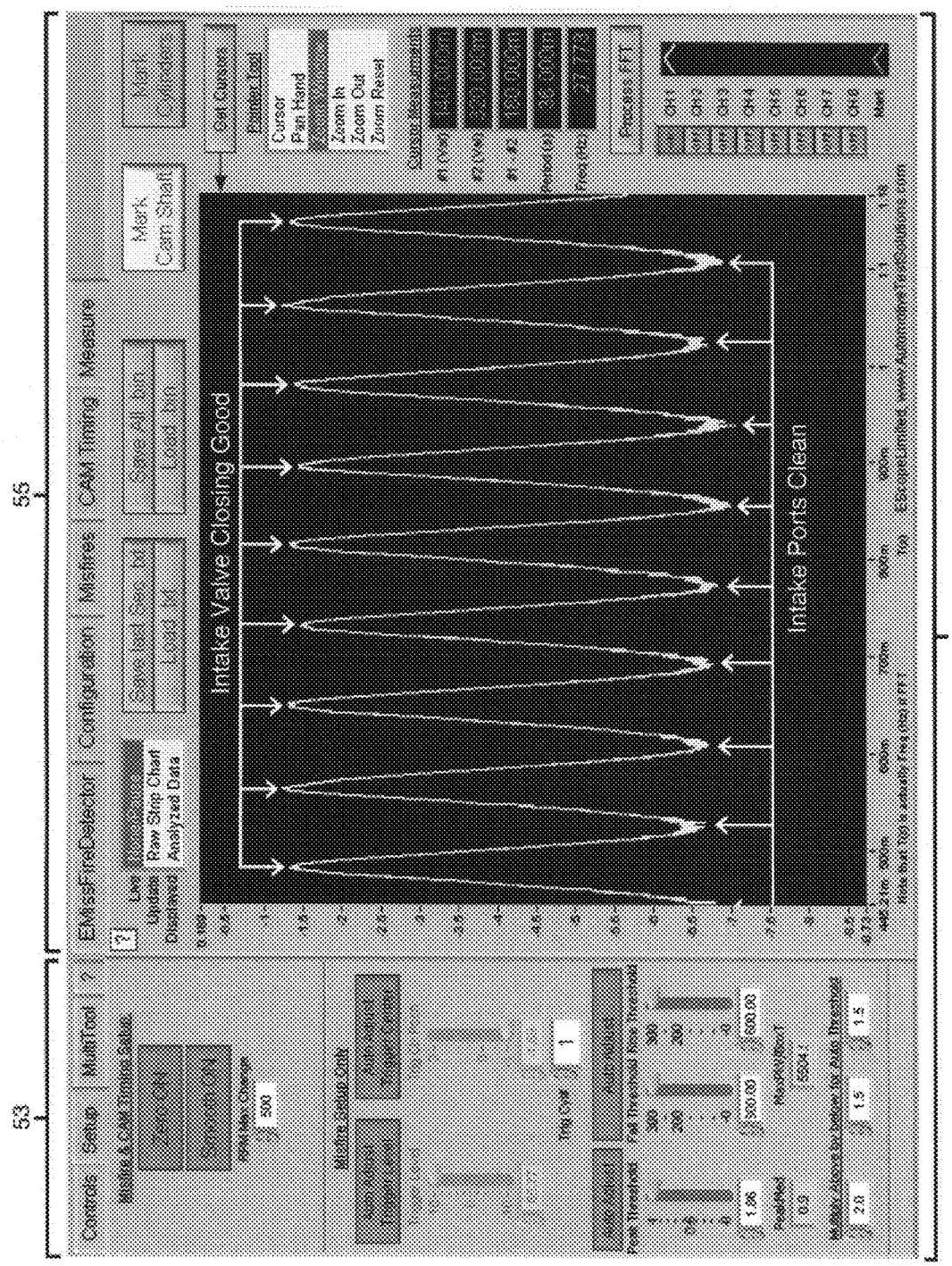
FIG. 57 shows the waveform from the same cylinder of the Astro Van after the intake valve and port have been cleaned.

The first intake pressure example is from a 1995 Chevrolet Astro Van with a 4.3 liter engine exhibiting random misfires from 2 cylinders. Once the misfiring cylinder has been identified, the brake booster hose was removed and intake pressure sensing device 61 installed into this common intake port. The trigger is then set, as described above. The engine was then cranked over while intake pressure waveform for the missing cylinder was taken. Evaluation of this intake pressure waveform indicates that either the intake port and intake valve or both are dirty. This can be seen in FIG. 56 noting the uneven top to bottom positions of the pressure change. Note that the peak marked "Intake Valve Seat Dirty" is particularly low. Also, the rising and falling ramps have turbulence. We have determined that these attributes are associated with a dirty intake. FIG. 57 shows the waveform from the same cylinder of the Chevrolet 4.3 after the intake has been cleaned. Note the even peaks and the lack of turbulence in the rising and falling ramps. For the purposes of illustration the uneven closing and the turbulence are marked with arrows in FIG. 56. FIG. 57 has similar markings. However, in operation, such markings would not be present.

Figure 58:
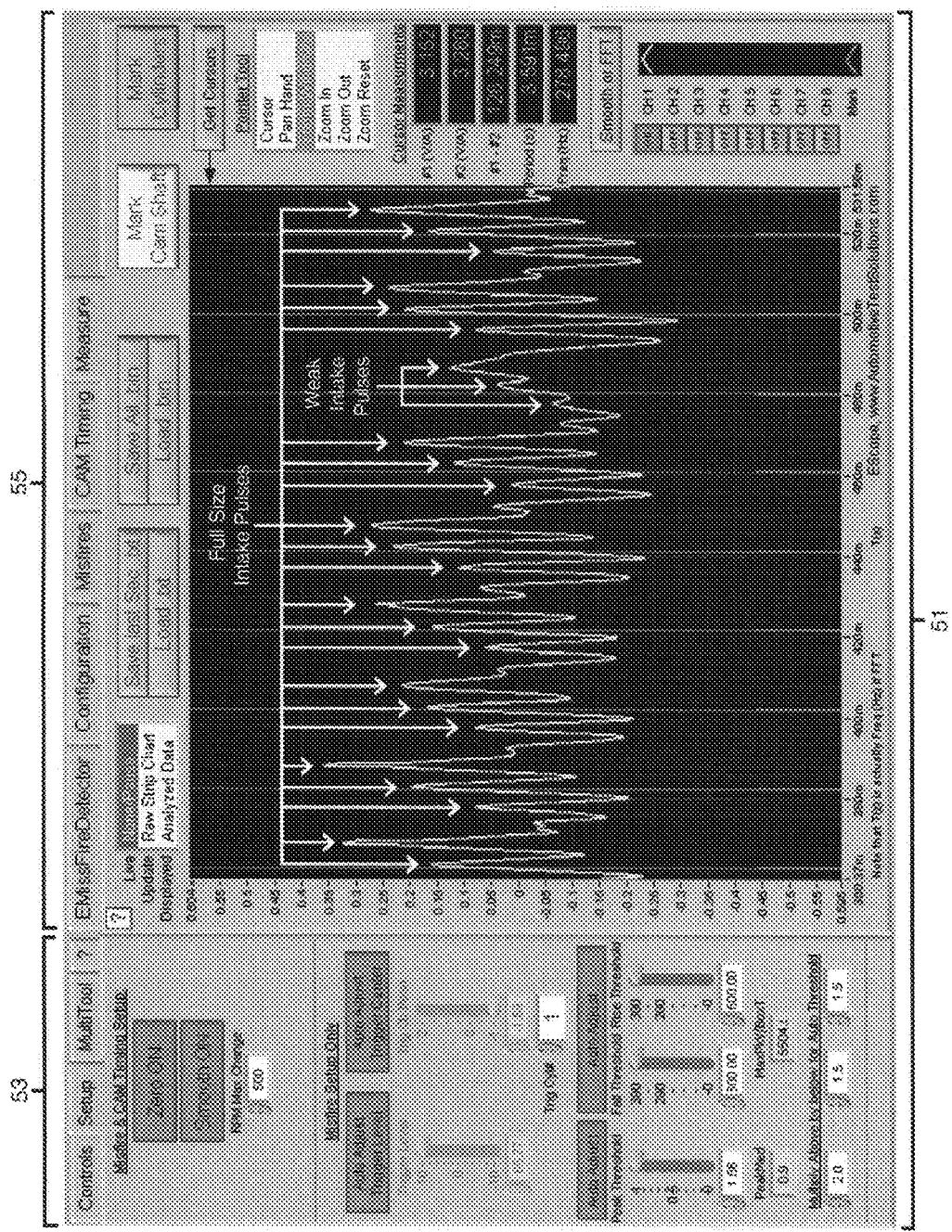
FIG. 58 is a screen display again showing the Setup tab open and the Measure tab open to show the intake pressure waveform from a 1996 Chevrolet Caprice 5.7 liter engine with a vacuum leak.

The second intake pressure example is from a 1996 Chevrolet Caprice with a 5.7 liter engine with a steady misfire on cylinder #7. As with the previous example, the brake booster hose was removed from the intake manifold and pressure transducer 61 installed into this common intake port. The engine was then run (for this kind of testing the engine can be either cranked or run; cranking typically yields more usable information) and the vacuum waveform was taken and evaluated. See FIG. 58. As is evident from inspection, in the 6$^{th}$ division of the graph, there is a vacuum disruption. This type of waveform is indicative that a vacuum leak is occurring.

Figure 59:
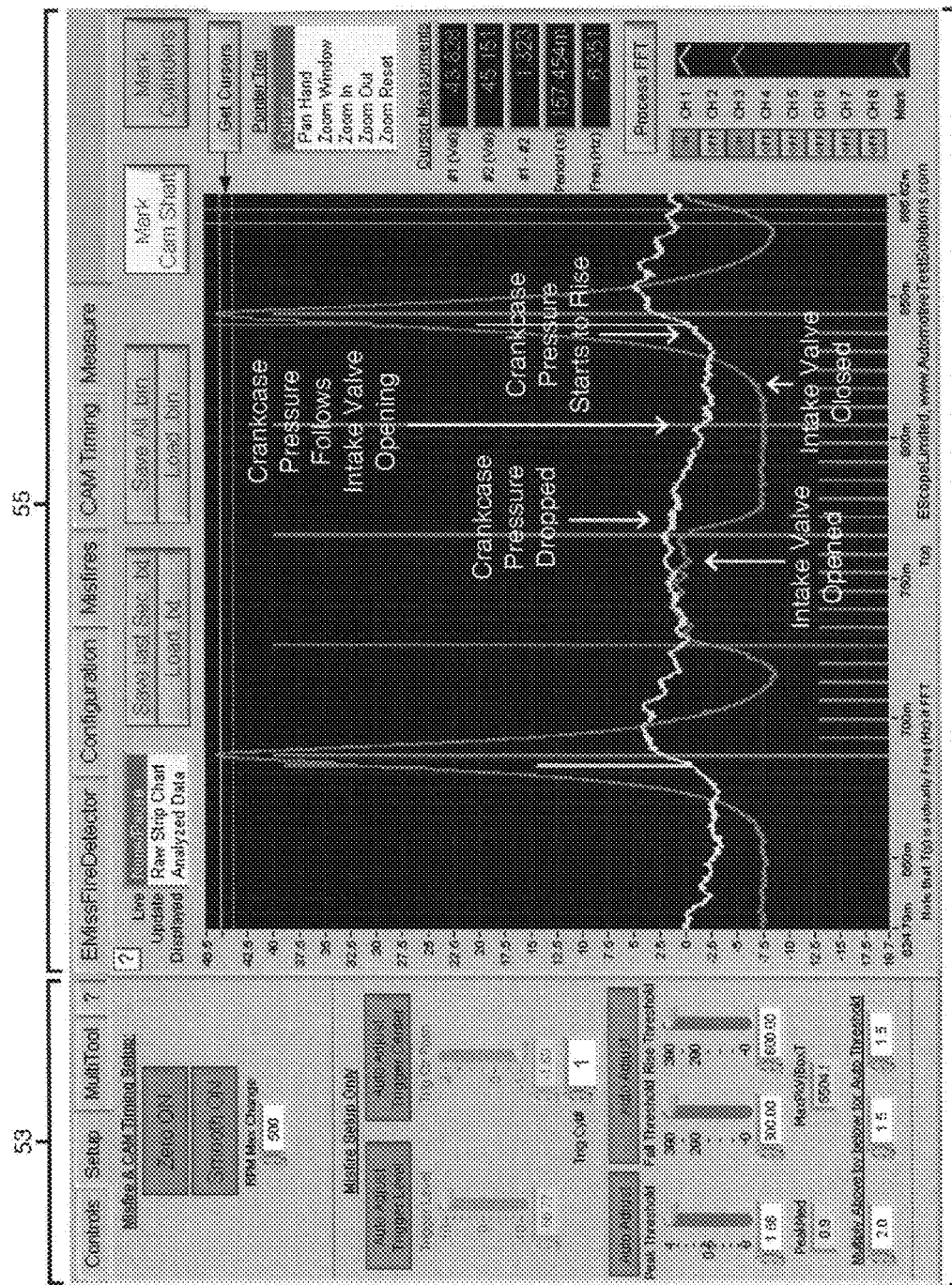
FIG. 59 shows, inter alia, the Measure tab still open but with the cylinder pressure waveform (green trace) and the crankcase pressure waveform (yellow trace) displayed.

To confirm that the intake gasket was leaking into the crank case (in some V style engines the intake manifold will seal to the crankcase, as is the case with the 5.7 liter Chevrolet Caprice engine) pressure transducer 65 was placed on the dip stick (as schematically illustrated in FIG. 1) and pressure transducer 63 was inserted into the spark plug hole of cylinder #7. With reference to FIG. 59, the yellow trace is the crank case pressure as measured by sensor 65 (in this example a 20H2O sensor). The green trace is the cylinder pressure waveform (in this case from a 300 psi sensor). As can clearly be seen, when the #7 cylinder's intake valve opened a pressure change occurred simultaneously in the crank case, thus demonstrating that the intake gasket was leaking into the crank case. As with previous examples, the lettering (e.g., "Crankcase Pressure Dropped") and associated arrows are for purposes of illustration.

Figure 60:
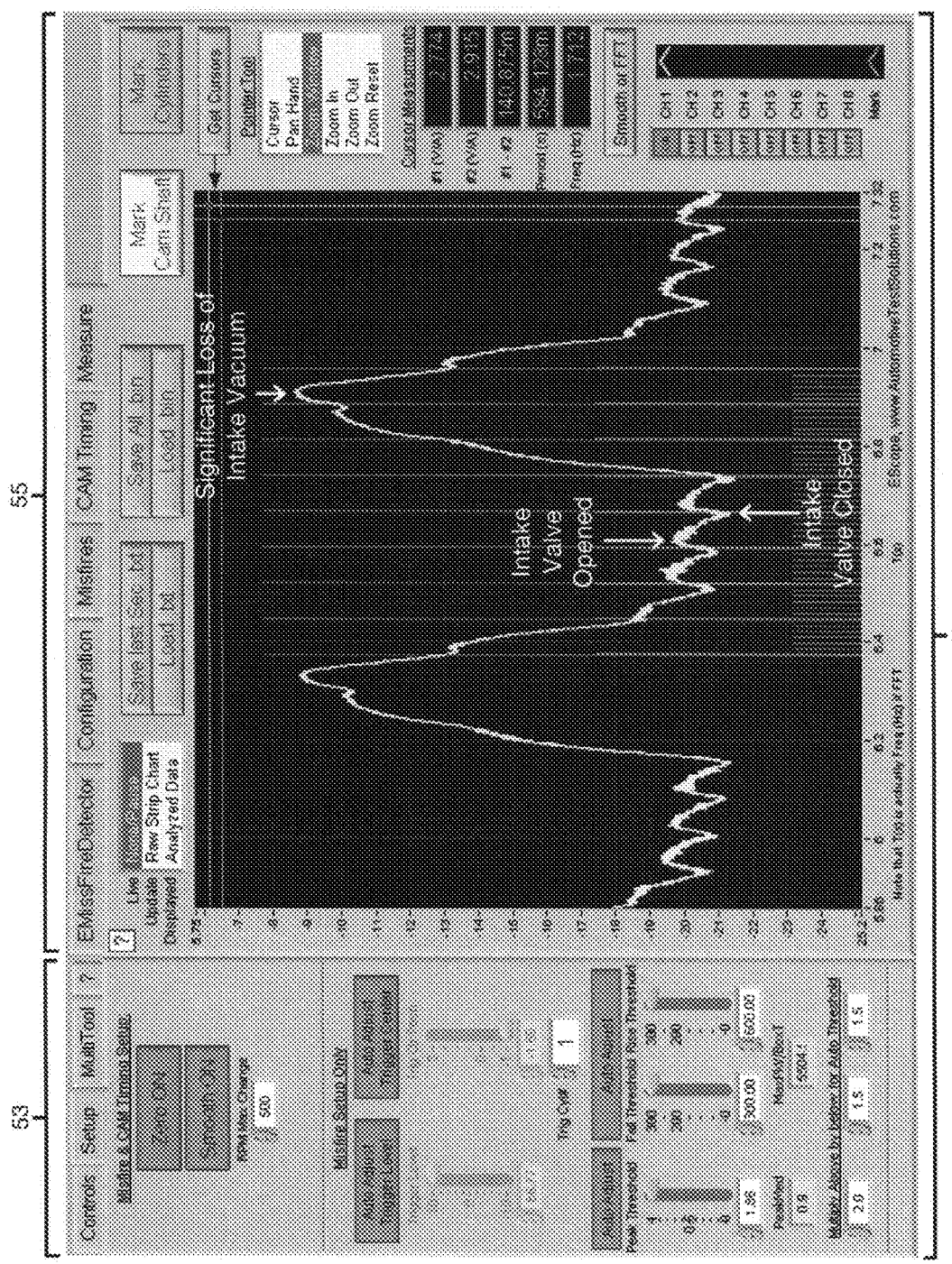
FIG. 60 is a screen display again showing the Setup tab open and the Measure tab open to show the intake pressure waveform from a GMC Sierra 5.3 liter engine with a bad number 5 exhaust valve.

The third example is from a GMC Sierra with a 5.3 liter engine. This engine has a steady misfire occurring on the number 5 cylinder. The brake booster hose was removed from the intake manifold and pressure transducer 61 inserted into this common intake port. The engine was then cranked over and the data gathered from the pressure changes in the intake manifold associated with the missing cylinder, as indicated in FIG. 60. The steep rise in the sixth division shows a loss of vacuum (the pressure going from, approximately, −21 to −9H2O), which indicates a bad exhaust valve. Since the exhaust valve cannot seat as the piston moves down on the intake stroke, it cannot pull vacuum due to its inability to seal the cylinder.

Figure 61:
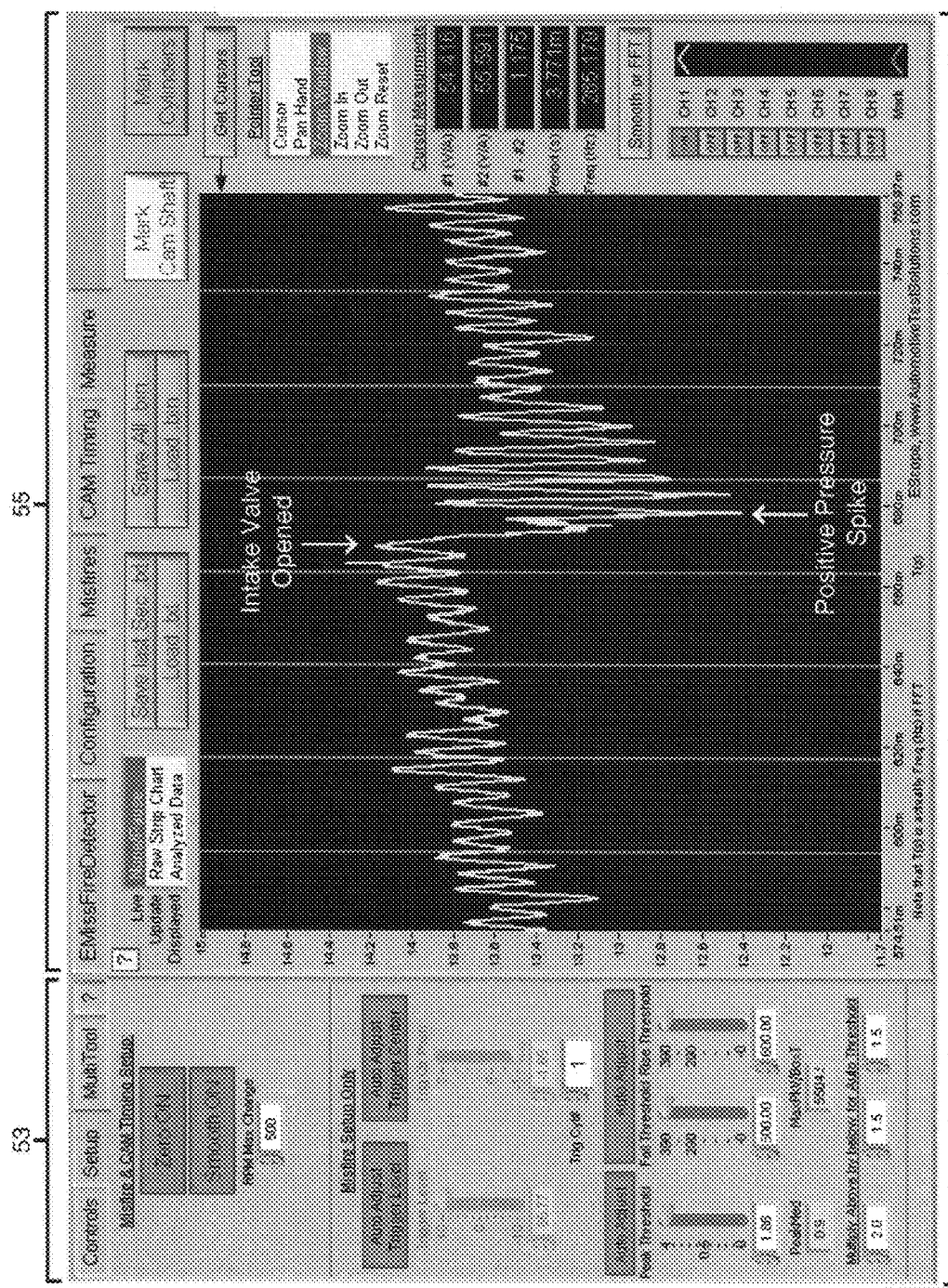
FIG. 61 is a screen display again showing the Setup tab open and the Measure tab open to show the intake pressure waveform from a 1993 Dodge Caravan 3.3 liter engine running with the number 4 cylinder exhaust valve not opening.
Figure 62:
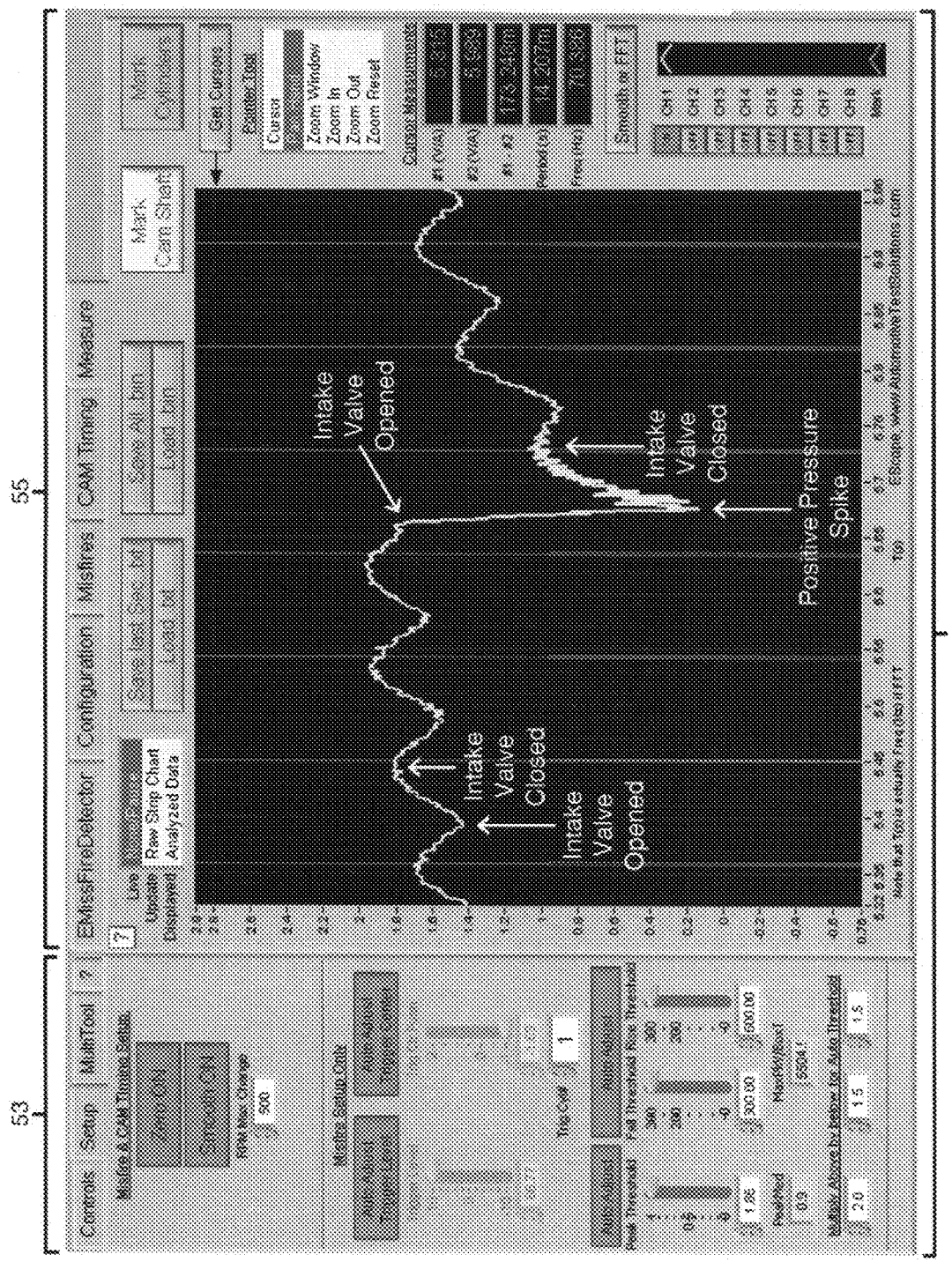
FIG. 62 is a screen display again showing the Setup tab open and the Measure tab open to show the intake pressure waveform from a 1993 Dodge Caravan 3.3 liter engine cranking with the number 4 cylinder exhaust valve not opening.

The fourth example is from a 1993 Dodge Caravan with a 3.3 liter engine. This engine has a steady misfire occurring in the number 4 cylinder. As with the previous examples, the brake booster hose was removed and pressure transducer 61 installed into this common intake port. The engine was allowed to run and the waveform associated with the missing cylinder marked. As is evident from inspection of FIG. 61, in the fifth division (from the left side of the graph) a sharp change in vacuum occurres. The engine was stopped and then cranked over. As is evident from FIG. 62, at this lower RPM a more decisive waveform can be seen. Note the steep pressure spike in the fourth full division (from the left hand side of the graph). This indicates that the exhaust valve did not open. In FIGS. 61 and 62 the pressure loss from the exhaust valve not opening does not prevent the intake manifold from losing vacuum. The exhaust valve not opening only allows the vacuum to rise in pressure for a very short period of time. In contrast, in FIG. 60 the vacuum is lost due to the exhaust valve not closing properly. In this situation the intake manifold vacuum drops considerably due to the cylinder's inability to produce vacuum. The difference in the Y axis scales results from using two different pressure transducers.

The foregoing can also be coupled with additional instrumentation. For instance, the data from one or more of sensors 11, 61, 63 and 65 can be linked with the instrumentation disclosed in commonly owned U.S. application Ser. No. 11/811,634 so that more data is available to help with the diagnosis of the engine. For instance, if the fuel trim from this diagnostic tool is checked this information can help determine if the misfire is caused by the ignition system, the mechanical condition of the engine or cylinder, or the fuel delivery system. If the ignition or mechanical condition is responsible for causing the misfire the fuel trim movements will be small. If the injectors, fuel delivery system or an air leak is the cause of the misfiring cylinder the fuel trim will have a larger correction factor.

Additionally, a gas analyzer can be used to gather data from the tailpipe emissions that will also increase the probability of a correct diagnosis. The exhaust gas analyzer is a device that can sense the concentration of certain gas molecules that are emitted from an internal combustion engine. The internal combustion engine draws air into the cylinder where a hydrocarbon fuel is added. The hydrocarbon fuel is then broken down in the cylinder and, under the right conditions, combines with oxygen. This chemical reaction provides an expanding gas that forces the piston down producing power at the engine's fly wheel. At the end of the combustion cycle the gases are forced out of the cylinder and into the exhaust system. The exhaust gas analyzer takes a small sample of this gas as it leaves the tail pipe of the vehicle, pumps it through a filtering system and into the exhaust gas analyzer's sample tube. Located at one end of the sample tube is a wide band infrared emitter which emits infrared light down the sample tube of the exhaust gas analyzer. At the opposite end of the sample tube an infrared quad collector is positioned which reads the infrared light that was transmitted through the sample. Each gas that is emitted out of the vehicle's tail pipe absorbs certain infrared light wavelengths. If the collectors are tuned by applying light frequency filters only the light wavelength associated with the gas to be sampled will pass through the filter and be read by the collector. The amount of infrared light that passes through the sample tube and the light filters will show the concentration of a particular gas. The internal combustion engine produces exhaust gas concentrations of carbon monoxide (CO), carbon dioxide (CO2), hydrocarbons (HC), oxygen (O2), and nitrogen oxides (NOx). These different gasses absorb different infrared light wavelengths. The infrared light wavelength that CO absorbs is 4.65 nanometers. CO2 absorbs 4.2 nanometers. HC absorbs 3.4 nanometers. NOx absorbs 6 nanometers. However, since water vapors also absorb 6 nanometers of light NOx must be read by a chemical cell. Oxygen does not absorb any infrared light so it to must be read by a chemical cell. A $4^{th}$ collector is added as a gas reference and is read at 4 nanometers of infrared light. This reference adds stability to the reading of the other gases. If no gases are in the sample tube the collectors will read the highest concentration of infrared light. If gas traces are in the sample tube they will absorb a portion of the infrared light. The more gas concentration, the less infrared light makes it to the infrared collectors. The less infrared light that is picked up and read by the collectors, the higher the concentration of gas content is indicated by the gas analyzer. By filling the sample tube with a known concentration of gas content, the gas analyzer can be calibrated to a very accurate level.

An exhaust gas analyzer of the type described above can be used in conjunction with the misfire detector of the present invention when diagnosing high levels of hydrocarbons. Elevated levels of hydrocarbons as determined by the gas analyzer would be an indication that an engine misfire had occurred. To determine if the engine had one or more misfiring cylinders the misfire detection analysis would be run. If a cylinder(s) were misfiring the misfire detector would indicate which cylinder(s) were increasing the tailpipe emissions. On the other hand, if the misfire detector indicated no misfires were present another cause would need to be determined. For instance, if the catalytic converter efficiency was low the tailpipe emissions would be in excess of federal regulations and could cause the hydrocarbons to be at elevated levels. To confirm the catalytic converter efficiency the instrumentation and method set forth in co pending application Ser. No. 11/811,634 could be used. If the catalytic converter showed low efficiency this would be the cause of the high hydrocarbon content being expelled out the tail pipe. The catalytic converter would then be replaced, repairing the emission failure of the said vehicle.

In addition to the foregoing, an ignition analyzer can also be coupled with the misfire detector of the present invention. This will help the technician quickly determine the cause of the misfiring cylinder. The ignition waveform is a window into the cylinder's combustion event. The ignition waveform's peak kV, point of plasma, burn time, burn waveform, and negative coil oscillation provides vital information on the cause of the misfire. By analyzing this ignition waveform the technician will know if the cylinder is rich, lean, has low compression, faulty valve seating, the EGR is stuck on, or the ignition firing event has failed. However, many ignition waveforms show very subtle changes that indicate where the problem lies. Thus, many technicians have problems interpreting such waveforms. This is solved with the use of the misfire detector of the present invention. The monitor screen can be divided into two parts, with the left side of the screen can display the results of the misfire detection analysis while the right side is displaying the ignition waveforms. When the misfire detection screen illuminates a misfire light the technician will have an indication as to which cylinder within the engine is misfiring. The technician can then zero in on the ignition waveform from the misfiring cylinder to identify which of these subtle changes are indications that lead to a cylinder with a misfire. It would also be helpful when the ignition analyzer can not determine a misfire while viewing an ignition waveform. When utilizing both tools the diagnostic time will be much shorter with a higher probability of successfully diagnosing the misfire condition of the engine.

Whereas the drawings and accompanying description have shown and described the preferred embodiment of the present invention, it should be apparent to those skilled in the art that various changes may be made in the form of the invention without affecting the scope thereof.

The claims of this invention are:

1. A method of checking the performance of an internal combustion engine, the engine including a cylinder having a piston an associated exhaust valve and an intake valve, the engine further including a crankshaft and camshaft means, the camshaft means including an exhaust cam and an intake cam, the method including the steps of:
   a. replacing one of the spark plug, fuel injector or glow plug from the cylinder with a pressure transducer;
   b. rotating the crankshaft of the engine fast enough to build pressure within the cylinder and through at least one compression stroke where the piston is momentarily at top dead center (hereinafter TDC 0°);
   c. measuring the pressure changes in the cylinder while the crankshaft is being rotated fast enough to build pressure in the cylinder;
   d. generating a cylinder pressure waveform from the measured pressure changes in the cylinder; and
   e. from the cylinder pressure waveform analyzing the magnitude and timing of at least one of the pressure changes in the cylinder.

2. The method as set forth in claim 1, wherein the analysis step is to determine the whether the timing of at least one of the exhaust cam and the intake cam is correct, advanced or retarded.

3. The method as set forth in claim 2, further including the step of characterizing a portion of the cylinder pressure waveform as the exhaust ramp, the exhaust ramp representing a portion of the waveform where the pressure is rising after the exhaust valve opens after TDC 0°.

4. The method as set forth in claim 3, further including the step of determining the relationship between the exhaust ramp and BDC 180°, the position where the crankshaft has completed 180° of rotation after TDC 0°.

5. The method as set forth in claim 4, further including the step of designating a portion of the exhaust ramp as representing a range of exhaust cam timing values that are correct if this designated portion intersects the BDC 180° position on the cylinder compression waveform.

6. The method as set forth in claim 5, further including the step of characterizing the exhaust cam timing as correct, advanced or retarded depending on whether the designated portion of the exhaust ramp intersects the BDC 180° position (correct), is before the BDC 180° position (advanced), or after the BDC 180° position (retarded).

7. The method as set forth in claim 6, further including the steps of:
   a. providing a set of algorithms for analyzing the exhaust ramp; and
   b. utilizing this set of algorithms to determine whether the timing of the exhaust cam is correct, advanced or retarded.

8. The method as set forth in claim 2, further including the step of characterizing a portion of the cylinder pressure waveform as the intake ramp, the intake ramp representing a portion of the waveform where the cylinder pressure is falling after the intake valve opens.

9. The method as set forth in claim 8, further including the step of designating a portion of the intake ramp as representing a range of intake cam timing values as correct if such range of values intersects the TDC 360°+20° position on the cylinder pressure waveform, TDC 360° representing the position where the crankshaft has completed 360° of rotation after TDC 0°.

10. The method as set forth in claim 9, further including the step of characterizing the intake cam timing as correct, advanced or retarded depending on whether the designated portion of the intake ramp intersects the TDC 360°+20° position (correct), is before the TDC 360°+20° position (advanced), or after the TDC 360° 20° position (retarded).

11. The method as set forth in claim 10, further including the steps of:
   a. providing a set of algorithms for analyzing the intake ramp; and
   b. utilizing this set of algorithms to determine if the timing of the intake cam is correct, advanced or retarded.

12. The method as set forth in claim 11, wherein the analysis step is for the purpose of identifying one or more problems selected from the group including low cranking pressure, low running pressure, low snap throttle pressure, bad intake valve, bad exhaust valve, bad intake valve spring, bad exhaust valve spring, worn valve guides, camshaft to crankshaft timing problems, camshaft chain or belt tension problems, piston sealing problems, worn cam problems, lifter problems, exhaust restriction problems and ignition timing problems.

13. The method as set forth in claim 12, further including the steps of:
   a. providing a set of algorithms for analyzing the features of the cylinder pressure waveform; and
   b. utilizing this set of algorithms to identify features included in the cylinder pressure waveform indicative of the cause of the misfire.

14. The method as set forth in claim 9, wherein N is selected from the group consisting of 20° and 30°=/−10°.

15. The method as set forth in claim 1, wherein the cylinder is misfiring and the analysis step is for the purpose of determining the cause of the misfire.

16. The method as set forth in claim 15, wherein the analysis step includes the steps of:
   a. identifying and labeling portions of the cylinder pressure waveform selected from the group including compression tower, exhaust ramp, exhaust plateau, intake ramp, exhaust valve opening, exhaust valve closing, intake valve opening, intake valve closing; and
   b. analyzing at least one of the labeled portions.

17. The method as set forth in claim 1, further including the step, for engines which do not have intake manifold vacuum at idle, of placing at least a partial restriction over the induction inlet of the intake manifold of such engine to create a vacuum at idle.

18. The method as set forth in claim 1, wherein the camshaft means includes separate exhaust and intake camshafts and wherein at least the exhaust camshaft is a variable valve timing camshaft activated by a solenoid, further including the steps of:
   a. activating the solenoid; and
   b. analyzing the cylinder pressure waveform to determine if the variable valve timing camshaft moved relative to the crankshaft.

19. The method as set forth in claim 1, wherein the step of marking the cylinder pressure waveform is performed while the crankshaft is rotating fast enough to build pressure within the cylinder.

20. The method as set forth in claim 1, further including the steps of capturing the cylinder pressure waveform, storing the cylinder pressure waveform, retrieving the cylinder pressure waveform from storage, and then marking the cylinder pressure waveform.

21. The method as set forth in claim 1, wherein the step of rotating the crankshaft is selected from the group consisting of cranking the engine and running the engine.

22. The method as set forth in claim 1, further including the step of marking the cylinder pressure waveform at the end of a compression stroke where the piston is momentarily at top dead center (hereinafter TDC 0°) and again at the end of the next successive compression stroke where the piston is also momentarily at top dead center (hereinafter TDC 720°).

23. The method as set forth in claim 21, further including the step of dividing the cylinder pressure waveform between TDC 0° and TDC 720° into segments, each segment representing 180° of crankshaft rotation, one segment representing the travel of the piston from TDC 0° to BDC 180°, another segment representing the travel of the piston from TDC 360° to BDC 540°.

24. The method as set forth in claim 1, wherein the analysis step is to determine the opening and closing of both the exhaust valve and the intake valve relative to the position of the piston in the cylinder.

25. A method of creating a vacuum in a diesel engine which does not have intake manifold vacuum at idle, to permit the generation of one or more cylinder pressure waveforms, which waveforms mimic those from a engine which has intake manifold pressure at idle, the method including the step of placing at least a partial restriction over the induction inlet of the intake manifold of the diesel engine to create intake manifold vacuum at idle.

26. A method of checking the performance of an internal combustion engine by analyzing the pressure changes in the engine's intake manifold, the engine including an intake manifold and a crankshaft, the method including the steps of:
   a. connecting a pressure transducer to the intake manifold;
   b. rotating the crankshaft of the engine fast enough to create a pressure differential in the intake manifold;

c. measuring the pressure changes in the manifold while the crankshaft is being rotated fast enough to create a pressure differential in the intake manifold;

d. generating an intake pressure waveform from the measured pressure changes in the intake manifold; and e. analyzing at least a portion of the intake pressure waveform for one or more features indicative of a problem with the engine.

27. The method as set forth in claim 26, further including the steps of: (a) providing a trigger; and (b) synchronizing the signal from the trigger to a cylinder.

28. The method as set forth in claim 27, further including the steps of: (a) providing cylinder boxes, one for each cylinder of the engine; (b) dividing the intake pressure waveform into a number of segments, one for each cylinder of the engine; and (c) locating the individual segments of the intake pressure waveform in the cylinder box for the cylinder which created the segment.

29. The method as set forth in claim 28, further including the step of comparing the individual segment that is located within a cylinder box to another segment within another cylinder box.

30. The method as set forth in claim 29, further including the step of identifying the cylinder(s) that have an intake pressure waveform segment that is indicative of a problem.

31. A method of checking the performance of an internal combustion engine, the engine including a cylinder having a piston an associated exhaust valve and an intake valve, the engine further including an intake manifold, a crankcase, a crankshaft and camshaft means, method including the steps of:

a. rotating the crankshaft of the engine fast enough to build pressure within the cylinder and the intake manifold;

b. measuring the pressure changes in the cylinder while the crankshaft is being rotated fast enough to build pressure in the cylinder;

c. generating a cylinder pressure waveform from the measured pressure changes in the cylinder;

d. measuring the pressure changes in the crankcase while the crankshaft is being rotated;

e. generating a crankcase pressure waveform form the measured pressure changes in the crankcase; and f. comparing the crankcase pressure waveform with the cylinder pressure waveform.

32. The method as set forth in claim 31, further including the steps of: (a) marking the crankcase pressure waveform using a trigger signal to create cylinder boxes, one cylinder box for each cylinder of the engine; (b) dividing the crankcase pressure waveform into segment, one for each cylinder; and (c) locating the individual segments of the crankcase pressure waveform in the cylinder box for the cylinder that created the segment.

33. The method as set forth in claim 31, further including the step of, from the cylinder pressure waveform, determining the opening and closing of at least one of the exhaust valve and the intake valve.

34. A method of checking the ignition timing of an internal combustion engine, the method including the steps of:

a. replacing one of the spark plug, fuel injector or glow plug from the cylinder with a pressure transducer;

b. rotating the crankshaft of the engine fast enough to build pressure within the cylinder and through at least two successive compression strokes where the piston is at a first top dead center and the cylinder pressure peaks (hereinafter TDC 0°) and a second top dead center 720° of crankshaft rotation later and the cylinder pressure peaks a second time (hereinafter TDC 720°);

c. measuring the time between the first compression peak and the second compression peak;

d. dividing the measured time by 720 to obtain the degrees of crankshaft rotation per unit of time;

e. obtaining a trigger signal;

f. marking the trigger signal;

g. measuring the time between the trigger signal and one of the compression peaks; and h. determining the ignition timing from the time between trigger signal and compression peak and the degrees of crankshaft rotation per unit of time.

35. A method of diagnosing an internal combustion engine, the method including the steps of:

a. conducting a first test to identifying at least one misfiring cylinder; and b. conducting a second test to determine the probable cause of the misfire, the second test selected from the group including analyzing PID data, analyzing Calculated PID data, analyzing the engine's tailpipe emissions with a gas analyzer, and analyzing the engine's ignition with an ignition analyzer.

\* \* \* \* \*